United States Patent [19]
Walters

[11] 3,882,304
[45] May 6, 1975

[54] PARAMETRIC INTERPOLATION OF THREE-DIMENSIONAL SURFACES

[75] Inventor: Ronnie G. Walters, Painesville, Ohio

[73] Assignee: Allen-Bradley Company, Milwaukee, Wis.

[22] Filed: May 4, 1973

[21] Appl. No.: 357,321

[52] U.S. Cl. ............ 235/151.11; 235/152; 318/569; 318/600; 444/1
[51] Int. Cl. .......................... G06f 7/38; G06g 7/30
[58] Field of Search ....... 235/151.11, 197; 318/569, 318/594, 600, 604; 444/1

[56] References Cited
UNITED STATES PATENTS

| | | | |
|---|---|---|---|
| 3,066,868 | 12/1962 | Tripp | 235/151.11 |
| 3,328,655 | 6/1967 | Tripp | 235/151.11 |
| 3,634,662 | 1/1972 | Slawson | 235/151.11 |
| 3,746,845 | 7/1973 | Henegar et al. | 235/151.11 |
| 3,757,095 | 9/1973 | Kiwiet | 235/151.11 |
| 3,763,360 | 10/1973 | Nishimura et al. | 235/151.11 |

FOREIGN PATENTS OR APPLICATIONS

| | | | |
|---|---|---|---|
| 1,187,378 | 4/1970 | United Kingdom | 235/151.11 |
| 1,092,544 | 11/1967 | United Kingdom | 235/151.11 |

OTHER PUBLICATIONS

Francis et al., The Computer Managed Manufacturing Concept, pp. 231–238, Proceedings of the 7th Annual Meeting of the Numerical Control Society, 4/1970.
Price, et al., Design Features of an Hierarchic NC System, pp. 239–250, Proceedings of the 7th Annual Meeting of the Numerical Control Society, 4/1970.
Fowler, et al., Cubic Spline, A Curve Fitting Routine, June, 1966, Union Carbide Corp., Report No. Y-1400.
Bezier (Renault), Unisurf System, Principles and Applications, The Expanding World of NC, pp. 169–185.
Kuan, (IIT Research Institute), Sculptured Surface Symbolic Description and Manufacturing General Surfaces, The Expanding World of NC, pp. 186–196.
Gomolak, Better and Faster Design by Machine Electronics, June 1, 1964 pp. 64–71.
Fair, Direct Computer Control for Numerical Machines, 18th Annual IEEE Machine Tool Conference, Oct., 1968, pp. 1–11.

*Primary Examiner*—Felix D. Gruber
*Attorney, Agent, or Firm*—Quarles & Brady

[57] ABSTRACT

A method is described for defining complex two- and three-dimensional objects with a minimal amount of data. The method employs a "preprocessor" which receives the coordinate values of an ordered set of points on the object and calculates one or more state vectors which concisely define the object. Two numerical control systems are described in which these state vectors are applied to a "mapping" interpolator that controls the servomechanisms of a machine tool. The mapping interpolator controls machine tool motion to generate a three-dimensional surface which not only passes through each of the data points used to describe the object, but which also assumes a smooth shape of minimum strain energy.

55 Claims, 48 Drawing Figures

PARAMETRIC INTERPOLATION OF THREE-DIMENSIONAL SURFACES

BACKGROUND OF THE INVENTION

The invention relates to methods of generating functions from a limited set of boundary conditions, and specifically to a method and means of interpolating between data points.

There are numerous applications for function generators which receive the coordinate values of specific data points in two- or three-dimensional space and generate an output signal, or signals, which define a smooth curve or surface connecting the points. In a numerical contouring control system for a machine tool, for example, the input data provides the coordinates of points along a desired cut to be made in a workpiece. The function, or contour, generator receives this digital data and generates output signals which continuously direct the motion of the X, Y and Z axes servo-mechanisms on the machine tool. When the cut is defined by a trivial function, such as a straight line, the contour generator develops an output signal for each servo-mechanism that will drive the cutter in a straight line path between the end points specified by the input data. The contour generator, therefore, operates to linearly interpolate between the end points to derive the required continuous output signal for each axis servo-mechanism. As illustrated in U.S. Pat. No. 3,621,216 issued on Nov. 16, 1971, numerous methods and means for linearly interpolating between data points are known in the art.

Although linear interpolators are predominant, a number of function generators have been proposed for generating complex spacial forms between data points. For example, U.S. Pat. No. 3,506,812 issued on Apr. 14, 1970, discloses a contour generator which connects data points with a circle; U.S. Pat. No. 3,217,219 issued on Nov. 9, 1945, discloses means for generating circles and elipses; U.S. Pat. No. 3,609,319 issued on Sept. 28, 1971, discloses a contour generator which connects data points with a third order polynomial; and U.S. Pat. No. 3,191,111 issued on June 22, 1965, discloses means for generating Sici spirals between data points. When higher order interpolating functions such as these are considered, however, the nature of the input data, or boundary condition data, becomes an important consideration. Specifically, first, second and higher order derivatives are often necessary to generate complex interpolating functions, and these are typically not known. As a result, the derivatives must either be calculated or approximated from the available input data, and these calculations require considerable hardware, or considerable computer processor time. Although nearly any geometric form may be approximated by specifying a sufficient number of boundary conditions and interpolating between them with a properly designed function generator, this technique is impractical where a variety of relatively complex spacial forms are to be generated.

Another interpolation method is to "fit" a high order polynominal such as a Taylor series to the given set of data points as disclosed in U.S. Pat. No. 3,564,223 issued on Feb. 16, 1971. The coefficient of each term of the series is computed using the boundary condition data. A similar approach is disclosed in U.S. Pat. No. 3,636,333 issued on Jan. 18, 1972, in which a function connecting the data points is approximated by a Fourier series. In addition to the large amount of computation required to calculate the coefficients of such series, the curves which result are nearly analytic and therefore exclude the larger class of functions which are discontinuous in the first or higher order derivatives. That is, the methods used to calculate the coefficients require that the resulting function be continuous in the first and higher order derivatives. Curves commonly encountered in such applications as numerical control, however, are generally discontinuous in the first and higher order derivatives and it is, therefore, difficult to accurately "fit" a Fourier or Taylor series to them.

The method presently employed in contour generators of commercial numerical control systems is to divide the spacial form into small segments and interpolate between the end points of each segment with less complex interpolating functions. In early contouring control systems, such as that disclosed in U.S. Pat. 3,069,608 issued on Dec. 18, 1962, the spacial form, or path, was divided into short segments and linear interpolation was performed between the ends of each segment. Although this approach is generally quite satisfactory, spacial forms having sharp curves must be divided into very short segments in order to minimize chordal error. As a result, a large amount of input data must be provided to define the many segments of the cut. This method becomes unworkable when complex three-dimensional surfaces are to be generated.

More recent function generators are not limited to the single criteria of straight line interpolation between data points, but instead, include a library of interpolating functions which can be selected by the parts programmer. With such systems the curved trajectory, or spacial form, is divided into segments, each one of which may be closely approximated by an available interpolating function such as a straight line or circle. The end points and other boundary conditions of each segment are specified by the parts program, along with the desired interpolating function. The segments are generated in sequence and are concatenated, or connected to provide an approximation of the function defining the entire spacial form. Although the availability of various interpolating functions reduces the number of data points necessary to accurately specify a spacial form, this reduction in required input data is not without cost. The hardware (or software routines) necessary to generate a set, or library of interpolating functions can become quite costly, particularly when high order functions requiring numerous multiplication and division operations are included. Also, regardless of the number of interpolating functions available to the programmer there are always a substantial number of spacial forms which can only be accurately approximated by interpolating over very short segments, and consequently, can only be specified by a large amount of input data.

It is thus apparent that present methods of generating smooth, accurate curves involves the balancing of a number of conflicting objectives. First, it is desired to minimize the amount and complexity of the input data required to specify the spacial form; second, it is desired to minimize the repertoire of interpolating functions needed to approximate commonly encountered spacial forms; and third, it is desired to minimize the complexity of the interpolating functions in order to reduce the amount of hardware and/or software required to generate them. When generating three-dimensional surfaces from a set of data points, these conflicting objectives become even more difficult to achieve due to the vastly increased amount of data required to specify the surface and the larger number of calculations necessary to generate the interpolating functions.

Somewhat independent of the above considerations is the manner in which the selected three-dimensional interpolation functions are expressed and generated. A function can either be expressed solely in terms of the dependent coordinate variables (X, Y and Z), or each dependent variable can be expressed as a parametric function of an independent variable, such as time or arc length. Although interpolation functions are generally less complex when expressed in dependent (non-parametric) form, it is difficult with such functions to generate curves which double back and are colinear with one of the axes over a portion of their length. For example, if the curve becomes colinear with the Y axis, the rate of change of Y with respect to X or Z becomes infinite and cannot, therefore, be expressed as a function of these variables. This difficulty is not encountered when the X, Y and Z coordinates are expressed as a function of time; however, this more desirable parametric form adds complexity and, therefore, often renders the interpolating function impractical.

SUMMARY OF THE INVENTION

The present invention relates to a method and means of parametrically generating a smooth, continuous function from a specified set of data points. More specifically, the invention relates to an interpolation method, and apparatus for carrying out the method, comprising the steps of: receiving a set of data which specifies the coordinates of a plurality of points on a spacial form; generating an initial state vector which includes the coordinates of a first point on the spacial form; calculating a parametric steering function from the set of data; and dynamically applying the parametric steering function to the initial state vector to map, as a function of an independent variable, a series of points between the first point and a second point on the spacial form. The independent variable may be time, and the initial state vector may include any amount of a boundary condition information at the first point. The steering function is a unique function which is determined from both the received set of data and a preselected smoothness criteria.

The particular smoothness criteria selected and used to calculate the steering function is related to the least energy concept which is derived from the behavior of a piece of spring steel that is forced to meet specific boundary conditions. Basically, this concept teaches that when a steel spline is constrained at specific points to meet specific boundary conditions, the spline assumes a smoothly bending shape which minimizes the potential energy therein. Expressed differently, the calculated steering function of the present invention can be analogized to a force function which is applied to a particle moving in space. This force function "steers" the particle from an initial specified position to a final position using a minimal amount of energy. The unique trajectory and the parametric steering function generated according to this criteria will, when dynamically applied to an initial state vector, map a series of points that define a unique and particularly smooth spacial form between end points.

The initial state vector indicates the condition, or state of the spacial form at an initial position, and the final state vector indicates the state of the spacial form at a final position. In addition to the coordinates, the initial and final state vectors may also include other boundary condition information such as slope. For example, in a three-dimensional space defined by the cartesian coordinates, X, Y and Z, the initial state vector includes elements which specify the coordinates of a point on the spacial form and the slope at that point. During the state transition which occurs when the steering function is dynamically applied, the values of these elements are changed as a function of time to map a series of points in the cartesian coordinate system. In practice, the state transition is performed by digital calculating equipment in an iterative process and the series of points are very closely spaced to define a smooth spacial form within preselected chordal error requirements.

Unlike prior contour generators which are constrained to generate preselected geometric shapes, a function generator according to the present invention is constrained only by a preselected smoothness criteria. Therefore, instead of concatenating selected geometric shapes such as circles, straight lines, parabolas, etc., it is a general object of the present invention to connect a given set of data points with a smooth curve that satisfies any number of specified boundary conditions. For example, if the slope at one or more data points is specified, the function generator not only connects the data points with a smooth "minimum energy" curve, but also satisfies the specified slopes. First and higher order derivatives need not be specified and discontinuities in the first or higher order derivatives can be specified.

A more specific object of the invention is to provide a method and means of generating spacial forms which can be implemented using conventional hardwired logic circuits or a general purpose digital computer. The dynamic application of the steering function to the initial state vector is performed in an iterative process which is particularly suited for digital computation means. Each iteration involves the application of the parametric steering function to the state vector to cause a finite change in the magnitude of its elements. Iterations continue until the desired state transition has been made and the final state vector is generated. For example, if the parametric steering function is expressed as $F_{x,y,z}^{(i)}$, its dynamic application is defined by the following finite difference formulation:

$$\begin{pmatrix} X_{i+1} \\ \Delta_1 X_{i+1} \\ Y_{i+1} \\ \Delta_1 Y_{i+1} \\ Z_{i+1} \\ \Delta_1 Z_{i+1} \end{pmatrix} = \begin{bmatrix} 1 & 1 & 0 & 0 & 0 & 0 \\ 0 & 1 & 0 & 0 & 0 & 0 \\ 0 & 0 & 1 & 1 & 0 & 0 \\ 0 & 0 & 0 & 1 & 0 & 0 \\ 0 & 0 & 0 & 0 & 1 & 1 \\ 0 & 0 & 0 & 0 & 0 & 1 \end{bmatrix} \begin{pmatrix} X_i \\ \Delta_1 X_i \\ Y_i \\ \Delta_1 Y_i \\ Z_i \\ \Delta_1 Z_i \end{pmatrix} + \begin{bmatrix} 0 & 0 & 0 \\ 1 & 0 & 0 \\ 0 & 0 & 0 \\ 0 & 1 & 0 \\ 0 & 0 & 0 \\ 0 & 0 & 1 \end{bmatrix} \begin{pmatrix} F_{x_i} \\ F_{y_i} \\ F_{z_i} \end{pmatrix}$$

where:

$X_0, \Delta_1 x_0, Y_0, \Delta_1 y_0, Z_0, \Delta_1 z_0$ = elements of the initial state vector $X_i, Y_i, Z_i$ = coordinates of the trajectory after $i$ computations, or iterations of the equation $\Delta_1 X_i, \Delta_1 Y_i, \Delta_1 Z_i$ = change in the coordinate values during the ith iteration $Fx_i, Fy_i, Fz_i$ = magnitude of the steering function during the ith iteration Another object of the invention is to provide a means of calculating and generating the steering function ($Fxyz$). The elements of a steering vector are calculated in a preprocessor from the set of received data and the steering function is generated therefrom in an iterative process. The steering function is generated in what is termed herein an adjoint interpolator. The function performed by the adjoint interpolator for each coordinate is expressed by the following equation.

$Fx_{i+1} = \phi x_{i+1} - \theta x_{i+1}$ where:

$$\begin{pmatrix} \theta x_{i+1} \\ \phi x_{i+1} \end{pmatrix} = \begin{bmatrix} 1 & 0 \\ -1 & 1 \end{bmatrix} \begin{pmatrix} \theta x_i \\ \phi x_i \end{pmatrix}$$

Another object of the invention is to both generate the steering function from the steering vector and dynamically apply it to the initial state vector in a single iterative process. This is accomplished by what is termed herein a mapping interpolator. In the mapping interpolator the steering function is both implicitly generated and dynamically applied to the state vector. The elements of both the initial state vector and the steering vector are calculated in the preprocessor and combined to form a complex state vector. The mapping interpolar operates to iteratively perform a state transition on the complex state vector and to thereby map a series of points that define the spacial form. The function performed by the mapping interpolator for each axis is expressed by the following finite difference formulation:

$$\begin{pmatrix} X_{i+1} \\ \Delta_1 X_{i+1} \\ \theta x_{i+1} \\ \phi x_{i+1} \end{pmatrix} = \begin{bmatrix} 1 & 1 & 0 & 0 \\ 0 & 1 & -1 & 1 \\ 0 & 0 & 1 & 0 \\ 0 & 0 & -1 & 1 \end{bmatrix} \begin{pmatrix} X_i \\ \Delta_1 X_i \\ \theta x_i \\ \phi x_i \end{pmatrix}$$

Another object of the invention is to provide a preprocessor which generates a complex state vector for the mapping interpolator.

Still another object of the invention is to provide an improved method and means of generating a path in three-dimensional space. The mapping interpolator is divided into three sections, one for each axis of motion. Each section of the mapping interpolator receives a four-element complex state vector and maps a series of coordinate values, one point for each iteration of the mapping interpolator. The three resulting digital signals are converted to analog signals to drive the servomechanisms on a machine. A three-dimensional trajectory is thus generated from an initial twelve-element complex state vector.

Another object of the invention is to provide a preprocessor which generates a twelve-element complex state vector that defines a path in three-dimensional space.

Still another object of the invention is to provide an improved method and means of generating a surface in a three-dimensional space. The surface is treated as a series of trajectories closely spaced between a pair of boundary trajectories which define opposing edges of the surface. A forty-eight element surface state vector calculated by the preprocessor defines the surface between these opposing edges. Successive trajectories on the surface are generated by selecting twelve elements from this surface state vector and applying them to the mapping interpolator. The entire surface state vector is then altered a finite amount and a new set of twelve elements are thus produced from which the next trajectory on the surface is generated. The process repeats until the entire surface between the opposing boundary trajectories is generated. The finite alteration, or state transition, of the surface state vector is also performed by the mapping interpolator, thus minimizing the amount of hardware or software required to generate the surface.

Another object of the invention is to provide a preprocessor which generates a forty-eight element surface state vector that defines a surface in three-dimensional space.

Still another object of the invention is to provide a method and means of defining a spacial form with a minimal amount of input data. A path, or trajectory is specified by a twelve-element vector, and a surface is specified by a forty-eight element vector. These vectors may be precalculated and stored on magnetic, or punched paper tape for future use.

Still another object of the invention is to reduce the amount of hardware and software necessary to generate a spacial form from a set of input data. A single mapping interpolator operates to generate both complex trajectories and complex surfaces in three-dimensional space. The complex state vector of the surface state vector may be precalculated in a separate hardwired logic circuit or in a general purpose computer.

The foregoing and other objects and advantages of the invention will appear from the following description. In the description reference is made to the accompanying drawings which form a part hereof and in which there is shown by way of illustration a number of preferred embodiments of the invention. Such embodiments do not necessarily represent the full scope of the invention, and reference is made to the claims herein for interpreting the breadth of the invention.

GENERAL DESCRIPTION OF THE INVENTION

Figure 1:
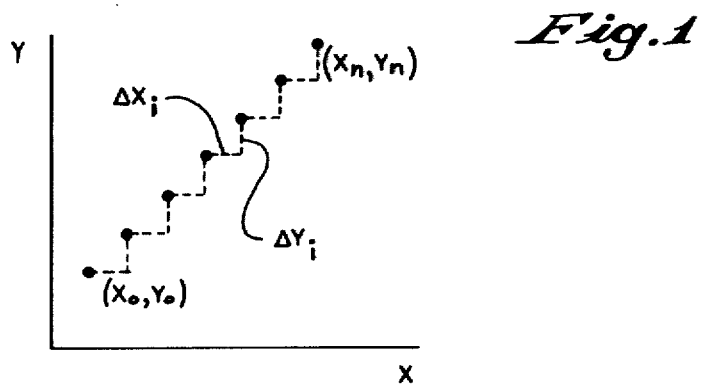
FIGS. 1–6 are graphic illustrations used as aids in visualizing the concepts of the invention.

Interpolation relates generally to the process of connecting points with a curve, and the need for a system which interpolates arises when a curve or other spacial form must be "described" to a machine in such a way that it may be accurately reproduced. In the case of numerically controlled milling machines, for example, an interpolation system is required to reproduce parts by controlling the motion of a cutter through a work piece where the part which the cutter is to form is described by a limited set of input data. The output from any interpolation process will not, in general, be an exact replica of the described spacial form since a finite amount of data cannot, except in special cases, completely describe it. Hence, the result of the interpolation process is an approximation and the quality of the process is judged by the accuracy with which it fills the coordinate information between data points.

The interpolation process of the present invention utilizes as a description a sequence of sample data points which are taken from the spacial form. This "descriptive" data is then operated upon by what is referred to herein as a "preprocessor" to produce a set of controlling parameters which are referred to in the following analysis as vector elements. In the case of two- and three-dimensional paths, the descriptive data is preprocessed to provide a set of controlling parameters which are referred to collectively as a complex state vector, and in the case of a three-dimensional surface, the data which describes the surface to the preprocessor is reduced to a set of controlling parameters which are referred to collectively as a surface state vector. In either case, the preprocessor operates on the input data describing the spacial form to generate a set of controlling parameters which contain in a very concise and efficient form the information necessary to reproduce the spacial form.

To reproduce the spacial form, the invented interpolation process utilizes a unique function generator which operates in conjunction with the preprocessor. In addition to control circuitry, this function generator includes a "forced" linear interpolator which is referred to herein as a dynamic interpolator, and a second interpolator which is referred to as an adjoint interpolator. These two interpolators are referred to collectively as the mapping interpolator. As will become apparent from the description which follows, the mapping interpolator receives the controlling parameters generated by the preprocessor and iteratively reproduces the spacial form from them. Therefore, whereas the sample data applied to the preprocessor is said to "describe" the spacial form which is to be reproduced, the complex state vector, or surface state vector generated by the preprocessor is said to "define" the spacial form.

The following description of the invention is given in the context of Modern Control Theory in which curves and other spacial forms are treated as trajectories. The invented interpolation process is viewed as a linear dynamic system and is expressed using finite difference equations.

As is known, a two-dimensional straight line interpolation process may be represented by the following finite difference formulation:

$$(1) \quad \begin{pmatrix} x_{i+1} \\ \Delta_1 x_{i+1} \\ y_{i+1} \\ \Delta_1 y_{i+1} \end{pmatrix} = \begin{bmatrix} 1 & 1 & 0 & 0 \\ 0 & 1 & 0 & 0 \\ 0 & 0 & 1 & 1 \\ 0 & 0 & 0 & 1 \end{bmatrix} \begin{pmatrix} x_i \\ \Delta_1 x_i \\ y_i \\ \Delta_1 y_i \end{pmatrix}$$

where:

$i$ = an integer $0 \leq i \leq n$ $n$ = granularity number, or number of iterations required to transform the initial state vector to the final state vector $x_i, \Delta_1 x_i, y_i, \Delta_1 y_i$ = the elements of the state vector after $i$ iterations of the equation $x_{i+1}, \Delta_1 x_{i+1}, y_{i+1}, \Delta_1 y_{i+1}$ = the elements of the state vector after $i+1$ iterations of the equation The same straignt line interpolator is expressed in less compact form by the following equations.

$x_{i+1} = x_i + \Delta_1 x_i$
$\Delta_1 x_{i+1} = \Delta_1 x_i$
$y_{i+1} = y_i + \Delta_1 y_i$
$\Delta_1 y_{i+1} = \Delta_1 y_i$ Referring to FIG. 1, such a linear interpolation process may be implemented using digital computation equipment which generates the coordinate values $(x, y)$ of a series of n equally spaced points between an initial data point $(x_0, y_0)$ and a final data point $(x_n, y_n)$. The rate of change $(\Delta_1 x, \Delta_1 y)$ of the coordinate values $(x, y)$ remains constant during the interpolation process and a straight line is thus generated.

Figure 2:
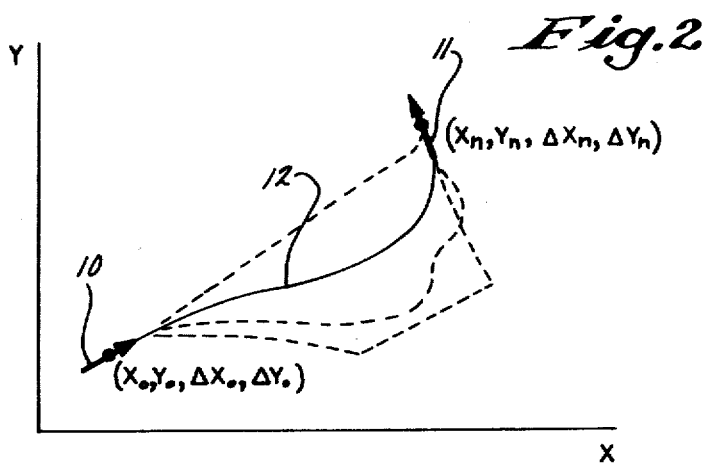

In contast, a forced or dynamic interpolation process according to the present invention may be expressed by the following finite difference equation which includes the linear interpolator of equation (1) plus a steering function.

$$(2) \quad \begin{pmatrix} x_{i+1} \\ \Delta_1 x_{i+1} \\ y_{i+1} \\ \Delta_1 y_{i+1} \end{pmatrix} = \begin{bmatrix} 1 & 1 & 0 & 0 \\ 0 & 1 & 0 & 0 \\ 0 & 0 & 1 & 1 \\ 0 & 0 & 0 & 1 \end{bmatrix} \begin{pmatrix} x_i \\ \Delta_1 x_i \\ y_i \\ \Delta_1 y_i \end{pmatrix} + \begin{bmatrix} 0 & 0 \\ 1 & 0 \\ 0 & 0 \\ 0 & 1 \end{bmatrix} \begin{pmatrix} Fx_i \\ Fy_i \end{pmatrix}$$

where:

$Fx_i$ = the $x$ component of a steering function after $i$ iterations $Fy_i$ = the $y$ component of the steering function after $i$ iterations When expressed in less compact form, the dynamic interpolation process is as follows:

$x_{i+1} = x_i + \Delta_1 x_i$
$\Delta_1 x_{i+1} = \Delta_1 x_i + Fx_i$
$y_{i+1} = y_i + \Delta_1 y_i$
$\Delta_1 y_{i+1} = \Delta_1 y_i + Fy_i$ It should be noted that the rate of change $(\Delta x, \Delta y)$ of the coordinate variables $(x, y)$ is no longer constant, but instead is altered a finite amount by the steering function $F(x, y)$ during each iteration of the interpolator. A curved trajectory which is continuous to the first derivative results and the shape of the resulting special form between the data points is, therefore, determined by the steering function $F(x, y)$. Referring to FIG. 2, for example, if the slope at the initial data point is indicated by a vector 10 and the slope at the final data point is indicated by a vector 11, the data points may be connected by any one of a number of trajectories which satisfy the boundary conditions. In other words, there is a large set of forcing functions $F(x, y)$ which will "steer" the linear interpolator of equation (1) to meet the specified boundary conditions. However, a function generator according to the present invention operates to generate a trajectory between the specified set of data points which is unique among the many possible trajectories that satisfy the boundary conditions. This unique trajectory is defined by placing a nongeometric constraint, termed herein a "minimum energy smoothness constraint" on the steering function $F(x, y)$. The resulting trajectory is particularly smooth and is termed herein the optimal trajectory.

If the linear interpolation process is analogized to a particle moving in free space, and the steering function $F(x, y)$ is analogized to a force applied to the particle to deflect it from its otherwise straight trajectory, the minimum energy constraint requires that a minimal amount of energy be expended in steering the particle from the initial boundary conditions to the final boundary conditions. Both the steering function and the trajectory which result from this constraint are unique for any given set of boundary conditions and such a minimum energy trajectory is indicated in FIG. 2 by the line 12. It can be shown that the minimum energy trajectory is not only a particularly smooth and pleasing trajectory, but that it is endowed with a much more important property — the property of best approximation.

Using the example trajectory of FIG. 3 which is described by a set of four data points $P_A$, $P_B$, $P_C$ and $P_D$, the steering function $F(x, y)$ which provides the best approximation of the desired trajectory is derived as follows. If the actual trajectory to be reproduced is represented by the vector function $X_i$ and the trajectory generated by the interpolation system is represented by the vector function $X'_i$, the approximation error is given by the following equation:

$$(3) \quad e = \sum_{i=0}^{n} \| X_i - X'_i \|^2 = \sum_{i=0}^{n} (x_i - x'_i)^2 + (y_i - y'_i)^2$$

where:

$x, x', y, y'$ represent the elements of the vector function $X$

The objective is, therefore, to provide an interpolating system in which the approximation error ($e$) is minimized. Since the only knowledge that the interpolation system has concerning the actual spacial form is limited to that at the sample points $P_A$–$P_B$, it would at first appear that any continuous function passing through the sample points would be equally likely, or probable to produce zero error. However, it can be shown by rigorous mathematical proof, that the average error can be minimized by the minimum energy principle. That is, the continuous function which results in the least average error may be determined by minimizing the following expression:

(4)
$$E = \sum_{i=0}^{n} [Fx_i^2 + Fy_i^2]$$

where: E may be thought of as the energy required to steer a particle through space The optimal steering function $F(x, y)$ which results from the minimum energy criteria can be shown to be unique and the trajectory which results can be shown to be the best approximation of the desired trajectory in the sense of equation (3). Also, it can be shown that the resulting interpolation process is convergent and, therefore, if a new sample point is added, the approximation error is further reduced. Hence, any accuracy may be achieved with the invented interpolation process by taking a sufficient number of samples. This is not true of all interpolation techniques.

The derivation of the optimal steering function is obtained by the methods of least squares theory for linear dynamic systems. Because $x_i$ and $y_i$ are uncoupled in equation (2) and because the $Fx_i$ and $Fy_i$ component of equation (4) may be minimized separately, each axis may be treated separately and equation (2) reduces to the following equation (5) for $z$ and a similar equation for $y$.

(5)
$$\begin{pmatrix} x_{i+1} \\ \Delta_1 x_{i+1} \end{pmatrix} = \begin{bmatrix} 1 & 1 \\ 0 & 1 \end{bmatrix} \begin{pmatrix} x_i \\ \Delta_1 x_i \end{pmatrix} + \begin{bmatrix} 0 \\ 1 \end{bmatrix} Fx_i$$

In essence, the derivation of the x component of the steering function $F(x, y)$ involves the construction of a "generalized inverse", which maps a state transition into a forcing function. Referring to the example trajectory in FIG. 3, the $x$ component of the optimal steering function which results for the line segment L, connecting the data points $P_A$ and $P_B$ is as follows:

(6)
$$Fx_i = \Omega^T \Phi^T_{[n_a, i+1]} \left[ \sum_{\sigma=n_a}^{n_b-n_a-1} \Phi_{[n_a, \sigma+1]} \Omega \Omega^T \Phi^T_{[n_a, \sigma+1]} \right]^{-1} (\Phi_{[L_1]} x_a - x_b)$$

where:
$x_a, x_b$ = coordinate value at points $P_A$ and $P_B$
$n_a, n_b$ = value of the iteration index ($i$) at points $P_A$ and $P_B$ $$\Phi_{[L_1]} = \begin{bmatrix} 1 & 1 \\ 0 & 1 \end{bmatrix}^{(n_a - n_b)}$$

$$\Phi^T_{[L_1]} = \begin{bmatrix} 1 & 0 \\ 1 & 1 \end{bmatrix}^{(n_a - n_b)} \quad \Omega = \begin{bmatrix} 0 \\ 1 \end{bmatrix} \quad \Omega^T = \begin{bmatrix} 0 & 1 \end{bmatrix}$$

This rather forbidding function, however, may be reduced to the following form.

(7) $Fx_i = \Omega^T \Phi^T_{[n_a, i+1]} Z$ where: $Z = \begin{pmatrix} \theta x \\ \phi x \end{pmatrix}$ = a unique vector for the line segment $L_1$ Equation (7) may be written in finite difference form as follows:

$$Z_{i+1} = \Phi^T_{[0, 1]} Z_i = \begin{bmatrix} 1 & 0 \\ -1 & 1 \end{bmatrix} \begin{pmatrix} \theta x_i \\ \phi x_i \end{pmatrix}$$

$$Fx_{i+1} = \Omega^T \Phi^T_{[0, 1]} \begin{pmatrix} \theta x_i \\ \phi x_i \end{pmatrix}$$

$$Fx_{i+1} = \Omega^T \begin{bmatrix} 1 & 0 \\ -1 & 1 \end{bmatrix} \begin{pmatrix} \theta x_i \\ \phi x_i \end{pmatrix}$$

where:

$$\theta x_0 = \frac{1}{a(2n^3 + 3n^2 + n)/6 - b(n^2 + n)/2} \quad (8)$$

$$\phi x_0 = \frac{1}{-a(n^2 + n)/2 + bn}$$

$a = x_n - n\Delta_1 x_n - x_0$
$b = \Delta_1 x_n - \Delta_1 x_0$
$\Delta_1 x_0$ = slope at initial point
$\Delta_1 x_n$ = slope at final point
$x_0, x_n$ = coordinates at end points In other words, the steering function is expressed as follows:

$$Fx_{i+1} = \begin{bmatrix} 1 & 0 \\ -1 & 1 \end{bmatrix} Fx_i = \begin{bmatrix} \theta x_{i+1} \\ \phi x_{i+1} \end{bmatrix} = \begin{bmatrix} 1 & 0 \\ -1 & 1 \end{bmatrix} \begin{pmatrix} \theta x_i \\ \phi x_i \end{pmatrix}$$

where:
$\theta x_0$ and $\phi x_0$ are the initial conditions as calculated according to equation (8)

Substituting $Fx_i$ into equation (5) the following results.

(10)
$$\begin{pmatrix} x_{i+1} \\ \Delta_1 x_{i+1} \end{pmatrix} = \begin{bmatrix} 1 & 1 \\ 0 & 1 \end{bmatrix} \begin{pmatrix} x_i \\ \Delta_1 x_i \end{pmatrix} + \begin{bmatrix} 1 & 0 \\ -1 & 1 \end{bmatrix} \begin{pmatrix} \theta x_i \\ \phi x_i \end{pmatrix}$$

The steering function $F(x, y)$, may be generated in a separate iterative process from an initial steering vector, the elements of which are $\theta x_0, \phi x_0, \theta y_0, \phi y_0$. In such case, the elements of the steering vector are first calculated in the preprocessor from the specified boundary conditions and the steering function $F(x, y)$ is then generated as a function of time in the adjoint interpolator. The output of the adjoint interpolator is either applied directly to the dynamic interpolator or it is stored in a memory device or on a recording medium.

An alternative and more desirable approach, however, is to combine the process of generating the steering function $F(x, y)$ with the dynamic interpolation process. In other words, by combining the matrices of equation (10) into a composite matrix, the function generator portion of the interpolation process may be expressed as follows:

(11)
$$\begin{pmatrix} x_{i+1} \\ \Delta_1 x_{i+1} \\ \theta x_{i+1} \\ \phi x_{i+1} \end{pmatrix} = \begin{bmatrix} 1 & 1 & 0 & 0 \\ 0 & 1 & -1 & 1 \\ 0 & 0 & 1 & 0 \\ 0 & 0 & -1 & 1 \end{bmatrix} \begin{pmatrix} x_i \\ \Delta_1 x_i \\ \theta x_i \\ \phi x_i \end{pmatrix}$$

$$\begin{pmatrix} y_{i+1} \\ \Delta_1 y_{i+1} \\ \theta y_{i+1} \\ \phi y_{i+1} \end{pmatrix} = \begin{bmatrix} 1 & 1 & 0 & 0 \\ 0 & 1 & -1 & 1 \\ 0 & 0 & 1 & 0 \\ 0 & 0 & -1 & 1 \end{bmatrix} \begin{pmatrix} y_i \\ \Delta_1 y_i \\ \theta y_i \\ \phi y_i \end{pmatrix}$$

where:

$x_0, \Delta_1 x_0, \theta x_0, \phi x_0, y_0, \Delta_1 y_0, \theta y_0$ and $\phi y_0$ are the controlling parameters precalculated in the preprocessor.

In this form the steering function is generated along with the trajectory, and the function generator defined by equation (11) is easily implemented using either hardware or software techniques. The resulting interpolation system is thus comprised of a preprocessor which supplies a set of complex state vectors to the function generator which in turn connects each data point on the trajectory defined by the preprocessor with an optimal curve. A new complex state vector is picked up by the function generator at each data point and the resulting output is a minimum energy curve which passes through successive data points. The interpolation process is performed simultaneously for each axis of motion to provide simultaneous control of each axis of motion on the servo system to which the interpolator is connected.

In the above discussion, it was assumed that the slopes of the optimal trajectory were known at its end points. In general, such information is not available and hence equation (7) may not be used for the determination of $Z_0$. Although it is possible to couple the equivalents of equation (7) for each segment, and to thereby develop a set of equations leading to a solution, the resulting method is rather clumsy to implement because it leads to a set of recursive relations which are difficult to implement with digital computation machinery and nearly impossible to implement with hardware.

It is a further discovery of the present invention, however, that there exists an iterative process which is easily implemented in either software or hardware and which gives an initial complex state vector without requiring the knowledge of the slope of the actual trajectory. This iterative process is termed herein the "forward sweep process", and in essence, it involves a trial solution using the composite transition matrix of equation (11) and an initial complex state vector having trial, or estimated, values for its unknown elements.

This forward sweep process is basically a function of the preprocessor, although a mapping interpolator may be used to perform the trial forward sweep which is necessary to calculate the unknown complex state vector elements. Referring to FIGS. 3 and 4, for example, the determination of the initial complex state vectors for each of the data points $P_A-P_D$ is possible with the present invention even though only the coordinate values of the four data points are known. This determination is made in the preprocessor which calculates optimal intial complex state vectors for the data points $P_A$, $P_B$ and $P_C$ which when applied to the mapping interpolator, produce the connecting line segments $L_1$, $L_2$ and $L_3$. In order to calculate the values of the unknown vector elements, certain important properties exhibited by the complex state vector as it is swept forward through the respective data points by the mapping interpolator must be observed. For example, the elements $x$ and $\Delta_1 x$ of the complex state vector are continuous as the complex state vector is swept through the interior sample points $P_B$ and $P_C$. Therefore, when the mapping interpolator is generating an optimal trajectory only the $\theta x_0$ and $\phi x_0$ elements need be modified at the beginning of each of the trajectory segments $L_2$ and $L_3$. Furthermore, a rigorous analysis of optimality using equations (5) and (7) demonstrates some other valuable properties, and specifically that the behavior of the $\phi x$ element depends on the nature of the data point. For example, the behavior of the $\phi x$ element at a data point depends on whether the trajectory is continuous at the data point, whether the data point is at the beginning or end of a continuous trajectory, or whether the slope of the trajectory to the left of the data point is different from that to the right of the data point. Another type of situation is that in which the trajectory is continuous at the data point but the slope has been specified. Such a point is treated in the same manner as a discontinuity. The following table illustrates the properties exhibited by the $\phi$element of the complex state vector at each of these various types of sample points.

| TYPE OF POINT | BEHAVIOR OF $\phi x_i$ ELEMENT FOR AN OPTIMAL TRAJECTORY |
|---|---|
| 1. Interior | $\phi x_i$ RIGHT = $\phi x_i$ LEFT |
| 2. End | $\phi x_i = 0$ |
| 3. Discontinuous | |
| a) Slope specified on RIGHT (LEFT) | $\phi x_i$ FREE on RIGHT or (LEFT) |
| b) Slope free on RIGHT (LEFT) | $\phi x_i = 0$ on RIGHT or (LEFT) |

With this information and equation (11) it is possible to solve for all of the complex state vector elements at each data point either with or without slope specifications. In essence this is accomplished by a trial forward sweep in which the "free" element, $\Delta_1 x$ or $\phi x$, is guessed at the initial data point $P_A$, and the $\theta x$ element is calculated such that the line segment $L_1$ will pass through the next data point $P_B$ in the required number of iterations. At the second data point $P_B$ (which is assumed to be an interior point) the vector elements $x$, $\theta_1 x$ and $\phi x$ for the initial complex state vector of the next line segment $L_2$ are set equal to those of the final complex state vector of the first line segment $L_1$. Again, the value of the $\theta x$ element for the second line segment is calculated such that the second line segment $L_2$ hits the next data point $P_C$ in the desired number of iterations and the process is repeated until the trajectory reaches the end point $P_D$. At the end point the value of the $\phi x$ element is examined. In general, it will not be zero as is required by the optimality conditions given in the above table, and based on this discrepancy, the guessed value of the free element ($\Delta_1 x$ or $\phi x$) at the initial data point $P_A$ is replaced with a value which will satisfy the optimality conditions.

Figure 3:
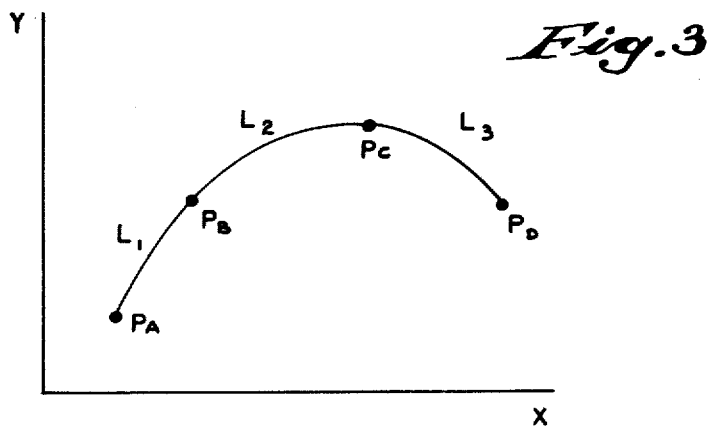
Figure 4:
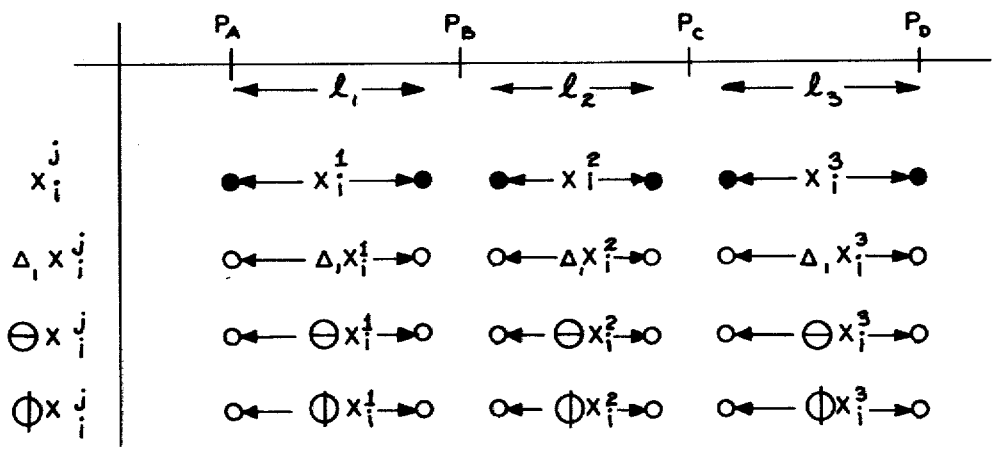

Referring specifically to FIG. 4 which relates to the example of FIG. 3, the known boundary conditions (coordinate values) at each of the data points $P_A$–$P_D$ are indicated by the solid circles and the remaining elements of the complex state vectors at each point are indicated by the open circles. In the example of FIG. 4 and in the following discussion, the subscript $i$ associated with each vector element is the iteration index which ranges from zero to $n$ over each line segment and the superscript $j$ is an integer which ranges from $l$ to $m$ over the entire trajectory. The value of $n$ is calculated in the preprocessor by a granularity computer which will be described below, and the value of $m$ is equal to one less than the number of specified data points on the trajectory. Since the slopes ($\Delta_1$ elements) are not specified at the end points of trajectory in FIG. 3, the $\phi$ element at the initial data point $P_A$ is zero as required by the second optimality condition in the above table. Therefore, by temporarily assigning a value to the element $\Delta_1 x_0^{\,1}$ at point $P_A$ (for example, zero) the value of $\theta x_0$ at point $P_A$ may be calculated using the following equation which is derived from equation (11).

$$\theta x_0^{\,1} = 1/a\ [x_0^{\,2} - x_0^{\,1} + n\Delta_1 x_0^{\,1} + b\phi x_0^{\,1}]$$

(12)

where:
$\phi x_0^{\,1} = 0$
$a = n/6\,(n-1)(n+1)$
$b = n/2(n-1)$

The resulting trial initial complex state vector at the point $P_A$ may then be "swept forward" to the point $P_B$ by applying the transition matrix of equation (11) $n$ times. However, since it is the value of the elements of the complex state vector at the end of the line segment $L_1$ that is desired, it is unnecessary to generate the points along the path during the forward sweep process. Therefore, the elements of the complex state vector at the end of the line segment $L_1$ may be calculated directly using the following equation, which is the "closed" form of the transition matrix of equation (11).

(13)

$$\begin{pmatrix} x_n^{\,1} \\ \Delta_1 x_n^{\,1} \\ \theta x_n^{\,1} \\ \phi x_n^{\,1} \end{pmatrix} = \begin{bmatrix} 1 & n & a & b \\ 0 & 1 & c & n \\ 0 & 0 & 1 & 0 \\ 0 & 0 & -n & 1 \end{bmatrix} \begin{pmatrix} x_0^{\,1} \\ \Delta_1 x_0^{\,1} \\ \theta x_0^{\,1} \\ \phi x_0^{\,1} \end{pmatrix}$$

where:
$a = -n/6(n=1)(n+1)$
$b = n/2(n-1)$
$c = n/2(n+1)$

For continuity and minimum energy considerations, the elements $x_0^{\,2}$, $\Delta_1 x_0^{\,2}$, and $\phi x_0^{\,2}$ of the initial complex state vector for the subsequent line segment $L_2$ are chosen to be the same as the elements $x_n^{\,1}$, $\phi_1 x_n^{\,1}$ and $\phi x_n^{\,1}$ of the final complex state vector for the line segment $L_1$. Therefore, the value of the remaining element, $\theta x_0^{\,2}$ may be calculated using equation (12) and the known coordinate value at the point $P_C$. The resulting complex state vector is then swept forward to the point $P_C$ and the process is repeated to sweep forward to the final point $P_D$.

The final complex state vector at the point $P_D$ will generally not satisfy the optimality condition $\phi x_n^{\,3} = 0$ because the initial trial value of $\Delta_1 x_0^{\,1}$ at the point $P_A$ was merely a guess. Therefore, a new value of $\Delta_1 x_0^{\,1}$ is chosen (for example, one) and the resulting second trial initial complex state vector is swept forward to generate a second final complex state vector at the point $P_D$. Again the element $\phi x_n^{\,3}$ will probably not be zero. However, due to the linearity of the transition matrix of equation (11), a change in the value of one of the elements of the initial complex state vector at point $P_A$ results in a proportional change in the value of the unspecified elements of the final complex state vector at point $P_D$. Therefore, the value of $\Delta_1 x_0^{\,1}$ at point $P_A$ can now be calculated using the results of the two previous trial forward sweeps and the following equation.

$$\Delta_1 x_0^{\,1} = \frac{\phi x_n^{\,3}\ (\text{first sweep})}{\phi x_n^{\,3}\ (\text{second sweep}) - \phi x_n^{\,3}\ (\text{first sweep})} \quad (14)$$

In the foregoing manner the elements of the initial complex state vector $x_0^{\,1}$, $\Delta x_0^{\,1}$, $\theta x_0^{\,1}$, $\phi x_0^{\,1}$ at the point $P_A$ are determined in the preprocessor. The process is repeated for the Y coordinate and the resulting eight-element complex state vector defines a smooth trajectory which passes through the points $P_A$, $P_B$, $P_C$ and $P_D$ and satisfies the optimality conditions. When subsequently applied to the mapping interpolator, therefore, a smooth minimum energy trajectory is generated.

A number of practical results flow from the above mathematical treatment of the invented interpolation process. First, the calculation of the initial complex state vector for each coordinate is completely decoupled, or independent, of the remaining axis or axes. Therefore, the same hardware, or software routine, may be used for each axis of motion in both the preprocessor and the function generator. The above analysis may also be extended to three-dimensional coordinate systems and may be extended to the generation of surfaces and volumes. Also, due to the simplicity of the transition matrix, the mapping interpolator is relatively fast, reliable and low in cost. The only extensive calculations involved are performed by the preprocessor and these need not be made on a "real time" basis, but may instead be made in advance and stored for later use by the mapping interpolator. Thus, when applied to a numerical control system for a machine tool, for example, the extensive calculations may be made using a general purpose digital computer and the resulting complex state vectors stored on magnetic tape. The numerical control on the machine tool need only include the mapping interpolator. Also, it may be noted that to generate a continuous minimum energy trajectory such as that illustrated in FIG. 3, only the optimal initial complex state vector at the point $P_A$ is required by the mapping interpolator. However, the $\theta$ elements at subsequent points on the trajectory must also be provided since they are not necessarily continuous. Since in a practical system it is also desirable to be able to specify discontinuities in the slope, or $\Delta_1$ elements, at subsequent data points, in the preferred embodiments of the invented preprocessor an additional forward sweep through the data points is made to generate the values of the complex state vector elements at each data point. They are stored along with the initial complex state vector at the point $P_A$ for later application to the mapping interpolator.

By performing what is referred to as a similarity transform, the transition matrix of equation (11) may be transformed into a number of equivalent forms. Such a transformation may be performed, for example, to place either the transition matrix or the elements of the initial complex state vector into a more easily calculated form. Also, as exemplified by the following discussion, a similarity transformation may place the initial state elements into a form which has physical meaning.

For example, if a similarity transformation is performed using the following transformation matrix, the $\theta$ and $\phi$ elements of the complex state vector are modified to an equivalent form which are identified hereinafter as the $\Delta_2$ and $\Delta_3$ elements.

(15)
$$T = \begin{bmatrix} 1 & 0 & 0 & 0 \\ 0 & 1 & 0 & 0 \\ 0 & 0 & -1 & 1 \\ 0 & 0 & -1 & 1 \end{bmatrix}$$

The mapping interpolator as defined by equation (11) is also changed to the following equivalent form.

(16)
$$\begin{pmatrix} x_{i+1} \\ \Delta_1 x_{i+1} \\ \Delta_2 x_{i+1} \\ \Delta_3 x_{i+1} \end{pmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix} \begin{pmatrix} x_i \\ \Delta_1 x_i \\ \Delta_2 x_i \\ \Delta_3 x_i \end{pmatrix}$$

$$\begin{pmatrix} y_{i+1} \\ \Delta_1 y_{i+1} \\ \Delta_2 y_{i+1} \\ \Delta_3 y_{i+1} \end{pmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix} \begin{pmatrix} y_i \\ \Delta_1 y_i \\ \Delta_2 y_i \\ \Delta_3 y_i \end{pmatrix}$$

where:
$x, y$ = coordinate values
$\Delta_1 x, \Delta_1 y$ = the rate of change of $x,y$ with respect to an independent variable (time)
$\Delta_2 x, \Delta_2 y$ = the rate of change of $\Delta_1 x, \Delta_1 y$ with respect to time, and
$\Delta_3 x, \Delta_3 y$ = the rate of change of $\Delta_2 x, \Delta_2 y$ with respect to time.

The closed form of this equivalent transition matrix is as follows:

(16')
$$[M] = \begin{bmatrix} 1 & n & a & b \\ 0 & 1 & n & a \\ 0 & 0 & 1 & n \\ 0 & 0 & 0 & 1 \end{bmatrix}$$

where:
$a = n(n-1)/2$
$b = n(n-1)(n-2)/6$

The elements $(x, \Delta_1 x, \Delta_2 x, \Delta_3 x, y, \Delta_1 y, \Delta_2 y, \Delta_3 y)$ of the resulting complex state vector have "physical" meaning in relation to the generated spacial form. Whereas the optimality condition discussed above required that the $\phi$ element must equal zero at the end points of the trajectory when the $\Delta_1$ element (slope) is not specified, the same is true of the $\Delta_2$ element in this transformed version of the interpolation system. Thus the optimality conditions in the above table are modified to account for the fact that:

$\Delta_2 x$ is equivalent to $\phi x$ and
$\Delta_3 x$ is equivalent to $\theta x$ In the discussion which follows the form of the transition matrix of equation (16) is used to describe the generation of closed paths and surfaces according to the present invention, but first, a second version of the forward sweep process will be described which is more practical to apply.

The invented interpolation process is a linear system and it can be shown that the values of the complex state vector elements at the initial data point on a minimum energy trajectory are linearly related to the value of the $\Delta_3$ element at the final data point on the trajectory. Accordingly, an expression can be developed which describes the relation between the initial and final states of a minimum energy curve. From this a second, more powerful, forward sweep process is easily implemented on digital computation equipment and it provides a means of determining the values of the initial complex state vector elements for any situation. To explain the second forward sweep process, the following notation is useful.

$$G = \begin{pmatrix} \Delta_1 x_0 \\ \Delta_2 x_0 \end{pmatrix}$$ values of $\Delta_1$ and $\Delta_2$ elements of initial complex state vector (either specified or guessed)

values of $\Delta_1$ and $\Delta_2$ elements of initial complex state vector (either specified or guessed)

$$\Delta G = \begin{pmatrix} d_1 \\ d_2 \end{pmatrix}$$ scaler quantities which when added to G provide the "optimal" values for the initial complex state vector elements $\Delta_1 x_0$ and $\Delta_2 x_0$ scaler quantities which when added to G provide the "optimal" values for the initial complex state vector elements $\Delta_1 x_0$ and $\Delta_2 x_0$ $$\begin{pmatrix} \Delta_1 x_n(G) \\ \Delta_2 x_n(G) \end{pmatrix}$$ values of $\Delta_1$ and $\Delta_2$ elements at end of trial forward sweep through the data points where their values at the initial data point were G values of $\Delta_1$ and $\Delta_2$ elements at end of trial forward sweep through the data points where their values at the initial data point were G $$C = \begin{pmatrix} \Delta_1 C \\ \Delta_2 C \end{pmatrix} = \begin{pmatrix} \Delta_1 x_0 \\ \Delta_1 x_0 \end{pmatrix}$$

$$E = \begin{pmatrix} \Delta_1 E \\ \Delta_2 E \end{pmatrix} = \begin{pmatrix} \Delta_1 x_0 \\ \Delta_2 x_0 \end{pmatrix}$$

Dummy vectors which are swept through the data points during the trial forward sweep $$D = \begin{pmatrix} \Delta_1 D \\ \Delta_2 D \end{pmatrix} = \begin{pmatrix} \Delta_1 x_n(C) \\ \Delta_2 x_n(C) \end{pmatrix}$$

$$F = \begin{pmatrix} \Delta_1 F \\ \Delta_2 F \end{pmatrix} = \begin{pmatrix} \Delta_1 x_n(E) \\ \Delta_2 x_n(E) \end{pmatrix}$$

Values of dummy vectors at final data point after trial forward sweep

With this notation, the following matrix Taylor series expansion of the interpolation process is derived.

$$(17) \begin{pmatrix} \Delta_1 x_n(G+\Delta G) \\ \Delta_2 x_n(G+\Delta G) \end{pmatrix} = \begin{pmatrix} \Delta_1 x_n(G) \\ \Delta_2 x_n(G) \end{pmatrix} + \begin{bmatrix} \Delta_1 x_n(C) & \Delta_1 x_n(E) \\ \Delta_2 x_n(C) & \Delta_2 x_n(E) \end{bmatrix} \begin{pmatrix} d_1 \\ d_2 \end{pmatrix}$$

From this expression a solution for the value of any element of the initial complex state vector can be derived for any type of boundary condition situation.

For example, where the trajectory is described to close upon itself, the initial and final coordinate values and slopes are the same and equation (17) can be solved for $d_1$ and $d_2$ to yield:

$$(18) \begin{pmatrix} d_1 \\ d_2 \end{pmatrix} = \left[ \begin{bmatrix} 1 & 0 \\ 0 & 1 \end{bmatrix} - \begin{bmatrix} \Delta_1 x_n(C) & \Delta_1 x_n(E) \\ \Delta_2 x_n(C) & \Delta_2 x_n(E) \end{bmatrix} \right]^{-1}$$

Where the values of the elements in the matrix are determined by sweeping the dummy vectors $$C = \begin{pmatrix} 1 \\ 0 \end{pmatrix} \text{ and } E = \begin{pmatrix} 0 \\ 1 \end{pmatrix}$$

through the specified data points and the remaining elements are determined by sweeping a complex state vector $$A = \begin{pmatrix} A \\ \Delta_1 A \\ \Delta_2 A \\ \Delta_3 A \end{pmatrix} = \begin{pmatrix} x_0 \\ G \\ \Delta_3 x_0 \end{pmatrix}$$

through the specified data points to give the final complex state vector $$B = \begin{pmatrix} B \\ \Delta_1 B \\ \Delta_2 B \\ \Delta_3 B \end{pmatrix} = \begin{pmatrix} x_n \\ \Delta_1 x_n(G) \\ \Delta_2 x_n(G) \\ \Delta_3 x_n \end{pmatrix}$$

It should be noted that in sweeping the vectors C and E forward, the coordinate elements are set to zero and hence the $\Delta_3$ elements are calculated as follows:

$\Delta_3 C = -(n\Delta_1 C + a\Delta_2 C)/b$ $\Delta_3 E = -(n\Delta_1 E + a\Delta_2 E)/b$ Equation (18) can thus be rewritten as follows:

$$(19) \begin{pmatrix} d_1 \\ d_2 \end{pmatrix} = \begin{bmatrix} 1 - \Delta_1 D & \Delta_1 F \\ \Delta_2 D & 1 - \Delta_2 F \end{bmatrix}^{-1} \begin{pmatrix} \Delta_1 B - \Delta_1 A \\ \Delta_2 B - \Delta_2 A \end{pmatrix}$$

This in turn yields the following values for the scalors $d_1$ and $d_2$, which when added to the initial trail complex state vector elements $\Delta_1 A$ and $\Delta_2 A$ provide the optimal value for these elements.

$$d_1 = \frac{(\Delta_2 B)(\Delta_1 F) - (\Delta_1 B)(\Delta_2 F - 1)}{(\Delta_1 D - 1)(\Delta_2 F - 1) - (\Delta_2 D)(\Delta_1 F)} \quad (20)$$

$$d_2 = \frac{(\Delta_2 B)(\Delta_1 1) - 1 - (\Delta_1 B)(\Delta_2 D)}{(\Delta_1 F)(\Delta_2 D) - (\Delta_2 F - 1)(\Delta_1 D - 1)} \quad (21)$$

In practice, round off errors associated with digital computation equipment introduce slight nonlinearities in the process and a second trail forward sweep using the corrected values of $\Delta_1 A$ and $\Delta_2 A$ has been found desirable.

With any of the remaining types of boundary condition situations either one (or both) of the $\Delta_1$ and $\Delta_2$ elements of the complex state vector is known at the endpoints of the trajectory. Therefore, equation (18) is considerably simplified and only one dummy vector C is required. These remaining situations can be categorized as follows:

$$\begin{pmatrix} \Delta_1 x_n(G) - \Delta_1 x_0 \\ \Delta_2 x_n(G) - \Delta_2 x_0 \end{pmatrix}$$

| BOUNDARY CONDITION SITUATION | SLOPE AT INITIAL POINT | SLOPE AT FINAL POINT |
|---|---|---|
| 1. | SPECIFIED | FREE |
| 2. | FREE | FREE |
| 3. | SPECIFIED | SPECIFIED |
| 4. | FREE | SPECIFIED |

For situations 1 and 3, the $\Delta_2 x_0$ element is unknown, hence, the following dummy vector C is swept forward with the vector A to yield values for the elements of vectors B and D.

$$(22) \quad C = \begin{pmatrix} \Delta_1 C \\ \Delta_2 C \end{pmatrix} = \begin{pmatrix} \Delta_1 x_0 \\ \Delta_2 x_0 \end{pmatrix} = \begin{pmatrix} 0 \\ 1 \end{pmatrix}$$

On the other hand, for situations 2 and 4, the $\Delta_1 x_0$ element is unknown and dummy vector C is as follows:

$$(22') \quad C = \begin{pmatrix} \Delta_1 C \\ \Delta_2 C \end{pmatrix} = \begin{pmatrix} \Delta_1 x_0 \\ \Delta_2 x_0 \end{pmatrix} = \begin{pmatrix} 1 \\ 0 \end{pmatrix}$$

In situations 1 and 3 where initial slope, $\Delta_1 x_0$, is specified, the $\Delta_2 x_0$ element is set at a trial value (for example, 1), whereas in situations 2 and 4, the initial value of the slope, $\Delta_1 x_0$, is set to a trail value (for example, 1). When the trial forward sweep is completed, the trail value is corrected by adding to it the scaler quantity $d_1$, which from equation (17) is determined as follows:

$$d_1 = \frac{-\Delta_2 B}{\Delta_2 D} \text{ for boundary condition situations 1 and 2} \quad (23)$$

$$d_1 = \frac{\Delta_1 B^* - \Delta_1 B}{\Delta_1 D} \text{ for boundary condition situations 3 and 4} \quad (24)$$
where $\Delta_1 B^*$ is the specified final slope As in the case of a closed trajectory discussed above, the accuracy of the second forward sweep process is substantially improved when using digital computation equipment by performing a second trail forward sweep and adjusting the value of the unknown initial complex state vector element a second time.

Summarizing to this point, two equivalent methods of generating minimum energy trajectories through an ordered set of data points has been described in general terms. In both methods a set of initial state vector elements are determined for each data point and the elements of a steering function are determined which when dynamically applied to the state vector elements, generate a minimum energy trajectory which passes through the ordered data points. In the first method, the state vector and steering vector are combined to form a complex state vector having the following set of elements for each axis of motion $x$, $\Delta_1 x$, $\theta x$ and $\phi x$. A first forward sweep process has been described which allows the unkown elements of this initial complex state vector to be easily calculated both when the slope is given at the endpoints of the trajectory, and when the slope is free at the endpoints.

In the second method, the state vector and steering vector are combined to form a complex state vector having the following set of elements for each axis of motion $x$, $\Delta_1 x$, $\Delta_2 x$ and $\Delta_3 x$. A second forward sweep process has been described for determining the values of these complex state vector elements under all boundary condition situations, including the situation in which the trajectory closes upon itself and no slopes are specified.

Figure 5:
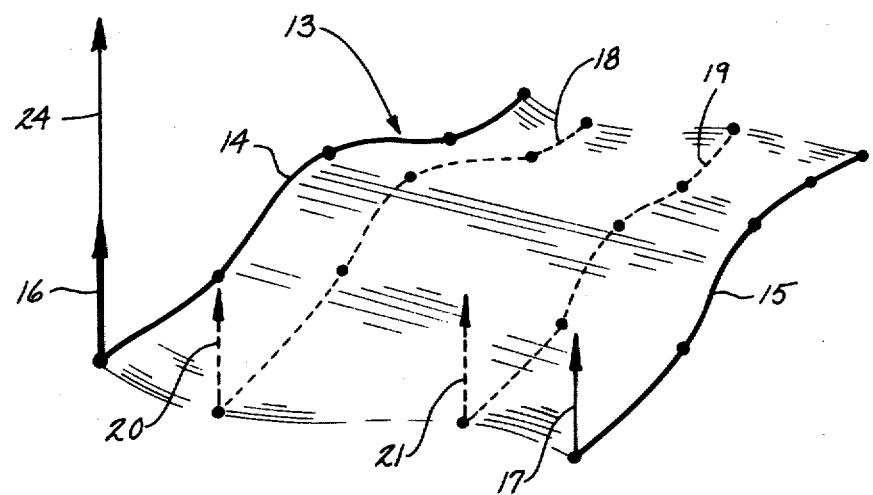

The invented interpolation method has thus far been described with respect to generating a trajectory in two dimensions. However, it can easily be extended to generate three dimensional trajectories and surfaces. Referring to FIG. 5, a surface 13 in three-dimensional space is disposed between a pair of boundary trajectories 14 and 15 which lie in two spaced planes. The initial boundary trajectory 14 is described by five data points and is defined by a twelve-element (four elements for each of three axes of motion) complex state vector indicated by the arrow 16. Similarly, the final boundary trajectory 15 is described by five data points and is defined by a twelve-element complex state vector indicated by the arrow 17.

Just as a trajectory may be described by a set of points, the surface 13 may be described by a finite set of trajectories, indicated, for example, by the two boundary trajectories 14 and 15 and the two dotted trajectories 18 and 19 in FIG. 5. The trajectories 18 and 19 run in substantially the same general direction as the boundary trajectories 14 and 15, this direction being referred to hereinafter as the "trajectory direction". Each of the trajectories 18 and 19 is described by a set of data points and each in turn is defined by a twelve-element complex state vector, 20 and 21, respectively.

The surface 13 is generated one trajectory at a time in a fashion similar to that used to mill a surface on a milling machine. That is, a succession of closely spaced trajectories are generated just as a succession of passes are taken by a cutter with respect to a workpiece to form a surface. The direction in which the surface is formed by the succession of trajectories is hereinafter referred to as the "cross section direction". It is a discovery of the present invention that the amount of data necessary to define the surface 13 may be reduced by not only interpolating between the data points in the trajectory direction, but also by interpolating between the respective complex state vectors 16, 20, 21 and 17 in the cross section direction. Just as a trajectory is generated by interpolating between data points, so a surface is generated in the cross section direction by interpolating between complex state vectors. Also, by extending the forward sweep process discussed above, a forty-eight element vector, hereinafter referred to as a surface state vector, may be calculated. Such an initial surface state vector defines the surface 13 in a very concise and efficient manner and is indicated in FIG. 5 by the arrow 24. It includes the twelve elements of the complex state vector 16 which are applied to the mapping interpolator to generate the boundary trajectory 14 and it includes thirty-six additional elements which are required to generate subsequent complex state vectors.

As indicated above, the first step in defining a surface is to describe it in terms of a set of complex state vectors located along one edge of the surface. This is accomplished by specifying the coordinate values of a grid of points on the surface and then by using the second forward sweep procedure described above to generate a set of complex state vectors such as the vectors 16, 20, 21 and 17. A similar forward sweep procedure is then used to generate a forty-eight element surface state vector such as the vector 24.

Figure 6:
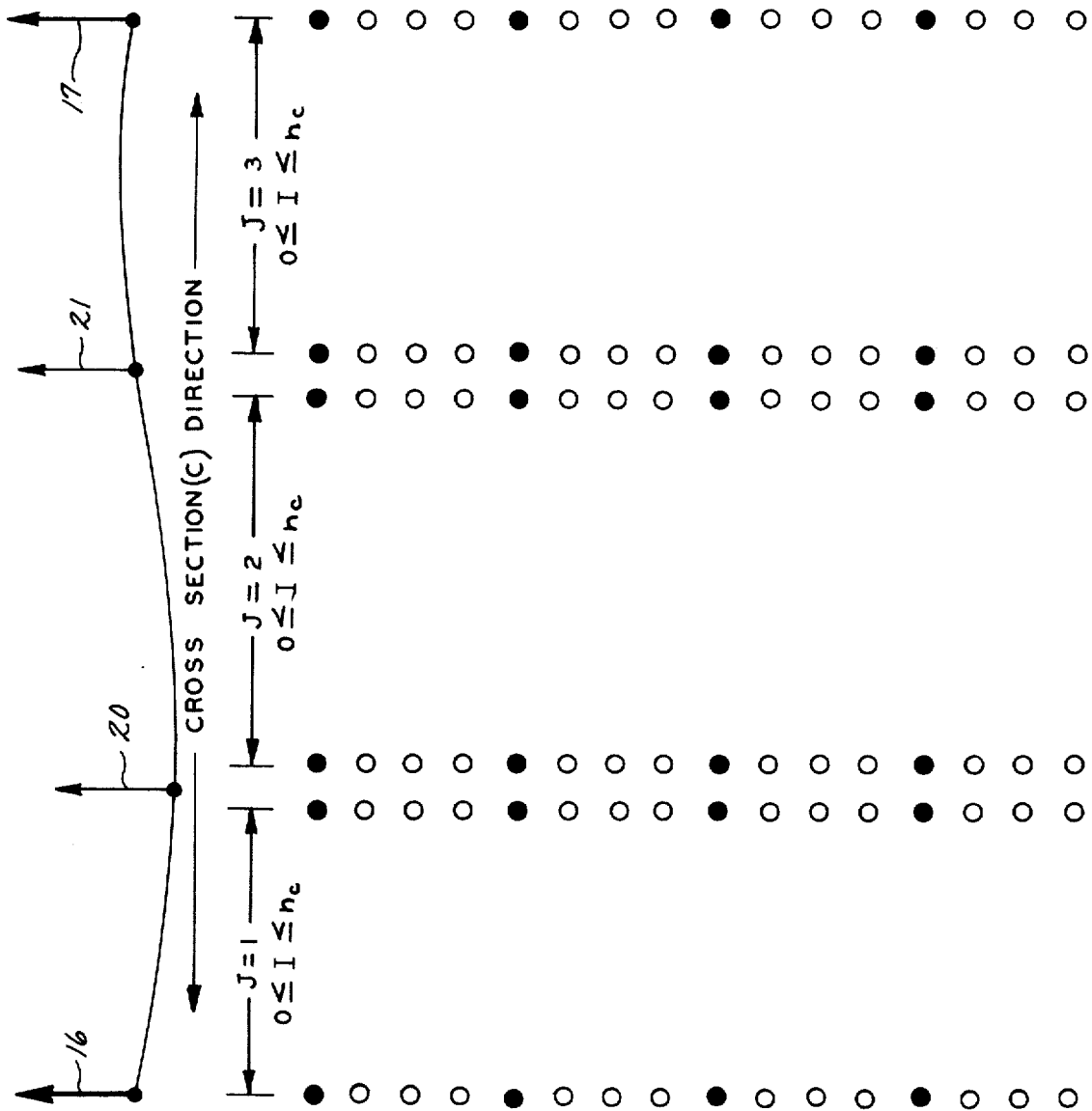

Referring to FIG. 6, for example, the $x$ axis elements of each of the complex state vectors 16, 20, 21 and 17 are known and indicated by the solid circles. The surface state vector, however, includes twelve additional unknown elements for the $x$ axis, which elements are referred to herein as $c_x$, $d_x$, $e_x$, $\Delta_1 c_x$, $\Delta_1 d_x$, $\Delta_1 e_x$, $\Delta_2 c_x$, $\Delta_2 d_x$, $\Delta_2 e_x$, $\Delta_3 c_x$, $\Delta_3 d_x$, $\Delta_3 e_x$. The values of these elements differ at various locations on the surface to reflect the change in the state of the surface. Accordingly, to identify the value of a particular vector element at a specific location on a surface or a trajectory, a uniform identification system is used hereinafter. The value and location of each element, for example the $\Delta_2 c$ element, is indicated as follows:

$$\Delta_2 C_i{}^{j,J}_{,I}$$

where:

$j$ = the line segment index in the trajectory (T) direction $J$ = the line segment index in the cross section (C) direction $i$ = the iteration, or interpolation index between data points in the trajectory (T) direction $I$ = the iteration, or interpolation index between data points in the cross section (C) direction The iteration index $i$ ranges from zero to $n_T$, where $n_T$ is a granularity number in the trajectory direction. The iteration index $I$ ranges from zero to $n_C$ where $n_C$ is a granularity number in the cross section direction. The sixteen $x$ axis elements are grouped into sets of four elements, which for purpose of the following discussion are identified as groups I–IV.

The unknown c, d and e elements in each group I–IV are calculated using the second forward sweep process discussed above. The $x$ element in each group is known at the data points of the complex state vectors 16, 20, 21 and 17 and the preprocessing problem for each group I–IV is therefore identical to that of generating a complex state vector from a set of data points in which no slopes or other boundary condition information is given. Using the forward sweep process four times, the values of the initial $c$, $d$ and $e$ elements in each of the groups I–IV are calculated in the preprocessor. The resulting sixteen element initial surface state vector for each axis of motion is stored for subsequent application to the mapping interpolator.

Interpolation in the cross section direction involves the application of the initial forty-eight element surface state vector 24 to the mapping interpolator for one iteration to generate a new forty-eight element surface state vector. The twelve elements $x$, $\Delta_1 x$, $\Delta_2 x$, $\Delta_3 x$, $y$, $\Delta_1 y$, $\Delta_2 y$, $\Delta_3 y$, $z$, $\Delta_1 z$, $\Delta_2 z$, $\Delta_3 z$ contained in the resulting new surface state vector are then extracted and applied to the mapping interpolator to generate a second trajectory immediately alongside the boundary trajectory 14. The cycle repeats, alternately performing a state transition on the surface state vector (1 iteration) in the cross section direction and then extracting and performing a state transition on a complex state vector contained therein in the trajectory direction. The surface 13 is thus generated one trajectory at a time until the boundary trajectory 15 is coompleted.

More specifically, to perform a state transition on the $x$ axis portion of the surface state vector in the cross section direction, each group I–IV of four elements is applied to the mapping interpolator and iterated once. This is indicated by the following equations.

(25)

$$\begin{pmatrix} \Delta_3 x_{I+1} \\ \Delta_3 c_{I+1} \\ \Delta_3 d_{I+1} \\ \Delta_3 e_{I+1} \end{pmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix} \begin{pmatrix} \Delta_3 x_I \\ \Delta_3 c_I \\ \Delta_3 d_I \\ \Delta_3 e_I \end{pmatrix}$$

$$\begin{pmatrix} \Delta_2 x_{I+1} \\ \Delta_2 c_{I+1} \\ \Delta_2 d_{I+1} \\ \Delta_2 e_{I+1} \end{pmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix} \begin{pmatrix} \Delta_2 x_I \\ \Delta_2 c_I \\ \Delta_2 d_I \\ \Delta_2 e_I \end{pmatrix}$$

$$\begin{pmatrix} \Delta_1 x_{I+1} \\ \Delta_1 c_{I+1} \\ \Delta_1 d_{I+1} \\ \Delta_1 e_{I+1} \end{pmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix} \begin{pmatrix} \Delta_1 x_I \\ \Delta_1 c_I \\ \Delta_1 d_I \\ \Delta_1 e_I \end{pmatrix}$$

$$\begin{pmatrix} x_{I+1} \\ c_{I+1} \\ d_{I+1} \\ e_{I+1} \end{pmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix} \begin{pmatrix} x_I \\ c_I \\ d_I \\ e_I \end{pmatrix}$$

The resulting surface state vector is temporarily stored and the four $x$ elements $x_{I+1}$, $\Delta_1 x_{I+1}$, $\Delta_2 x_{I+1}$ and $\Delta_3 x_{I+1}$ are extracted and applied to the mapping interpolator to generate a trajectory. This is performed as described above and by the following equations.

(26)

$$\begin{pmatrix} x_{I+1} \\ \Delta_1 x_{I+1} \\ \Delta_2 x_{I+1} \\ \Delta_3 x_{I+1} \end{pmatrix} \Longrightarrow \begin{pmatrix} x^j_i \\ \Delta_1 x^j_i \\ \Delta_2 x^j_i \\ \Delta_3 x^j_i \end{pmatrix}$$

$$\begin{pmatrix} x^j_{i+1} \\ \Delta_1 x^j_{i+1} \\ \Delta_2 x^j_{i+1} \\ \Delta_3 x^j_{i+1} \end{pmatrix} = \begin{bmatrix} 1 & 1 & 0 & 0 \\ 0 & 1 & 1 & 0 \\ 0 & 0 & 1 & 1 \\ 0 & 0 & 0 & 1 \end{bmatrix} \begin{pmatrix} x^j_i \\ \Delta_1 x^j_i \\ \Delta_2 x^j_i \\ \Delta_3 x^j_i \end{pmatrix}$$

where:

$i$ is indexed from $o$ to $n_T$ and $j$ is indexed from 1 to 3 (i.e., the number of line segments, L)

After the trajectory is generated, the stored surface state vector is again iterated once in the cross section direction and another trajectory is then generated. The cycle repeats until the final boundary trajectory 15 is completed.

It should be apparent to those skilled in the art that the transition matrix of equation (16) or its equivalent is repeatedly used in both the preprocessor and mapping interpolator portions of the surface generation system and that the hardware of software necessary to implement the present invention may, therefore, take a number of configurations. For example, a single hardwired circuit, or its software equivalent, may be used for each axis. The same circuit may also be used to perform the state transition in both the trajectory and cross section directions. On the other hand, to shorten computation time, a number of such circuits may be used "in parallel" to perform the state transition processes concurrently.

DESCRIPTION OF THE PREFERRED EMBODIMENTS

In the following description reference is repeatedly made to a number of subcircuits which appear in nearly all the described circuits. No invention is claimed in these subcircuits and rather than repeating their description, and thus possibly detracting from a clear understanding of the invention, these subcircuits are described once at the end of the specification under the heading "Description of the Subcircuits". These include the following:

serial full adder
serial inverter
multiplier circuit
divider circuit
square root circuit
multiplexer Also, the storage registers used in the first preferred embodiment of the invention are formed by cascade connecting four-bit shift registers which are commercially available from the Texas Instruments Company (SN 7494). Unless specifically stated otherwise, the storage registers referred to herein are 36 bits in length and the clock terminals are connected together to operate in synchronism when logic high shift pulses are applied.

The first embodiment of the invention shown in FIGS. 7-14 is a hardwired numerical control system for controlling the motion of a cutter on a milling machine. It is constructed to perform the first interpolation process and first forward sweep process discussed above. Data points are taken from either a model of an object, such as a car fender, or from a drawing of a part, such as an airplane wing. The numerical control system operates on this data to drive the servo mechanisms on the milling machine. Each trajectory defines one pass of the milling machine cutter through the workpiece and by generating a succession of trajectories, the entire part may be reproduced. It does not, however, generate an optimal surface because no attempt is made to interpolate in the cross section direction. Thus, the smoothness of the resulting surface will depend upon the judicious selection of data points for the individual trajectories. The first embodiment of the invention has particular application to the reproduction of relatively complex shapes which have heretofore commonly been machined using tracer controlled milling machines.

Figure 7:
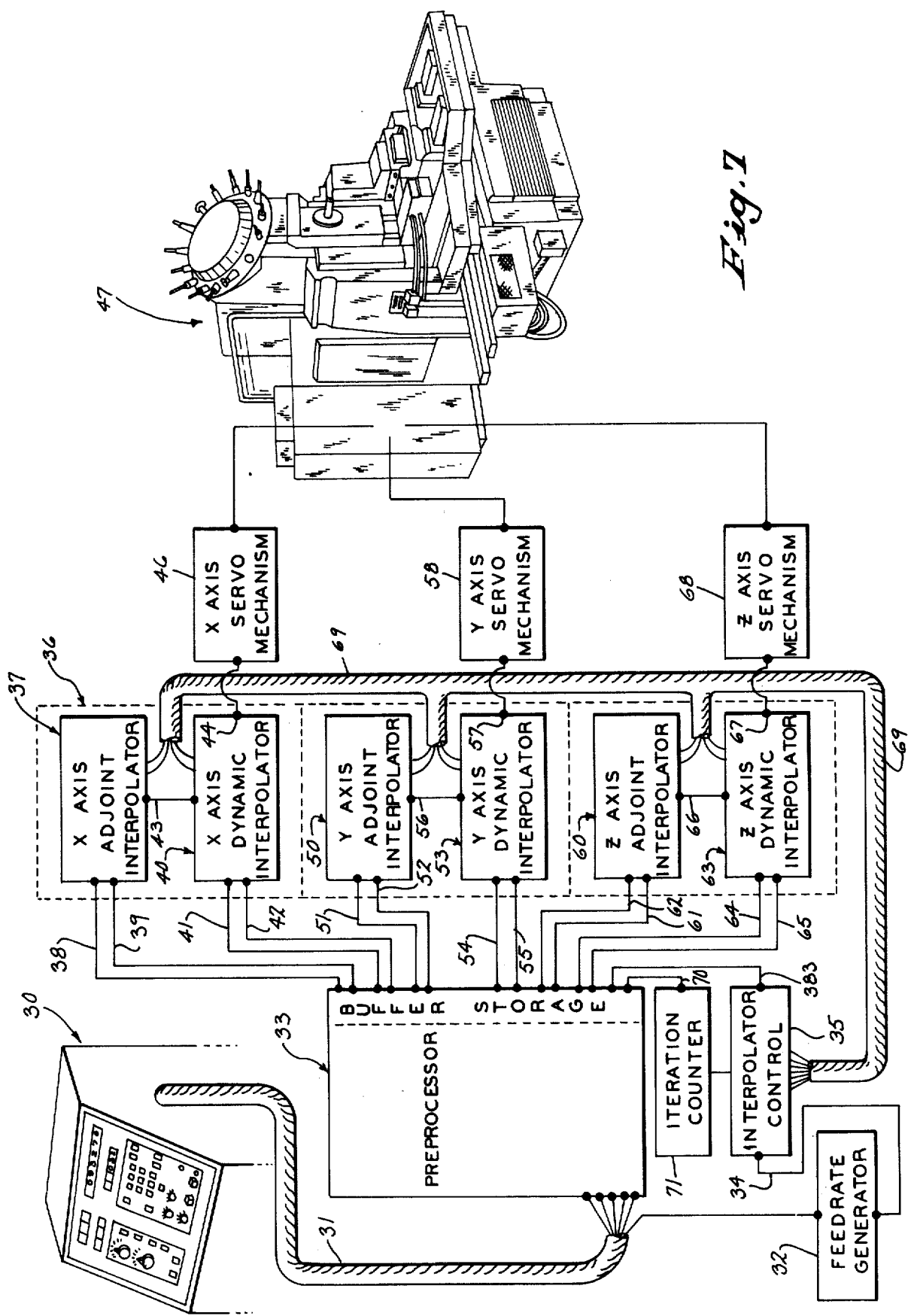
FIG. 7 is a block diagram illustrating a first embodiment of the invention which is a hardwired numerical control system.

Referring to FIG. 7, an input console 30 is connected through a cable 31 to a feedrate generator 32 and a preprocessor 33. The console 30 includes a tape reader and a keyboard, both of which are standard commercially available apparatus for entering binary coded digital data into numerical control systems. The feedrate generator 32 is similar to that disclosed in U.S. Pat. No. 3,286,085, issued on Nov. 15, 1966 and includes a feedrate command pulse generator which operates in response to a feedrate number entered through the console 30 and a feedback pulse train generated by an encoder on the machine tool. The feedrate command pulse train is generated through a lead 34 to an interpolator control circuit 35 which governs the rate at which the trajectory, or cut, is generated.

As will be described in more detail below, the preprocessor 33 receives and stores the $x$, $y$ and $z$ coordinate values of up to ten points on any one trajectory. These values are the boundary conditions of the trajectory, and are generated serially by the console 30 in two's complement form from either a magnetic tape or from data manually entered through the keyboard. The preprocessor 33 operates to calculate a twelve-element initial complex state vector which defines the trajectory, and to store this vector along with a set of calculated granularity numbers ($n$).

The trajectory is generated by a mapping interpolator which is connected to the preprocessor 33 and is designated generally by the dashed lines 36. The mapping interpolator 36 is divided into three sections, one section for each axis of motion ($x$, $y$ and $z$). The $x$ axis section includes an adjoint interpolator 37 connected through a pair of leads 38 and 39 to the preprocessor 33 to receive the respective initial complex state vector elements $\theta x_0$ and $\theta x_0$, and a dynamic interpolator 40 having a pair of leads 41 and 42 connected to the preprocessor 33 to receive the respective elements $x_0$ and $\Delta_1 x_0$. The dynamic interpolator 40 is connected through a lead 43 to the output of the adjoint interpolator 37 to receive the steering function $F(x)$ generated by the adjoint interpolator 37, and it has an output terminal 44 which connects through a lead 45 to an $x$ axis servo mechanism 46 on a milling machine 47.

The $y$ and $z$ sections of the mapping interpolator 36 are identical to the $x$ axis section. The $y$ axis section includes an adjoint interpolator 50 connected through a pair of leads 51 and 52 to the preprocessor 33 and a dynamic interpolator 53 connected to the preprocessor 33 through a pair of leads 54 and 55. The steering function $F(y)$ generated by the adjoint interpolator 50 is applied to the dynamic interpolator 53 through a lead 56 and an output terminal 57 on the dynamic interpolator 53 connects to a $y$ axis servo mechanism 58 on the machine tool 47. The $z$ axis section of the mapping interpolator 36 includes an adjoint interpolator 60 connected to the preprocessor 33 through a pair of leads 61 and 62 to receive the $\theta z_0$ and $\phi z_0$ elements of the initial complex state vector, and a dynamic interpolator 63 connected to the preprocessor 33 through a pair of leads 64 and 65. The z axis dynamic interpolator 63 receives the steering function F(z) from the z axis adjoint interpolator 60 through a lead 66 and generates a series of command signals to a z axis servo mechanism 60 on the machine tool 47 at an output terminal 67.

Not only are the x, y and z sections of the mapping interpolator 36 identical in structure and operation, but the corresponding x, y and z axis servo mechanisms 46, 58 and 68 are as well. The servo mechanisms 46, 58 and 68 are conventional systems using digital incremental feedback as disclosed in U.S. Pat. No. 3,546,559, issued on Dec. 8, 1970. The mapping interpolator 36 operates to periodically generate command signals to each of the servo mechanisms 46, 58 and 68. As will become apparent from the discussion to follow, a granularity number is computed for each trajectory segment and this granularity number insures that the command signals are generated to the servomechanisms at a sufficiently high rate to provide accurate and smooth control over machine tool slide motions. Each command signal is a binary coded number which specifies a distance. The size of each command is determined by the accuracy requirements of the system and the rate at which they are generated is determined by the feedrate number.

The rate at which these command signals are generated and the general operation of the mapping interpolator 36 is controlled by the interpolator control circuit 35 through a control cable 69 which connects with each section. The interpolator control 35 is also connected to a 36-bit iteration counter 71, which in turn is connected to the preprocessor 33 through a lead 70. A granularity number $n^j$ is calculated by the preprocessor 33 for each segment of the trajectory (i.e. between each pair of data points) and each is entered into the 36-bit iteration counter 71. As the segment is generated by cycling the mapping interpolator 36, the iteration counter 71 is counted down to zero. A new complex state vector is then applied to the mapping interpolator 36 and the granularity number $(n^{j+1})$ for the next line segment is applied to the iteration counter 71.

To summarize, a trajectory, or cut is first described by a set of data points which are stored in the preprocessor 33. The preprocessor then operates to calculate and store a set of initial complex state vectors and a set of associated granularity numbers. The first segment of the trajectory is generated by applying the first granularity number $n^1$ to the iteration counter 71 and by applying the twelve elements of the initial complex state vector to the mapping interpolator 36. The interpolator control circuit 35 then operates to cycle, or iterate the mapping interpolator $n^1$ times. Each section of the mapping interpolator 36 generates $n^1$ command signals to its associted servo mechanism to generate the first segment of the cut. The second segment of the trajectory is generated by entering a new granularity number $n^2$ into the iteration counter 71, applying another complex state vector to the mapping interpolator 36 and continuing with the interpolation process. The process repeats until the last segment of the trajectory is completed, or in other words, when the last granularity number $n^m$ is counted down and the last coordinate point $x_n^m$, $y_n^m$, $x_n^m$ is reached.

As indicated above, the mapping interpolator circuit 36 is comprised of three identical sections which operate independently of one another to control one axis of machine tool motion. This independence applies not only to the mapping interpolator 36, but to the circuits in the preprocessor 33 as well. Accordingly, although in the description of the first embodiment of the invention which follows, the structure and operation of the system is explained in detail for the x axis, it should be understood that the structure and operation of the system for the remaining y and z axes is identical. In most cases, the same circuitry is used to perform the calculations for each axis of motion.

Figure 8:
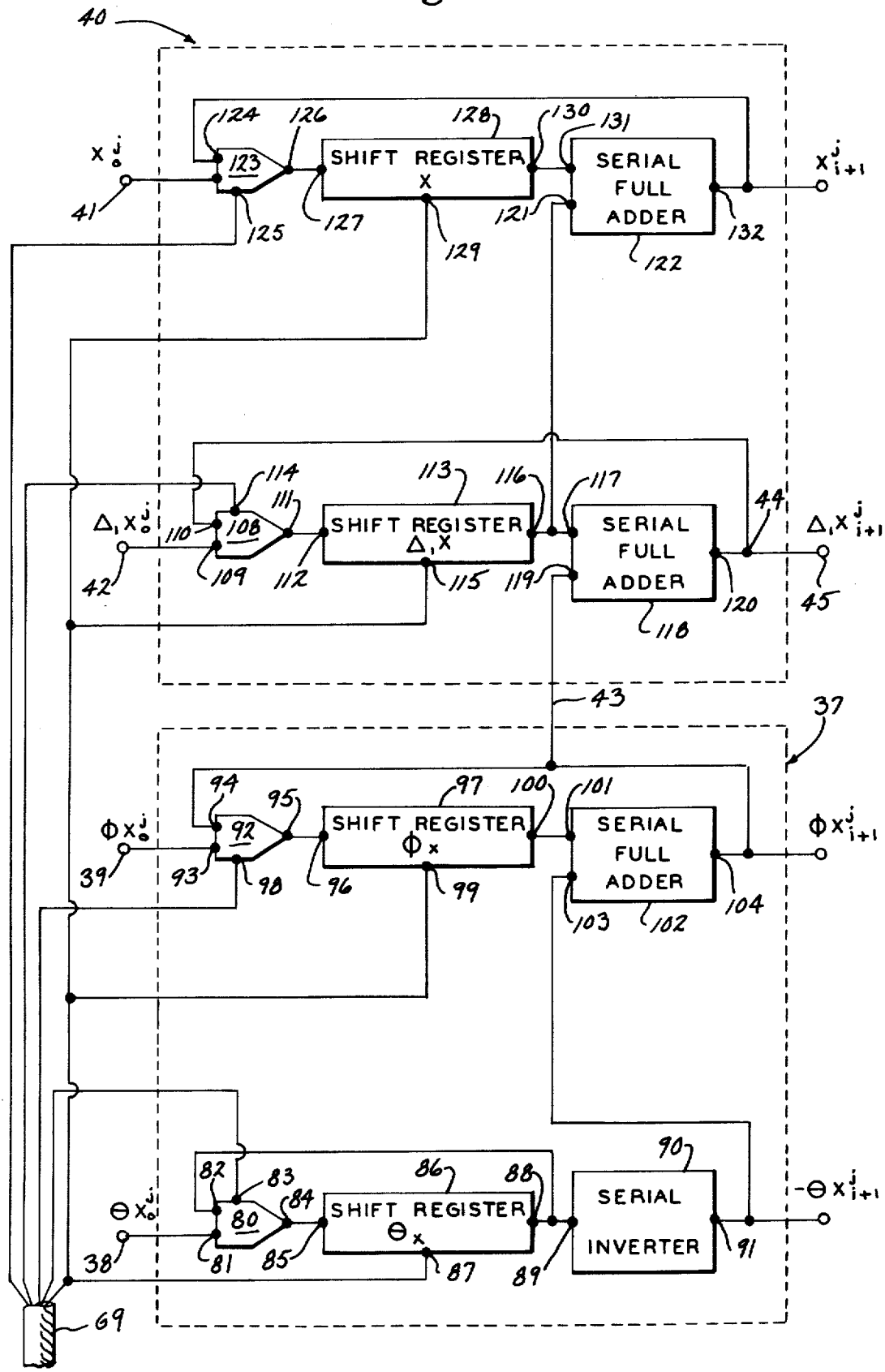
FIG. 8 is an electrical schematic diagram of the mapping interpolator which forms a part of the system of FIG. 7.

The x axis section of the interpolator 36 is shown in FIG. 8 and includes the adjoint interpolator 37 and the dynamic interpolator 40. The adjoint interpolator 37 is a digital differential analyzer (DDA) connected to perform the following finite difference equation which is the same as equation (9) discussed above under the heading "General Description of the Invention".

$$\begin{pmatrix} \theta x_{i+1} \\ \phi x_{i+1} \end{pmatrix} = \begin{bmatrix} 1 & \overline{0} \\ \overline{1} & 1 \end{bmatrix} \begin{pmatrix} \theta x_i \\ \phi x_i \end{pmatrix}$$

or
$$\theta x_{i+1} = \theta x_i$$
$$\phi x_{i+1} = \phi x_i - \theta x_i$$

The adjoint interpolator 37 includes a first multiplexer circuit 80 having a first input terminal 81 connected to the preprocessor through the lead 38 and a second input terminal 82. The multiplexer circuit 80 operates in response to the logic state applied to its control terminal 83 to generate at an output terminal 84 either the signal appearing at its input terminal 81 or the signal appearing at its input terminal 82. The multiplexer control terminal 83 connects to a lead in the control cable 69 and its output terminal 84 connects to an input terminal 85 on a $\theta$ shift register 86. A 36-bit binary word is loaded serially into the $\theta$ shift register 86 through its input terminal 85 by the application of a series of 36 logic high shift pulses to a clock input terminal 87. A binary word is read out of the shift register 86 in a similar manner through an output terminal 88. The output terminal 88 connects to both the second input terminal 82 on the multiplexer circuit 80 and to an input terminal 89 on a serial inverter circuit 90. The serial inverter circuit 90 operates to invert, or change the sign of, the binary number read out of the shift register 86 and to serially generate this inversion at an output terminal 91.

The adjoint interpolator 37 also includes a second multiplexer circuit 92 having a first input terminal 93 connected to the preprocessor through the lead 39, a second input terminal 94, and an output terminal 95 connected to the input terminal 96 of a $\phi$ shift register 97. A control input terminal 98 on the multiplexer 92 and a clock terminal 99 on the $\phi$ shift register 97 connect to the interpolator control circuit 35 through the control bus 69. The $\phi$ shift register 97 is identical in structure and operation to the $\theta$ shift register 86, and it includes an output terminal 100 which connects to a first input terminal 101 on a serial full adder 102. The adder circuit 102 includes a second input terminal 103 which connects to the output terminal 91 on the serial inverter circuit 90. The serial full adder 102 operates to arithmetically add the binary number received serially at its first input terminal 101 with a second binary number received serially at its second input terminal 103 and generate the sum at an output terminal 104. The output 104 is connected to the second input terminal 94 on the multiplexer circuit 92 and through the lead 43 to the dynamic interpolator 40.

The dynamic interpolator 40 is also a digital differential analyzer. It includes a third multiplexer circuit 108 having a first input terminal 109 connected through the lead 42 to the preprocessor 33, a second input terminal 110 and an output terminal 111 connected to an input terminal 112 on a $\Delta_1$ shift register 113. It also includes a control input terminal 114 which connects to the interpolator control through a lead in the control cable 69. The $\Delta_1$ shift register 113 is identical in structure and operation to the shift registers 86 and 97, and it includes a clock terminal 115 which connects to the control cable 69, and an output terminal 116 which connects to a first input terminal 117 on a second serial full adder circuit 118. A second input terminal 119 on the serial full adder 118 connects to the lead 43 from the adjoint interpolator 36, and in response to the signal thereon and that from the $\Delta_1$ shift register 113, it generates an output signal at an output terminal 120. The output terminal 120 connects to the second input terminal 110 on the first multiplexer circuit 108 and to the dynamic interpolator output terminal 44.

The output terminal 116 on the $\Delta_1$ shift register 113 also connects to a first input terminal 121 on a third serial full adder circuit 122. A fourth multiplexer circuit 123 has a first input terminal connected to the preprocessor through the lead 41, a second input terminal 124, a control input terminal 125 connected to a lead in the control cable 69, and an output terminal 126 connected to an input terminal 127 on an $x$ shift register 128. The $x$ shift register 128 is identical to the shift registers 86, 97 and 113, and it includes a clock terminal 129 connected to the interpolator control circuit through the cable 69 and an output terminal 130 connected to a second input terminal 131 on the third serial full adder 122. An output terminal 132 on the adder circuit 122 connects to the second input terminal 124 on the fourth multiplexer circuit 123.

To operate the mapping interpolator 36 each section is first set up by entering the four elements of the initial complex state vector in the respective shift registers 86, 97, 113 and 128. This is accomplished by the application of a logic high voltage to the control terminals 83, 98, 114 and 125 on the respective multiplexer circuits 80, 92, 108, and 123 and the generation of thirty-six shift pulses to the preprocessor buffer storage units and the interpolator shift registers 86, 97, 113 and 128. The $x_0$, $\Delta_1 x_0$, $\theta x_0$ and $\phi x_0$ elements are read out of the preprocessor 33 to the respective multiplexer circuits 123, 108, 80 and 92, and shifted into the respective shift registers 128, 113, 97 and 86. Concurrently, a granularity number (n) is read out of the preprocessor 33 to the iteration counter 71.

When setup is complete, interpolation begins by cycling, or iterating, the mapping interpolator 36. One cycle is executed by simultaneously shifting the vector elements stored in the shift registers 86, 97, 113 and 128 to the right, thus reading out each binary coded number one bit at a time. Each iteration results in a new set of vector elements which are fed back through the multiplexer circuits 80, 92, 108 and 123 and re-stored in the corresponding shift registers. With the exception of the $\theta$ element, each vector element is altered a finite amount by each iteration of the interpolator.

The $\theta x$ element, for example, is fed directly back into the shift register 86 without alteration through the multiplexer circuit 80. However, during the cycle it is also inverted and added to the $\phi x$ element by the serial full adder 122. The output of the serial full adder 102 is fed back through the multiplexer circuit 92 and the sum ($\phi x_{i+1} = \phi x_i - \theta x_i = Fx_i$) is stored in the $\phi x$ shift register 97. The adjoint interpolator 37 thus executes equation (9) once during each iteration. The new steering vector $\theta x_{i+1}$, $\phi x_{i+1}$ is stored in the shift registers 86 and 97 in preparation for the next iteration.

The dynamic interpolator 40 iterates in synchronism with the adjoint interpolator 36 and in doing so dynamically applies the steering function $Fx_i$ to the state vector $x_i$, $\Delta_1 x_i$ stored in the shift registers 128 and 113. More specifically, the 36-bit $\Delta_1 x_i$ element stored in the shift register 113 is shifted to the right and applied to the serial full adder 118 one bit at a time in synchronism with the 36-bit output of the serial full adder 102. The 36-bit arithmetic sum ($\Delta_1 x_i + \phi x_i$) is generated at the output terminal 120 and is fed back through the multiplexer circuit 108 to the shift register 113. Concurrently, as the $\Delta_1 x_i$ element is shifted out of the $\Delta_1$ register 113, it is added to the $x_i$ element shifted from the $x$ register 128. The resulting sum ($x_i + \Delta_1 x_i$) generated at the adder output terminal 132 is fed back through the multiplexer circuit 123 and stored in the $x$ shift register 128. The dynamic interpolator thus executes the following equation each time it is cycled and stores the resulting state vector ($x_{i+1}$, $\Delta_1 x_{i+1}$) in the shift registers 128 and 113.

$$\begin{pmatrix} x_{i+1} \\ \Delta_1 x_{i+1} \end{pmatrix} = \begin{bmatrix} 1 & 1 \\ 0 & 1 \end{bmatrix} \begin{pmatrix} x_i \\ \Delta_1 x_i \end{pmatrix} + \begin{bmatrix} 0 \\ 1 \end{bmatrix} Fx$$

or $$x_{i+1} = x_i + \Delta_1 x_i$$
$$\Delta_1 x_{i+1} = \Delta_1 x_i + \phi x_i$$

The interpolator control 35 cycles the mapping interpolator n times to map a series of points between each pair of specified data points. For this application of the invention, however, the coordinate outputs of the mapping interpolator 36 are not used. Instead, the $\Delta_1 x$, $\Delta_1 y$ and $\Delta_1 z$ elements are used to control machine tool servo mechanisms 46, 58 and 68. These elements command finite, incremental changes in the position of the machine tool cutter to which the servo mechanisms 46, 58 and 68 respond. By specifying a sufficiently high granularity number (n) the mapping interpolator 36 generates command signals which are relatively small in value. The servo mechanism operate to "integrate" the command signal $$\text{i.e. } x_i = \sum_{l=0}^{i} \Delta x(l) \ ; \ y_i = \sum_{l=0}^{i} \Delta y(l) \ ; \ z_i = \sum_{l=0}^{i} \Delta z(l)$$

to position the cutter at the coordinate values $x_i$, $y_i$ and $z_i$ stored in the coordinate shift registers 128. After $n^j$ iterations of the mapping interpolator 36 the iteration counter 71 is updated with a new granularity number for the next segment of the trajectory. If a discontinuity in the slope of the trajectory is specified, the control terminal 114 on the multiplexer circuit 108 is driven to a logic high voltage and the specified slope $\Delta_1 x_0^{j+1}$ is read from the preprocessor 33 and entered into the $\Delta_1 x$ shift register 113. The elements $x$, $\phi x$, and $\theta x$ are retained from the previous segment, and the interpolation process is continued. If a discontinuity in the slope is not specified, all of the elements $x$, $\Delta x$, $\phi x$ and $\theta x$ are retained from the previous segment and are used in the continuation of the interpolation process. The process continues until the final segment of the trajectory is generated.

The initial complex state vector applied to the mapping interpolator 36 is precalculated in the preprocessor 33. In the numerical control system of FIG. 7, the preprocessor 33 is shown connected directly to the mapping interpolator 36. However, it should be apparent to those skilled in the art that intermediate transmission means such as date phones may be used to convey the complex state vectors from a remote preprocessor 33 to a mapping interpolator 36 located at the machine tool station. Also, intermediate storage means, such as punched paper tape or magnetic tape may be used to store the complex state vectors. By use of appropriate playback equipment associated with the mapping interpolator 36, the recorded complex state vectors are played back to the mapping interpolator 36 on command from the interpolator control 35. In other words, as in conventional numerical control systems which read part programs stored in ASCII or EIA format, the present control system reads a series of complex state vectors previously calculated by the preprocessor 33.

Figure 9:
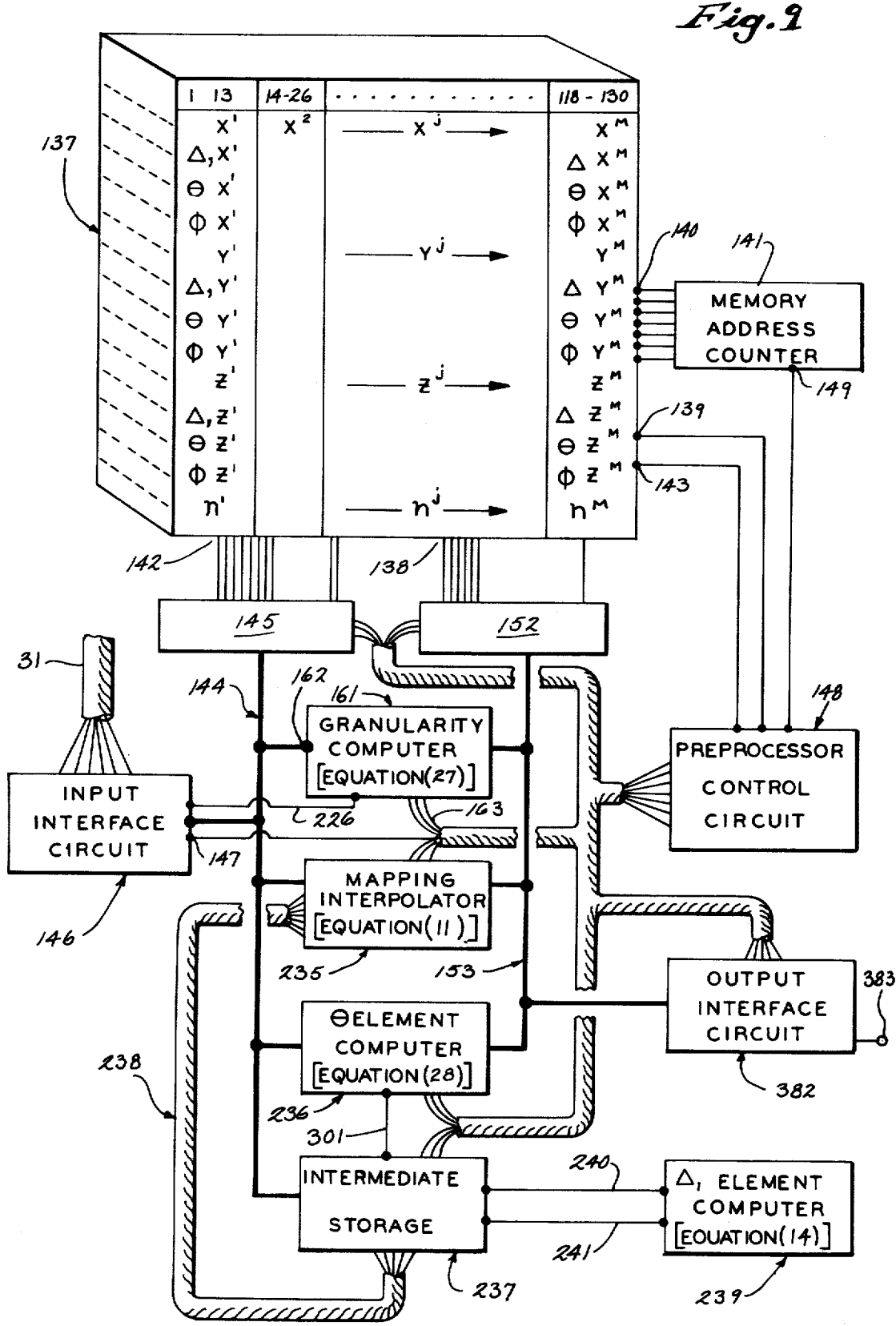
FIG. 9 is a block diagram of the preprocessor which forms a part of the system of FIG. 7.

Referring to FIG. 9, the preprocessor 33 includes a ferrite core read-write memory 137 capable of storing one-hundred and thirty 36-bit words. A 36-bit word is written, or stored, in the read-write memory 137 by applying it in parallel to a set of data input terminals 142 and by simultaneously applying a logic high voltage to a memory R/W select terminal 139. The location, or memory address at which the word is stored is determined by an eight-bit memory address code applied to a set of address terminals 140 by an eight-bit binary memory address counter 141. The memory address counter is controlled through an input terminal 149 by a preprocessor control circuit 148. A word stored in the memory 137 is read out in parallel form at a set of data output terminals 138. This is accomplished when the word is addressed by the memory address counter 141 and when a logic low voltage is applied to the memory R/W select terminal 139. Both the read and write functions are initiated by a clock pulse applied to a memory cycle initiate terminal 143.

The read-write memory 137 is organized to store the twelve elements of ten separate complex state vectors plus a granularity number (n) for each of nine line segments of a trajectory. The first thirteen lines in the read-write memory 137 are reserved for the twelve elements of the complex state vector at the first point $P_1$ plus a granularity number $n^1$ for the first line segment $L_1$. Up to nine additional complex state vectors with associated granularity numbers may be stored in subsequent lines of the read-write memory 137.

The memory data input terminals 142 connect to a memory data input bus 144 through a serial-to-parallel converter circuit 145. The data input bus 144 in turn connects to an input interface circuit 146 which connects to the cable 31 leading from the console 30. The input interface circuit 146 is comprised of appropriate buffer circuits (not shown in the drawings) which insulate the preprocessor circuitry from external noise commonly associated with industrial environments. The interface circuit 146 also includes gating circuitry (not shown in the drawings) which operates in response to control signals applied to a control terminal 147 by the preprocessor control circuit to gate input data on the cable 31 through the data input bus 144 to the serial-to-parallel converter circuit 145. The serial-to-parallel converter circuit is a standard, commercially available integrated circuit which receives a 36-bit binary word in serial form from the data input bus 144 and reads it out to the memory data input terminals 142 in parallel form. Thus, under the direction of the preprocessor control circuit 148, input data generated by the console 30 is stored at selected locations in the read-write memory 137. Such input data will include at least the coordinate values of a plurality of data points on the trajectory to be generated.

Figure 10:
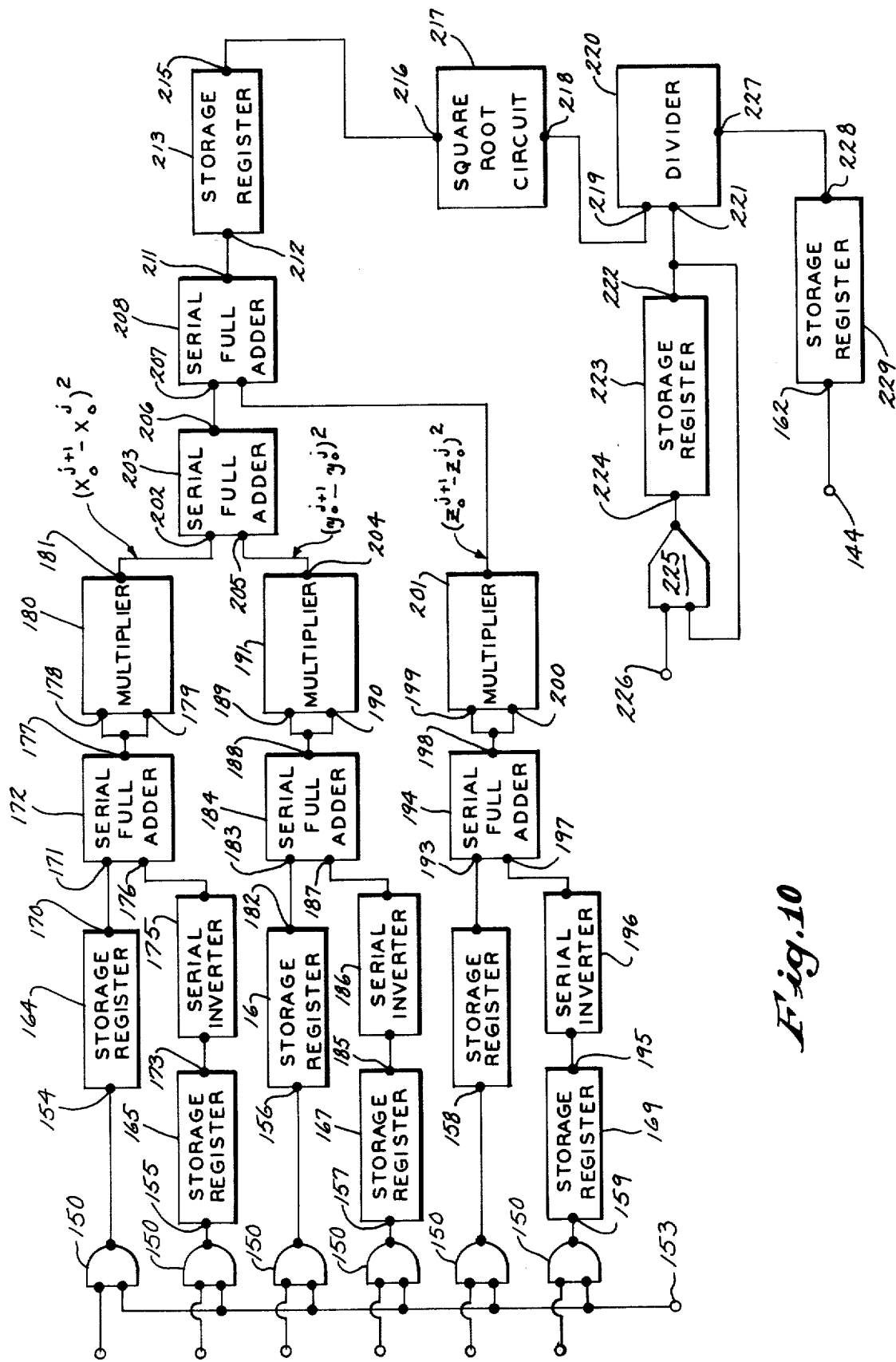
FIG. 10 is an electrical schematic diagram of the granularity computer which forms part of the system of FIG. 7.

Referring to FIGS. 9 and 10, the memory data output terminals 138 connect through a parallel-to-serial converter circuit 152 to a memory data output bus 153 which connects to an input terminal on a granularity computer 161. The granularity computer 161 operates to receive the coordinate values of successive data points ($x_0^j$, $x_0^{j+1}$, $y_0^j$, $y_0^{j+1}$, $z_0^j$, $z_0^{j+1}$) and in response thereto generate a granularity number ($n^j$) at an output terminal 162. The output terminal 162 connects to the memory data input bus 144 and the computed granularity number ($n^j$) for each segment of the trajectory is stored at its appropriate address in the read-write memory 137. The granularity computer 161 is operated by the preprocessor control circuit 148 through a cable 163 to calculate the granularity numbers immediately after the coordinate values are inputed from the console 30 and stored in the read-write memory 137.

The granularity computer 161 executes the following equation for each segment of the trajectory.

$$n^j = 1/R \ \sqrt{(x_0^{j+1} - x_0^j)^2 + (y_0^{j+1} - y_0^j)^2 + (z_0^{j+1} - z_0^j)^2} \quad (27)$$

where:

R = a selected interpolation constant

Referring to FIG. 10, the granularity computer 161 includes a set of six input ANd gates 150 each having an input terminal connected to the memory data output bus 153. It also includes a set of six input storage registers 164–169 having respective input terminals 154–159 connected to the output terminals of the input AND gates 150. A second input on each AND gate 150 connects to the preprocessor control circuit 148. The coordinate values of a pair of data points on the trajectory are read from the read-write memory 137 and each is shifted through an input AND gate 150 into a designated input storage register 164–169 by the preprocessor control circuit 148.

An output terminal 170 on the input storage register 164 connects to a first input terminal 171 on a first serial full adder 172 and an output terminal 173 on the input storage resister 165 connects through a serial inverter circuit 175 to a second input terminal 176 on the serial full adder 172. A 36-bit binary number representing the quantity ($x_0^{j+1} - x_0^j$) is generated in serial form at an adder output terminal 177. Adder output terminal 177 connects to both the multiplier and multiplicand input terminals 178 and 179 on a serial multiply circuit 180. The multiplier operates to square the above number and to generate the result at a multiplier output terminal 181.

Similar circuitry is provided for each of the remaining axes of motion. Specifically, an output terminal 182 on the input storage register 166 connects to a first input terminal 183 on a second serial full adder circuit 184 and an output terminal 185 on the input storage register 167 connects through a second serial inverter 186 to a second input terminal 187 on the second adder 184. An output terminal 188 on the serial full adder 184 connects to a pair of input terminals 189 and 190 on a second multiplier circuit 191. Similarly, an output terminal 192 on the input storage register 168 connects to a first input terminal 193 on a third serial full adder 194, and an output terminal 195 on the input storage register 169 connects through a serial inverter circuit 196 to a second input terminal 197 on the third adder circuit 194. An output terminal 198 on the adder circuit 194 connects to a multiplier input 199 and multiplicand input 100 on a third multiplier circuit 201. The output terminal 181 on the first multiplier circuit 180 connects to a first input terminal 202 on a fourth serial full adder circuit 203 and an output terminal 204 on the second multiplier circuit 191 connects to a second input terminal 205 on the adder circuit 203. An output terminal 206 on the adder 203 connects to a first input terminal 207 on a fifth serial full adder circuit 208. An output terminal 209 on the third multiplier circuit 201 connects to a second input terminal 210 on the adder circuit 208, and an output terminal 211 on the adder circuit 208 connects to an input terminal 212 on a temporary storage register 213. The serial full adders 203 and 208, and the storage register 213 have a 72-bit capacity to accommodate the output of the multiplier circuits 180, 191 and 201. An output terminal 215 on the temporary storage register 213 connects to an input terminal 216 on a square root circuit 217. An output terminal 218 on the square root circuit 217 connects to a dividend input terminal 219 on a divider circuit 220 and a divisor input terminal 221 on the divider 220 connects to an output terminal 222 on an interpolation constant storage register 223. An input terminal 224 on the register 223 connects to the output of a multiplexer circuit 225 which includes a first input terminal connected to the input interface circuit 146 through a lead 226, and a second input terminal connected to the output terminal 222 on the storage register 223. An output terminal 227 on the divider circuit 220 connects to an input terminal 228 on a granularity constant storage register 229 and the output of the storage register 229 forms the output terminal 162 of the granularity computer 161.

The $x$, $y$ and $z$ coordinate values necessary to compute the granularity constant $n^j$ are sequentially read into the respective storage registers 164–169. Then, in response to 36 shift pulses applied concurrently to each of the storage shift registers 164–169, the data is shifted through the serial inverters 175, 186, and 196 and the serial full adders 172, 184 and 194 to the multiplier circuits 180, 191 and 201. The multiplier circuits 180, 191 and 201 are cycled concurrently to generate and store the respective quantities $(x_0^{j+1} - x_0^j)^2$, $(y_0^{j+1} - y_0^j)^2$ and $(z_0^{j+1} - z_0^j)^2$ at their outputs. The 72-bit binary numbers stored in each multiplier circuit 180, 191 and 201 are then shifted serially through serial full adders 203 and 208 and the sum of the squared coordinate quantities are stored as a 72-bit binary number in the temporary storage register 213. During the subsequent set of 72 shift pulses, this number is serially transferred to the square root circuit 217 and the square root circuit 217 is cycled to generate a 36-bit binary number at its output terminal 218 which is equal to the straight line distance between the coordinate points $(x^j, y^j, z^j)$ and $(x^{j+1}, y^{j+1}, z^{j+1})$. This distance number is divided by the interpolation constant R which is applied to the divider circuit 220 from the storage register 223. The interpolation constant is manually selected and entered into the storage register 223 through the console 30. It is chosen in accordance with the desired accuracy requirements of the cut, the nature of the trajectory, and the spacing of the data points. The interpolation constant R is divided into the distance dimension stored in the divider circuit 220 and a resulting 36-bit granularity constant $n^j$ is generated at the output terminal 227 and temporarily stored in the storage register 229. Finally, the granularity constant $n^j$ is shifted out of the storage register 229 and into the appropriate line of the read-write memory 137. The process is repeated for each line segment of the trajectory.

Referring again to FIG. 9, the unknown elements of the complex state vectors at the data points are calculated using the double forward sweep process described above under the heading "General Description of the Invention". To perform the forward sweep process the preprocessor 33 includes a mapping interpolator 235 connected to both the data input bus 144 and the data output bus 153. A $\theta$ element computer 236 also connects to the data input and data output buses 144 and 153, an intermediate storage circuit 237 connects to the data input bus 144 and to the mapping interpolator 235 through a data bus 238, and a $\Delta_1$ element computer 239 connects to the intermediate storage 237 through a pair of data lines 240 and 241. Each of these circuits 235, 236, 237 and 239 performs its function on one axis at a time and each is connected to and controlled by the preprocessor control circuit 148.

Figure 11:
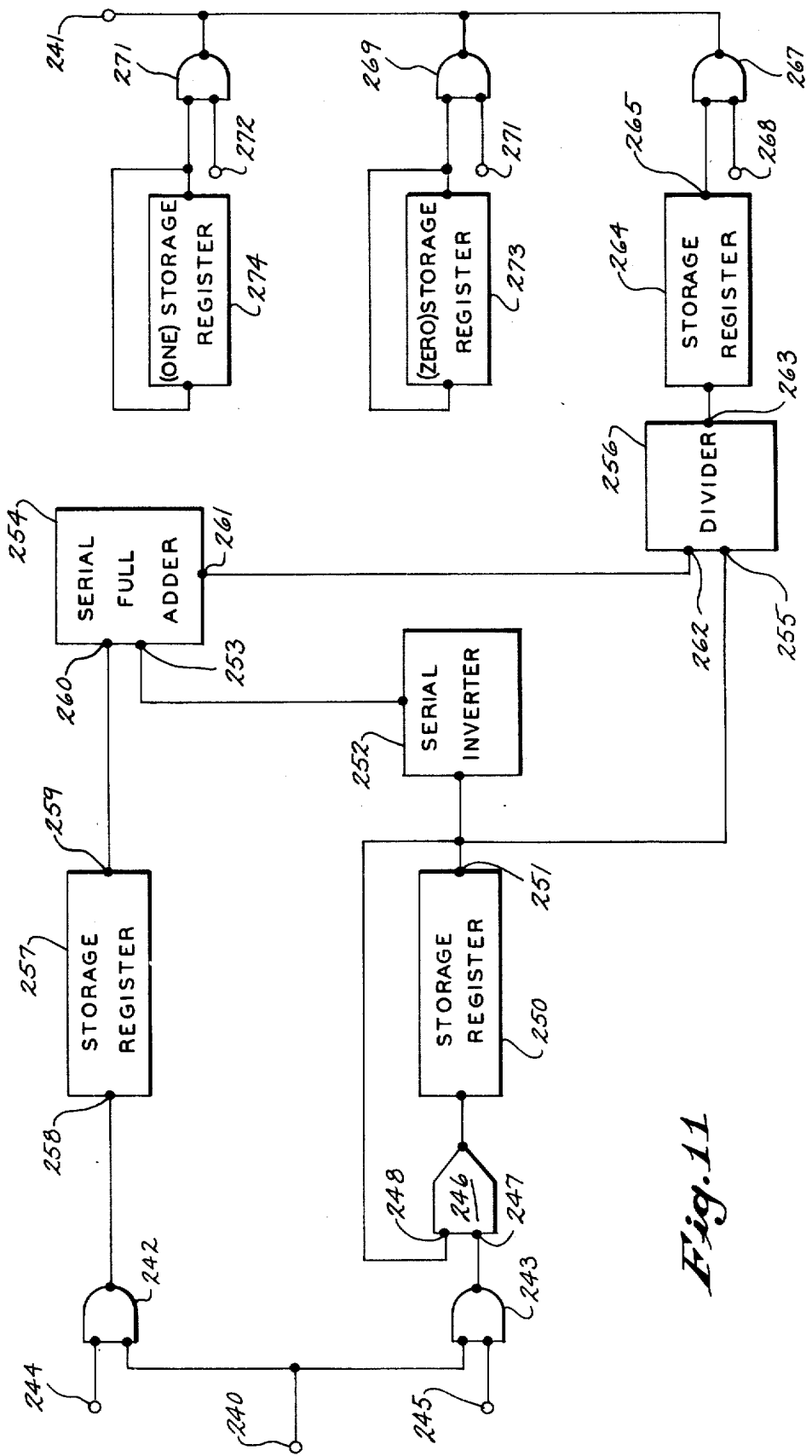
FIG. 11 is an electrical schematic diagram of the $\Delta_1$ element computer which forms a part of the system of FIG. 7.

Referring to FIG. 11, the $\Delta_1$ element computer 239 operates to assign values to the $\Delta_1$ element of the trial complex state vector during the two trial forward sweeps and then, based on the results of these trial sweeps, compute the optimal value of the $\Delta_1$ element in accordance with equation (14). The $\Delta_1$ element computer 239 includes a pair of input AND gates 242 and 243 each having an input terminal connected to the data line 240 leading from the intermediate storage 237. The first AND gate 242 includes a second input terminal 244 connected to the preprocessor control circuit 148 and the second input AND gate 243 includes a second input terminal 245 connected to the preprocessor control circuit 148. A multiplexer circuit 246 has a first input terminal 247 connected to the output of the AND gate 243, a second input terminal 248, and an output terminal 249 connected to the input terminal of a first trial storage register 250. An output terminal 251 on the storage register 250 connects to the multiplexer input terminal 248 to circulate the data shifted therefrom. It also connects through a serial inverter circuit 252 to a first input terminal 253 on a serial full adder 254 and to a dividend input terminal 255 on a divider circuit 256.

A second trial storage register 257 has an input terminal 258 connected to the output of the AND gate 242. It also includes an output terminal 259 connected to a second input terminal 260 on the serial full adder 254. An output terminal 261 on the adder 254 connects to a divisor input terminal 262 on the divider circuit 256, and an output terminal 263 on the divider circuit 256 connects to the input terminal of an output storage register 264. An output terminal 265 on the output storage register 264 connects to an input terminal 266 on a first output AND gate 267 and a second input terminal 268 on the ANd gate 267 connects to the preprocessor control circuit 148. The output of the AND gate 267 connects to the output of a second output AND gate 269, to the output of a third AND gate 270 and to the data lead 241 connecting with the intermediate storage 237. The second and third AND gates 269 and 270 each also have a first input terminal 271 and 272 connected to the preprocessor control circuit 148. A second input terminal on the AND gate 269 connects to the output of a first sweep storage register 273 which stores and circulates the number zero. Similarly, a second input terminal on the third output AND gate 270 connects to the output of a second sweep storage register 274. The output terminal of the storage register 274 is connected to its input and the number one is stored therein.

The $\Delta_1$ element computer 239 operates to generate a zero to the intermediate storage 237 at the commencement of the first trial forward sweep. A logic high voltage is generated by the preprocessor control circuit 148 to the input terminal 271 on the second output AND gate 269 and the zero stored in the first sweep storage register 273 is cycled and generated through the data lead 241 to the intermediate storage 237. At the termination of the first trial sweep the preprocessor control 148 generates a logic high voltage at the input terminal 245 of the input AND gate 243. As a result, the element $(\phi x_n^m)$ which results from the first trial sweep is shifted through the data lead 240, through the input AND gate 243, through the multiplexer circuit 246, and stored in the first trial storage register 250. The second trial sweep is initiated by the application of a logic high voltage to the input terminal 272 on the output AND gate 270. The storage register 274 is then cycled and the one stored therein is gated through the output AND gate 270 to the intermediate storage 237. The second trial forward sweep is executed and a logic high voltage is applied to the input terminal 244 on the second input AND gate 242 to gate the resulting $\phi$ element to the second trial storage register 257. Equation (14) is then executed. The contents of the storage registers 250 and 257 are shifted to the right and applied to the serial full adder 254. A 36-bit binary number corresponding to the quantity $[\phi x_n^m$ (second sweep) $- \phi x_n^m$ (first sweep)] is generated at the serial full adder output terminal 261 and applied to the divider circuit 256. Concurrently, the quantity $\phi x_n^m$ (first sweep) is generated from the storage register 250. The divider circuit 256 is then cycled and the optimal value of the element $\Delta_1 x_0^1$ is calculated and stored in the output storage register 264. Upon the application of a logic high voltage to the second input terminal 268 of the first output AND gate 267, the calculated $\Delta_1$ element is generated to the intermediate storage 237 through the data lead 241.

Figure 12:
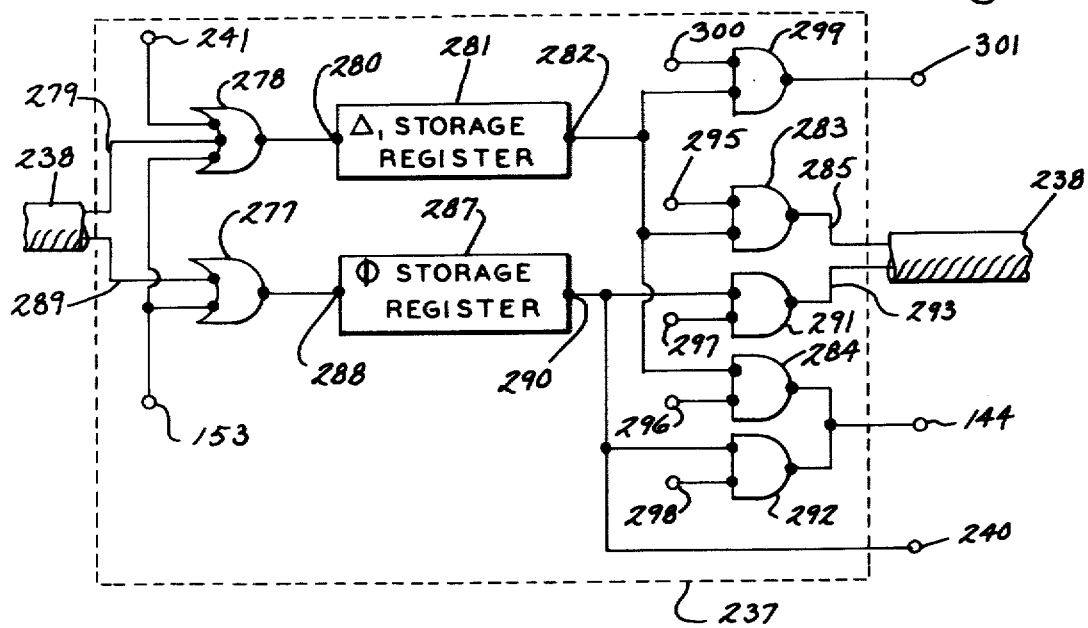
FIG. 12 is an electrical schematic diagram of the intermediate storage which forms part of the system of FIG. 7.

The intermediate storage circuit 237 interconnects the mapping interpolator 235, the $\theta$ element computer 236, the $\Delta_1$ element computer 239 and the read-write memory 137. As shown in FIG. 12, it includes an input OR gate 278 having a first input terminal connected to the data lead 241, a second input terminal connected to a lead 279 in the data cable 238, and a third input terminal connected to the memory data output bus 153. The output of the OR gate 278 connects to an input terminal 280 on a $\Delta_1$ storage register 281. An output terminal 282 on the storage register 281 connects to an input terminal on a first output AND gate 299, to an input terminal on a second output AND gate 283 and to an input terminal on a third output AND gate 284. The output of the first output AND gate 299 connects to the $\theta$ element computer 236 through a lead 301. The output of the second AND gate 283 connects to a lead 285 in the data cable 238 and the output of the second AND gate 284 connects to the memory data input bus 144. The intermediate storage circuit 237 also includes a $\phi$ storage register 287 having an input terminal 288 connected to the output of a second input OR gate 277. One input terminal of the OR gate 277 connects to a lead 289 in the data cable 238 and a second input terminal connects to the memory data output bus 153. An output terminal 290 on the storage register 287 connects to the data lead 240, to an input terminal on a fourth output AND gate 291, and to an input terminal on a fifth output AND gate 292. The output of the fourth AND gate 291 connects to a lead 293 in the data cable 238 and the output of the fifth AND gate 292 connects to the memory data input bus 144. Each output AND gate 299, 283, 284, 291 and 292 includes a second input terminal 300, 295, 296, 297 and 298, respectively, which connects to the preprocessor control circuit 148.

The $\Delta_1$ elements generated by the $\Delta_1$ element computer 239 are shifted serially through the data lead 241, through the input OR gate 278, and into the $\Delta_1$ storage regiter 281. In response to control signals applied to the input terminals 300, 295, and 296 on the first, second and third output AND gates 299, 283 and 284, the $\Delta_1$ elements stored in the register 281 are generated either to the $\theta$ element computer 236 through the lead 301, to the mapping interpolator 235 through the data cable 238 or to the read-write memory 137 through the data input bus 144. Also, the intermediate storage 237 provides a means of channeling $\Delta_1$ elements generated by the mapping interpolator 235. Finally, $\phi$ elements either read from the read-write memory 137 or generated at the end of forward sweep by the mapping interpolator 235, are applied through the lead 289 and shifted into the $\phi$ storage register 287. They are then either shifted to the $\Delta_1$ computer 239 throuth the data lead 240, applied to the data cable 238 or generated to the memory data input bus 144 through one of the respective output AND gates 291 or 292.

Figure 13:
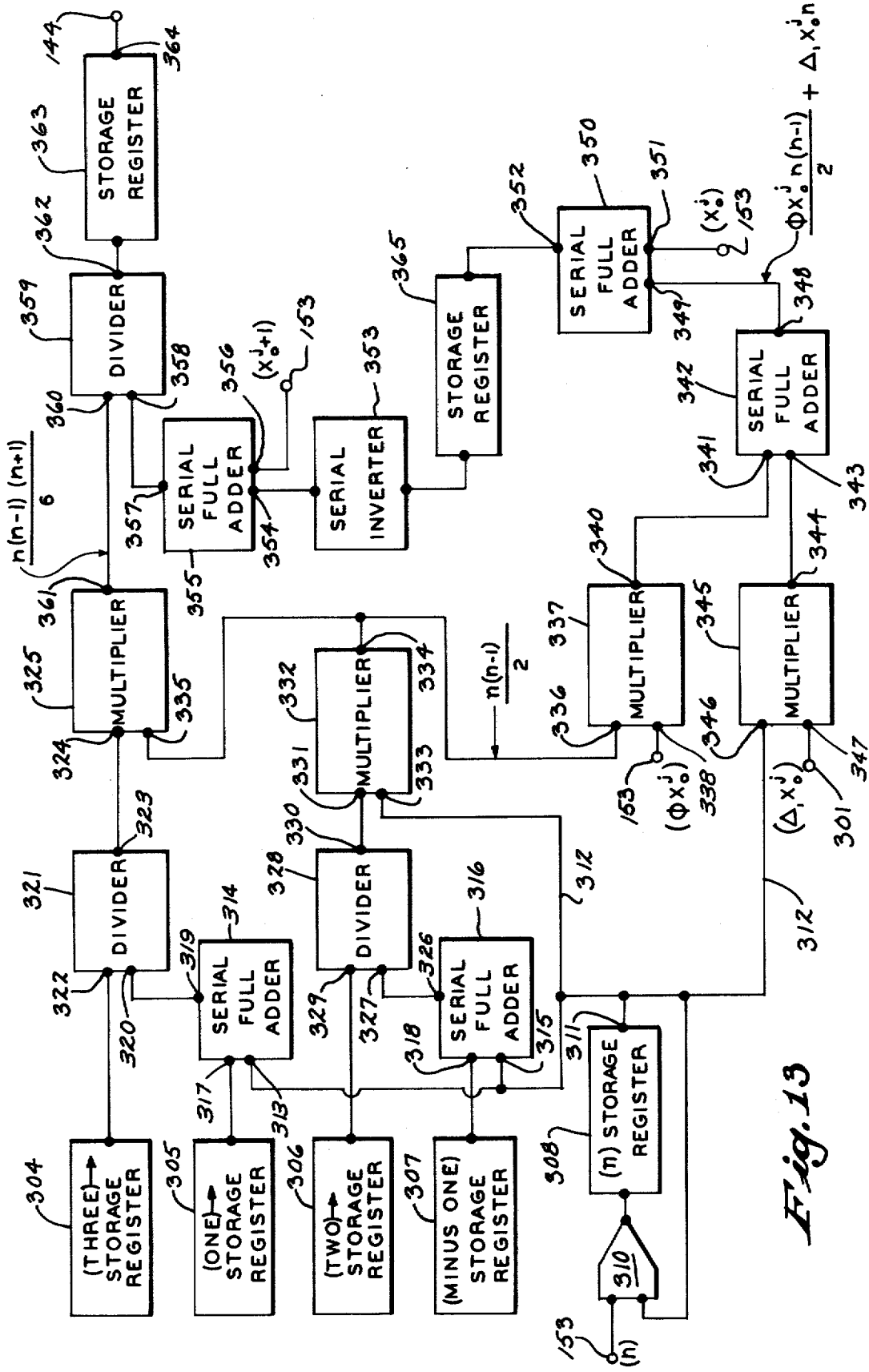
FIG. 13 is an electrical schematic diagram of the $\theta$ element computer which forms a part of the system of FIG. 7.

Referring to FIG. 13, the $\theta$ element computer 236 operates to solve the following equation.

$$\theta x_0^j = \frac{x_0^{j+1} - [x_0^j + n\Delta_1 x_0^j + n(n-1)(\phi x_0^j)/2]}{n(n-1)(n+1)/6} \quad (28)$$

It includes a set of four storage registers 304, 305, 306 and 307 which permanently store and cycle the respective integers 3, +1, +2 and −1. It also includes a granularity storage register 308 which has an input terminal 309 connected to the output of a multiplexer circuit 310 and an output terminal 311 connected to a granularity bus 312. One input of the multiplexer 310 is connected to the memory data output bus 153 to receive the granularity number $n^j$ from the read-write memory 137 and a second input terminal connected to the storage register output terminal 311. The granularity bus 312 connects to a first input terminal 313 on a first serial full adder circuit 314 and to a first input terminal 315 on a second serial full adder 316. A second input terminal 317 on the first adder 314 connects to the output of the (+1) storage register 305 and a second input terminal 318 on the second adder 316 connects to the output of the (−1) storage register 307. An output terminal 319 on the first adder 314 connects to a dividend input terminal 320 on a first divider circuit 321 and a divisor input terminal 322 on the divider circuit 321 connects to the output of the (+3) storage register 304. The quantity $(n+1)/3$ is generated at a divider output terminal 323 which connects to a multiplier input terminal 324 on a first multiplier circuit 325.

An output terminal 326 on the second serial full adder 316 connects to the dividend input terminal 327 on a second divider circuit 328. A divisor input terminal 329 on the divider circuit 328 connects to the output of the (+2) storage register 306 and the quantity $(n−2)/2$ is generated at a divider output terminal 330. Output terminal 330 connects to a multiplier input terminal 331 on a second multiplier circuit 332 and a multiplicand input terminal 333 on the multiplier 332 connects to the granularity bus 312. The quantity $n(n−1)/2$ is generated at a multiplier output terminal 334 and applied to a multiplicand input terminal 335 on the first multiplier circuit 325. The output terminal 334 also connects to a multiplier input terminal 336 on a third multiplier circuit 337. A multiplicand input terminal 338 on the multiplier 337 connects to the memory data output bus 153 to receive the $\phi x_0^j$ element from the read-write memory 137.

An output terminal 340 on the multiplier 337 connects to a first input terminal 341 on a third serial full adder 342. A second input terminal 343 on the adder 342 connects to an output terminal 344 on a fourth multiplier circuit 345. A multiplier input terminal 346 on the multiplier circuit 345 connects to the granularity bus 312 and a multiplicand input terminal 347 connects to receive the $\Delta_1 x_0^j$ element from the intermediate storage 237 through the lead 301. An output terminal 348 on the third serial full adder 342 connects to a first input terminal 349 on a fourth serial full adder circuit 350. A second input terminal 351 on the adder 350 connects to the memory data output bus 153 to receive the $x_0^j$ element from the read-write memory 137. The quantity $[x_0^j + n\Delta_1 x_0^1 + n(n−1)(\phi x_0^j)/2]$ is generated at an output terminal 352 on the adder circuit 350 and temporarily stored in a storage register 365. The output of the storage register 365 connects through a serial inverter circuit 353 to a first input terminal 354 on a fifth serial full adder circuit 355. A second input terminal 356 on the adder circuit 355 connects to the memory data output bus 153 to receive the $x_0^{j+1}$ element from the read-write memory 137. An output terminal 357 on the fifth adder circuit 355 connects to a dividend input terminal 358 on a third divider circuit 359 and a divisor input terminal 360 on the divider 359 connects to an output terminal 361 on the first multiplier circuit 325. A divider output terminal 362 connects to the input of an output storage register 363, and an output terminal 364 on the storage register 363 connects to the memory data input bus 144.

Equation (28) is executed by a sequence of steps performed unter the control of the preprocessor control circuit 148. First, the granularity number $n^j$ is entered into the storage register 308 through the multiplexer circuit 310. The integers stored in the registers 304–307 and the granularity number stored in the register 308 are then shifted to the right by the application of 36 shift pulses. The integer 3 and the quantity $(n+1)$ are thus applied to the first divider circuit 321 and the integer 2 and the quantity $(n−1)$ are applied to the second divider circuit 328. The divider circuits 321 and 328 are then cycled and the results stored in the respective multiplier circuits 325 and 332. The granularity number $(n^j)$ is also applied to the second multiplier circuit 332, and it is then cycled to generate a product which is stored in both the first multiplier circuit 325 and the third multiplier circuit 337. Simultaneously, the $\phi x_0^j$ element is applied to and stored in the third multiplier circuit 337, the granularity number $(n^j)$ is applied to and stored in the fourth multiplier circuit 345 and the $\Delta_1 x_0^j$ element is applied to and stored in the fourth multiplier circuit 345. The second, third and fourth multiplier circuits 325, 337 and 345 are then cycled in synchronism to generate products which are stored at their outputs. The products stored in the third and fourth multiplier circuits 337 and 345 are then applied to the serial full adder 342 and the $x_0^j$ element is serially applied to the fourth serial full adder circuit 350 in synchronism therewith. The resulting quantity is stored in the temporary storage register 365. This quantity is applied to the fifth serial full adder circuit 355 in synchronism with the serial application of the $x_0^{j+1}$ element to the input terminal 356, and the sum is applied to the third divider circuit 359. Finally, the divider circuit 359 is cycled and the resulting quantity $\theta_0^h$ is generated and stored in the output storage register 363. The result is shifted to the read-write memory 137 through the memory data input bus 144.

Figure 14:
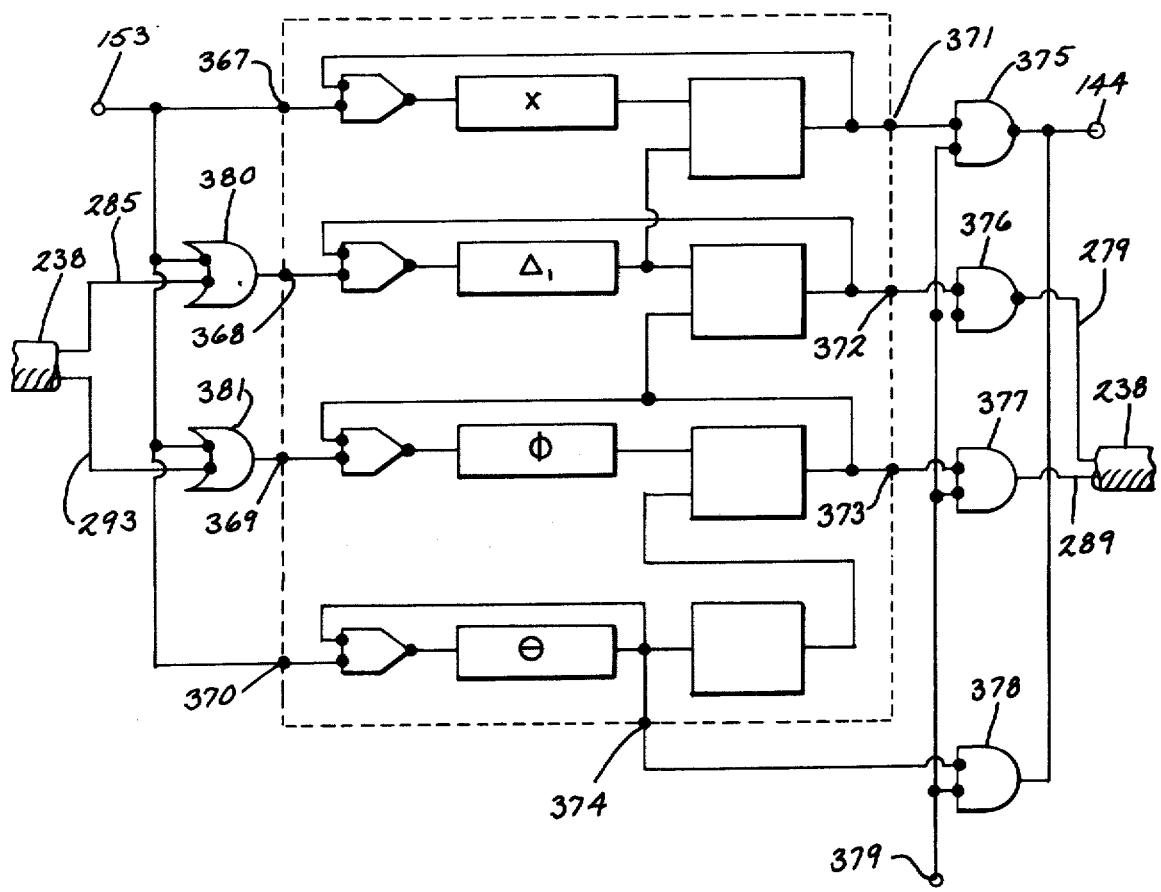
FIG. 14 is an electrical schematic diagram of a second mapping interpolator which forms a part of the system of FIG. 7, FIGS. 15 and 15A are representations of a second embodiment of the invention which is a computer controlled numerical control system, with FIG. 15 being a pictorial representation of the system and FIG. 15A being a block diagram of the numerical control processor which forms a part of the system.

The final element of the preprocessor 33, the mapping interpolator 235, is essentially identical in structure to the mapping interpolator 36 described above and shown in FIG. 8. Referring to FIG. 14, that portion of the mapping interpolator 235 which has been previously described is enclosed within the dashed line 366 and a description of this portion of the circuit will not be repeated. Instead, reference is made to the discussion relating to FIG. 8. The mapping interpolator 235 includes a coordinate value input terminal 367 connected to the memory data output bus 153, a $\Delta_1$ element input terminal 368 connected to the output of a first input OR gate 380, a $\phi$ element input terminal 369 connected to the output of a second input OR gate 381, and a $\theta$ element input terminal 370 connected to the memory data output bus 153. One input terminal on the first input OR gate 380 connects to the memory data output bus 153 and a second input connects to the lead 285 in the data cable 238. A first input on the second input OR gate 381 also connects to the memory data output bus 153 and a second input connects to the lead 293 in the data cable 238.

A set of four corresponding mapping interpolator output terminals 371–374 are connected to respective first input terminals on a set of four output AND gates 375–378. A second input terminal on each of the AND gates 375–378 is connected to the preprocessor control circuit 148 through a lead 379. The output of each of the AND gates 375 and 378 connect to the memory data input bus 144, the output of the AND gate 376 connects to the lead 279 in the data cable 238, and the output of the AND gate 377 connects to the lead 289 in the data cable 238.

The mapping interpolator 235 is operated by the preprocessor control circuit 148 to receive and store the elements of the first trial complex state vector, and to sweep that vector forward to the final data point on the trajectory. On the first trial sweep, for example, the coordinate value $x_0^1$ and the element $\theta x_0^1 = 0$ are read from the read-write memory 137 through the data output bus 153 and stored in the corresponding shift registers of the mapping interpolator 235. The element $\Delta_1 x_0^1$ and the element $\phi x_0^1$ are shifted through the data cable 238 from the intermediate storage 237 and stored in the appropriate mapping interpolator shift registers. The calculated granularity number $n^1$ is read from the read-write memory 137 to the preprocessor control circuit 148 and the mapping interpolator 235 is iterated $n^1$ times. During the last iteration, a logic high voltage is generated by the preprocessor control circuit 148 through the lead 379 and applied to the output AND gates 375–378. As a result, the elements $\Delta_1 x_n^1$ and $\phi x_n^1$ are gated through the data cable 238 to the intermediate storage 237, and hence to the $\theta$ element computer 236.

The computer 236 operates to generate the element $\theta x_0^2$ for the next segment of the trajectory. This element is shifted through the intermediate storage 237 and into the appropriate $\theta$ shift register in the mapping interpolator 235. The elements, $x_n^1$, $\Delta_1 x_n^1$ and $\phi x_n^1$ remain the same for the next line segment. That is:

$x_n^1 = x_0^2$ $\Delta_1 x_n^1 = \Delta_1 x_0^2$ $\phi x_n^1 = \phi x_0^2$ The forward sweep is continued through the remaining line segments ($j = 2$ through $m$) and the final element $\phi x_n^m$ is shifted out of the mapping interpolator 235, through the intermediate storage 237, to the $\Delta_1$ element computer 239. The second trial forward sweep is then performed in the same manner except the initial element $\Delta_1 x_0^1$ applied to the mapping interpolator 235 is changed from zero to one. When the second trial forward sweep is completed, the resulting $\phi x_n^m$ element is generated to the $\Delta_1$ element computer 239 via the intermediate storage 237 and the optimal value of the $\Delta_1 x_0^1$ element is calculated as described above. The three initial complex state vector elements $x_0^1$, $\Delta_1 x_0^1$ and $\phi x_0^1$ are thus determined and the last element $\theta x_0^1$ is then calculated in the $\theta$ element computer 236. The resulting initial complex state vector is stored in the read-write memory 137.

The above forward sweep process is repeated for each of the remaining axes ($y$ and $z$) and the results are stored on lines 1–13 in the read-write memory 137. As is indicated in FIG. 9 and described above, provision is made in the memory 137 to store the twelve elements of up to ten complex state vectors as well as a granularity number for each of the resulting line segments. To calculate these elements, however, a third sweep using the optimal initial complex state vectors stored on lines 1–12 is made. More specifically, the elements of the initial complex state vector are generated to the mapping interpolator 235 through the data output bus 153 and the mapping interpolator 235 is iterated $n^1$ times to generate the complex state vector elements at the next data point. These elements are gated through the output AND gates 375–378 and stored in the read-write memory 137. In the alternative, if a discontinuity is specified, this information is entered and stored. The process is repeated until the complex state vectors at each specified data point on the trajectory are generated and stored on successive lines of the read-write memory 137. The preprocessing procedure is now completed.

To generate the preprocessed trajectory, the successive complex state vectors stored in the read-write memory 137 are read out one at a time through the data output bus 153 to an output interface circuit 382. The output interface circuit includes appropriate buffer circuits (not shown in the drawings) which insulate the preprocessor circuitry from the external environment. It also includes a set of thirteen 36-bit buffer storage registers. Referring to FIG. 7, twelve of these buffer storage registers connect through the respective leads 38, 39, 41, 42, 51, 52, 54, 55, 61, 62, 64 and 65 to the mapping interpolator 36 and the thirteenth connects through the lead 70 with the iteration counter 71. The interpolator control circuit 35 operates the output interface circuit 382 through a lead 383 to read out the values stored therein at the appropriate moment to the mapping interpolator 36 and the iteration counter 71. The complex state vectors and associated granularity numbers are read out as needed during the interpolation process to generate the entire trajectory.

SECOND PREFERRED EMBODIMENT OF THE INVENTION

The second embodiment of the invention uses the transformed version of the transition matrix of equation (16) and the associated vector elements $\Delta_1$, $\Delta_2$ and $\Delta_3$. The second embodiment of the invention is also a numerical control system for a machine tool, but instead of using hardwired logic circuits as described above in reference to the first embodiment of the invention, extensive use is made of the computational capabilities of general purpose digital computers. Also the second embodiment will generate surfaces using the method described above under the heading "General Description of the Invention".

Figure 15:
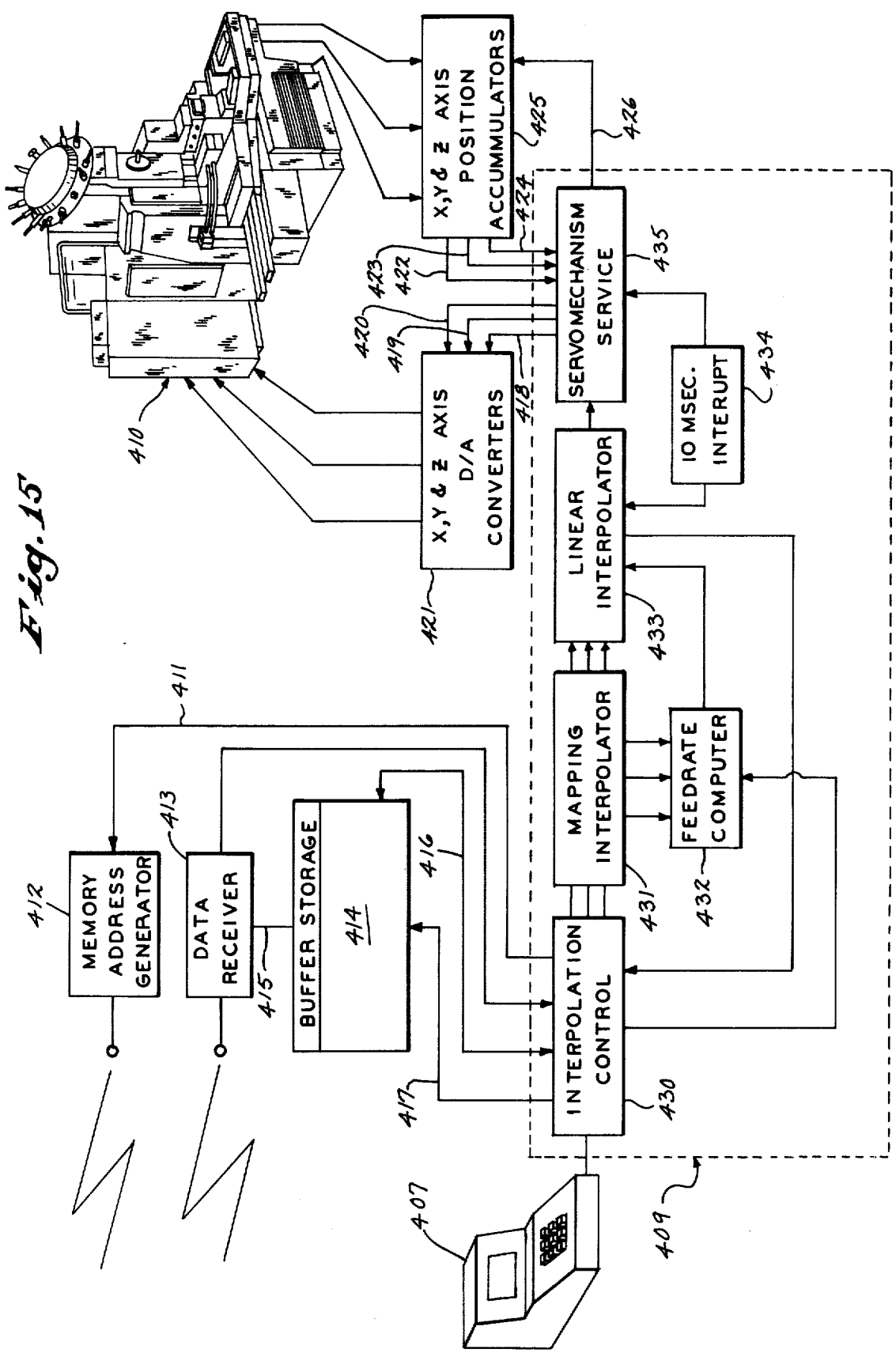
Figure 15A:
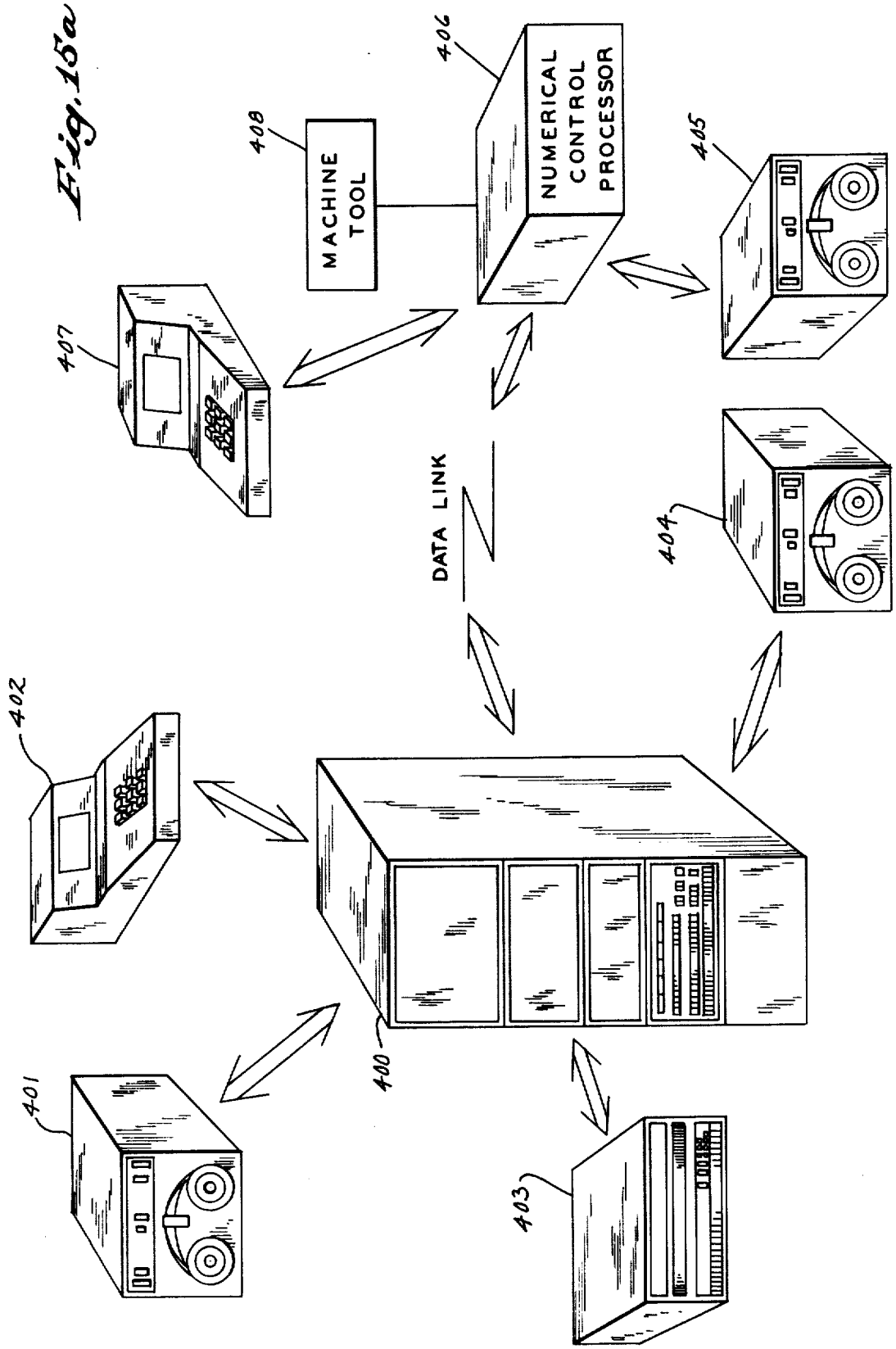

Referring to FIG. 15A, the invented numerical control system is shown in pictorial form in what is known in the art as a "direct numerical control system", or "DNC". The system includes a central processor 400 comprised essentially of a general purpose digital computer such as that manufactured by Control Data Corporation under the trademark "Model 1700". The central processor includes standard computer periferal equipment such as punched paper and magnetic tape readers 401 for entering raw data into the central processor 400, and a keyboard with associated graphic cathode ray tube (CRT) 402 for communication with the central processor 400. Additionally, a mass storage 403 of the moving head disc type is connected to the central processor 400 to store the raw input data and the generated surface state vectors.

The central processor 400 operates to perform the preprocessing function as previously described. It receives and stores the coordinate values and other boundary condition information of successive points on a trajectory to be generated, or it receives the coordinate values and other boundary condition information of a grid of data points which describe a three-dimensional surface to be generated. The central processor 400 is programmed to preprocess this input data according to the present invention and store the resulting complex state vectors and surface state vectors in the mass storage 403 as a series of command vectors V. The command vectors V along with associated auxiliary commands such as spindle speed, tool selection and coolant control comprise a parts program for the numerically controlled machine. A complete description of the structure and operation of the central processor 400 is made hereinafter.

Before proceeding further with the description of the processor 406 the organization of each command vector V will be described. Each 64-element command vector V is organized in a similar manner, although each differs from the other with respect to the particular data contained therein. Each element is a 32-bit binary coded word and the elements are stored at 64 successive addresses in the core memory of the digital computer 409. The following is a list of the elements of each command vector V.

| | | |
|---|---|---|
| 1. $x$ | 22. $\Delta_1 c_y$ | 43. $\Delta_2 d_z$ |
| 2. $\Delta_1 x$ | 23. $\Delta_2 c_y$ | 44. $\Delta_3 d_z$ |
| 3. $\Delta_2 x$ | 24. $\Delta_3 c_y$ | 45. $e_z$ |
| 4. $\Delta_3 x$ | 25. $d_y$ | 46. $\Delta_1 e_z$ |
| 5. $c_x$ | 26. $\Delta_1 d_y$ | 47. $\Delta_2 e_z$ |
| 6. $\Delta_1 c$ | 27. $\Delta_2 d_y$ | 48. $\Delta_3 e_z$ |
| 7. $\Delta_2 c$ | 28. $\Delta_3 d_y$ | 49. $n_T$ |
| 8. $\Delta_3 c$ | 29. $e_y$ | 50. $n_c$ |
| 9. $d_x$ | 30. $\Delta_1 e_y$ | 51. Mode [1,2,3,4] |
| 10. $\Delta_1 d_x$ | 31. $\Delta_2 e_y$ | 52. |
| 11. $\Delta_2 d_x$ | 32. $\Delta_3 e_y$ | 53. Boundary condition (T) |
| 12. $\Delta_3 d_x$ | 33. $z$ | 54. |
| 13. $e_x$ | 34. $\Delta_1 z$ | 55. |
| 14. $\Delta_1 e_x$ | 35. $\Delta_2 z$ | 56. |
| 15. $\Delta_2 e_x$ | 36. $\Delta_3 z$ | 57. Boundary condition (C) |
| 16. $\Delta_3 e_x$ | 37. $c_z$ | 58. |
| 17. $y$ | 38. $\Delta_1 c_z$ | 59. |
| 18. $\Delta_1 y$ | 39. $\Delta_2 c_z$ | 60. |
| 19. $\Delta_2 y$ | 40. $\Delta_3 c_z$ | 61. Feedrate (IPM) |
| 20. $\Delta_3 y$ | 41. $d_z$ | 62. SCAL [1] |
| 21. $c_y$ | 42. $\Delta_1 d_z$ | 63. SCAL [2] |
| | | 64. SCAL [3] |

In the DNC system now to be described, the parts program stored in the mass storage 403 is read out by a series of memory address signals generated at a machine tool station and transmitted by a numerical control processor 406 through a data link to the central processor 400. In response to each such address, a command vector V is transmitted by the central processor 400 through the data link to the numerical control processor 406 at the machine tool station. The DNC configuration is similar to that disclosed in U.S. Pat. No. 3,465,298, issued on Sept. 2, 1969 and entitled "Time Shared Automatic Machine Tool Control System" and which is commercially available from the Allen-Bradley Company under the trademark "System 70".

It should be apparent to those skilled in the art that although a DNC system is shown and described herein, the system can also be easily configured in what is commonly referred to as a CNC system (computer numerical control). When arranged in a CNC configuration, the parts program stored in the mass storage 403 is read out and recorded on punched paper tape by a tape punch 404. The resulting tape is maintained in a library with other parts programs from which it is manually selected and inserted in a tape reader 405 associated with the numerical control processor 406 at the numerically controlled machine.

The numerical control processor 406 is similar to that commercially available from the Allen-Bradley Company under the trademark Model 7300. It is built around a minicomputer and includes a keyboard with associated graphic CRT 407 for communications therewith. Referring specifically to FIG. 15, the numerical control processor 406 includes a general purpose digital computer indicated generally by the dashed lines 409. The compuuter 409 is manufactured by the Hewlett-Packard Company and is commercially available under the trademark Model 2100. As will be described in detail below, the computer 409 is programmed to receive and process both auxiliary commands and command vectors V, and to generate command signals which control the motions of a milling machine 410.

The computer 409 is connected through a lead 411 to a memory address generator 412. The memory address generator 412 is comprised of a set of shift registers which operate to receive and temporarily store command vector addresses generated by the computer 409. Such a command vector address is generated in response to a program instruction directed to MAG. The memory address generator 412 is synchronously operated to generate the received command vector address to the central processor 400 in serial form. The addressed command vector V is transmitted serially back to the numerical control processor 406 and is received at a data receiver 413. The elements of the vectors V are received in sequence and each is loaded serially into a buffer storage 414 through a lead 415. The buffer storage 414 is comprised of two cascade connected 1024-bit dynamic shifting registers. A 2048-bit vector may thus be received through the lead 415 and stored in the buffer storage 414. When a shift signal is applied to the buffer storage 414 by the computer 409 through a lead 417, the vector V stored therein is generated to the computer 409 through an output lead 416. The shift signal is generated by a program instruction containing the address BUFFSTOR. The received command vector V is stored in the core memory of the computer 409 at the addresses identified as STOR [1:64].

The digital computer 409 is connected to control the servo mechanisms on the milling machine 410. Specifically, it connects through a set of three output cables 418, 419 and 420 to respective X, Y and Z axis digital-to-analog converters indicated in FIG. 15 collectively by the block 421. Each digital-to-analog (D/A) converter operates to receive a twelve-bit position command word through the respective cables 418–20 and to generate a proportional analog signal to its servo amplifier (not shown in the drawings) on the milling machine 410. As will be described in more detail below, each twelve-bit command word applied to the D/A converters 421 is updated every 10.24 milliseconds to provide continuous control over the position of the cutter on the milling machine 410.

The digital computer 409 is also connected to receive X, Y and Z position feedback signals through a set of three input cables 422, 423 and 424. The input cables 422–424 connect to three 16-bit position accumulators indicated collectively in FIG. 15 by the block 425. The position accumulators 425 in turn connect to respective X, Y and Z shaft encoders (now shown in the drawings) on the milling machine 410 to receive digital incremental feedback pulses therefrom. These digital incremental feedback signals are accumulated over each 10.24 millisecond time interval to form 16bit incremental feedback words. The feedback words are generated to the digital computer 409 through the leads 422–424 in response to a program instruction containing the address IFB. After each set of incremental feedback words is generated to the computer 409, the position accumulators 425 are cleared, or set to zero, by a signal generated by the computer 409 through a lead 426.

The digital computer 409 is programmed to address specific command vectors stored at the central processor 400 to process them, and to generate position command words to the D/A converters 421. The stored program, or software system for performing these functions is modular in form. That is, the software is broken into functional blocks which are repeatedly called upon during processing. It should be apparent to those skilled in the art that although these functional blocks are each described herein in terms of a program which forms part of the software system for a general purpose digital computer, the functions performed may be executed equally as well using equivalent, hardwired logic circuits. Indeed, much of the circuitry described above in relation to the first embodiment of the invention may be substituted for portions of the software system now to be described.

The software system is indicated generally in block diagram form in FIG. 15, and since it is associated with the digital computer 409, it is shown contained therein. The programs for the digital computer 409 are all written in ALGOL, a well known language used for communicating with general purpose digital computers. This system includes an interpolation control routine 430 which operates generally to through the memory address generator 412 and the buffer storage 414 with the mass storage 403 at the central processor 400, and to set up the received command vectors V for processing. The software system also includes a mapping interpolator routine 431 which operates in conjunction with the interpolator control routine 430 to generate axis displacement words ($\Delta_i x$, $\Delta_i y$, $\Delta_i z$). The output of the mapping interpolator routine 431 is required by both a feedrate computer routine 432 and a linear interpolator routine 433. The feedrate computer routine 432 also receives a feedrate number contained in each command vector, and in response thereto, generates sample departure words required by the linear interpolator routine 433. The linear interpolator 433 is executed once every 10.24 milliseconds and it calculates X, Y and Z departure words for a servomechanism service routine 435 which is also executed once every 10.24 milliseconds. The intervals are timed by an interrupt clock 434 which halts normal processing every 10.24 milliseconds while the linear interpolation routine 433 and servomechanism service routine are executed. The servo mechanism service routine 435 receives the incremental feedback words from the position accumulators 425, calculates following error, and computes updated command words which are generated to the digital-to-analog converters 421. Each of these routines will now be described in more detail using a set of flow charts shown in FIGS. 16–23. In these flow charts the symbols and indexes developed in the above discussion under the heading "General Description of the Invention" have been used in place of more conventional programming characters. It is believed that this manner of describing the invention will clarify the description and that those skilled in the art will recognize that the symbols used herein may be converted to a form which is compatible with the programming language used.

The interpolator control routine 430 is shown in flow chart form in FIGS. 16–19. In addition to the memory space required to store the compiled interpolation control routine 430, memory space must also provided to store the following variables, indexes and flags.

| VARIABLES | DESCRIPTION |
|---|---|
| MODE [1,2,3,4] | a two-bit word which identifies the manner in which the spacial form is to be generated |
| MAG | a 16-bit word which addresses a command vector V through the memory address generator |
| STOR [1:64] | 64 successive 32-bit words in memory at which the command vector elements are stored |
| $n$, $n_c$ | 32-bit granularity numbers which indicate the number of iterations to be performed between data points |
| $A^j$, $B^j$ | 4-bit words which indicate the limits of the spacial form in the trajectory direction |
| $A^J$, $B^J$ | 4-bit words which indicate the limits of the spacial form in the cross section direction |
| $x$, $\Delta_1 x$, $\Delta_2 x$, $\Delta_3 x$ $y$, $\Delta_1 y$, $\Delta_2 y$, $\Delta_3 y$ $z$, $\Delta_1 z$, $\Delta_2 z$, $\Delta_3 z$ | twelve 32-bit words which temporarily store the elements of the complex state vector |
| INDEX | |
| J | a 4-bit word which indicates the line segment being generated in the cross section direction |
| j | a 4-bit word which indicates the line segment being generated in the trajectory direction |
| u | a 2-bit word used to address successive elements of the command vector V |
| AX | a 5-bit word used to address elements of the command vector V |
| I | a 32-bit word which indicates iterations in the cross section direction |
| FLAGS | |
| LOADED | a 1-bit word which indicates the status of the buffer storage |

Figure 16:
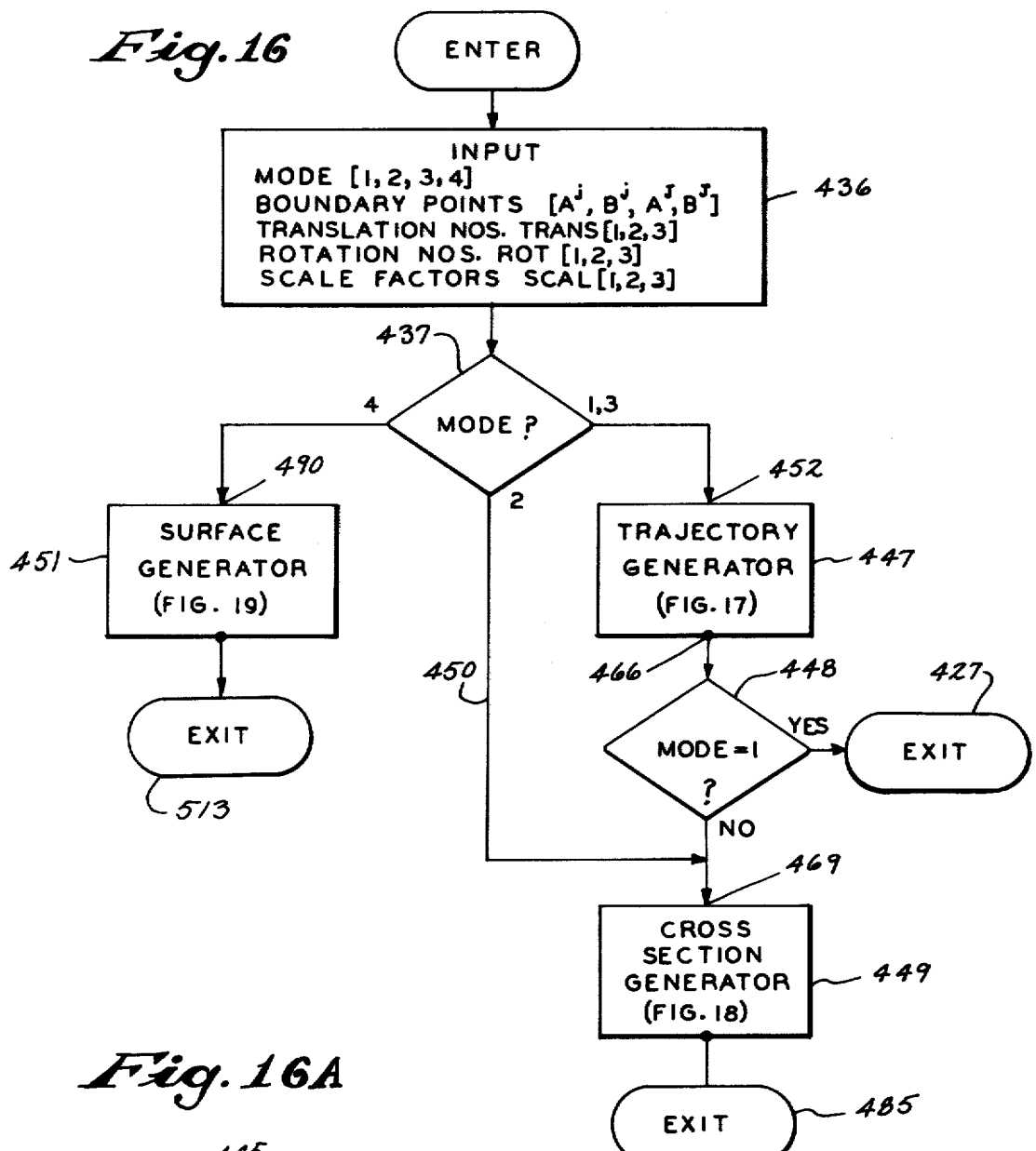
FIGS. 16, 17, 18 and 19 are flow charts of the interpolation control routine which forms a part of the system of FIG. 15.
Figure 16A:
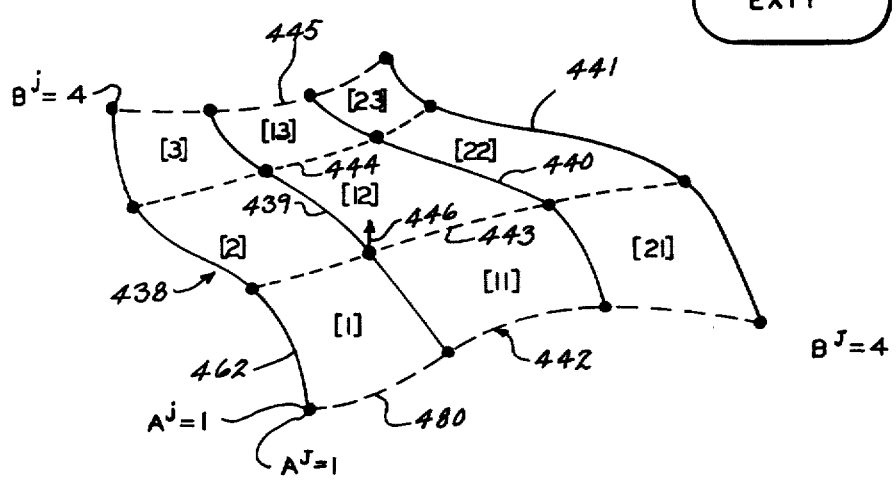
FIG. 16A is a graphic illustration used as an aid in visualizing the operation of the interpolation control routine of FIGS. 16–19.

The interpolation control routine 430 generates complex state vectors for the mapping interpolator routine 431, granularity numbers for the mapping interpolator routine 431, and feedrate numbers for the feedrate computer routine 432. Referring to FIG. 16, the routine is initiated by selecting which one of the four modes of operation is to be executed and establishing the boundaries of the spacial form to be generated. The selected mode (MODE [1,2,3 or 4]) and the boundary points ($A^j$, $B^j$, $A^J$, $B^J$) are entered using the keyboard 407. Referring momentarily to FIG. 16a, for example, a three-dimensional surface is described by a grid of data points and is defined by a set of state vectors. The surface is bounded by the trajectory 438 passing through the boundary point $A^J= 1$, the trajectory 441 through the boundary point $B^J= 4$, and cross section 442 and 445 passing through the respective boundary points $A^j=1$ and $B^j=4$. When operated in MODE [1] the numerical control processor 406 generates a trajectory, or series of trajectories such as the four trajectories indicated by the solid lines 438–441. On the other hand, when operated in MODE [2] the processor 406 generates trajectories which drive the milling machine cutter across the workpiece in the cross section direction as exemplified by the dashed lines 442–445. The third mode of operation, MODE [3], operates the numerical control processor 406 to generate the trajectories 438–441 and then the cross sections 442–445. The resulting mesh provides a rough outline of the three-dimensional surface and is particularly useful to provide a rapid display of the part to be machined before the milling machine 410 is operated.

As shown in the example of FIG. 16a, the grid of data points which describe the three-dimensional surface to be machined divide the surface into a plurality of patches. Each such patch is defined by a 48-element surface state vector which forms part of a command vector V. The fourth mode of operation, MODE [4], operates the numerical control processor 406 to generate the entire surface. This is accomplished by processing successive command vectors V with the result that the surface is generated one patch at a time. The command vectors V are stored in sequence at the central processor 400 and are addressed by using the following formula: $[10(J-1)+j]$. The addresses of the command vectors for the respective patches on the surface in FIG. 16a are indicated by the bracketed numbers. For example, the patch bounded on two sides by the trajectory at $(j=2)$ and the cross section at $(J=2)$ is defined by a surface state vector indicated by the arrow 446 located at the address [12] in the mass storage drum 403.

After the necessary input data is supplied through the keyboard 407, an operate pushbutton is depressed and the numerical control processor 406 commences automatic operation. The first set of instructions, indicated by the decision block 437, determines the mode of operation. If either MODE [1](trajectories) or MODE [3] (mesh) is selected a routine identified as the trajectory generator 447 is entered and executed. The trajectories between the boundary points $A^J$ and $B^J$ are then generated, and the next step, indicated by the decision block 448, determines whether a mesh is to be generated. If not, the interpolation control routine is exited at the point 427. If, on the other hand, a mesh is to be generated, a second routine identified as the cross section generator 449 is entered and executed. The successive cross sections between the boundary points $A^j$ and $B^j$ are thus generated. The interpolation control routine 430 is then exited.

If MODE [2] is selected, only cross sections are generated. In this instance the trajectory generator routine 447 is bypassed as indicated by the line 450, and the cross section generator routine 449 is executed directly. Finally, if MODE [4] is selected, a surface generator routine indicated by the block 451 is entered and executed. Each of the routines 447, 449 and 451 will now be described in detail with reference made to the flow charts in FIGS. 17, 18 and 19, respectively.

Figure 17:
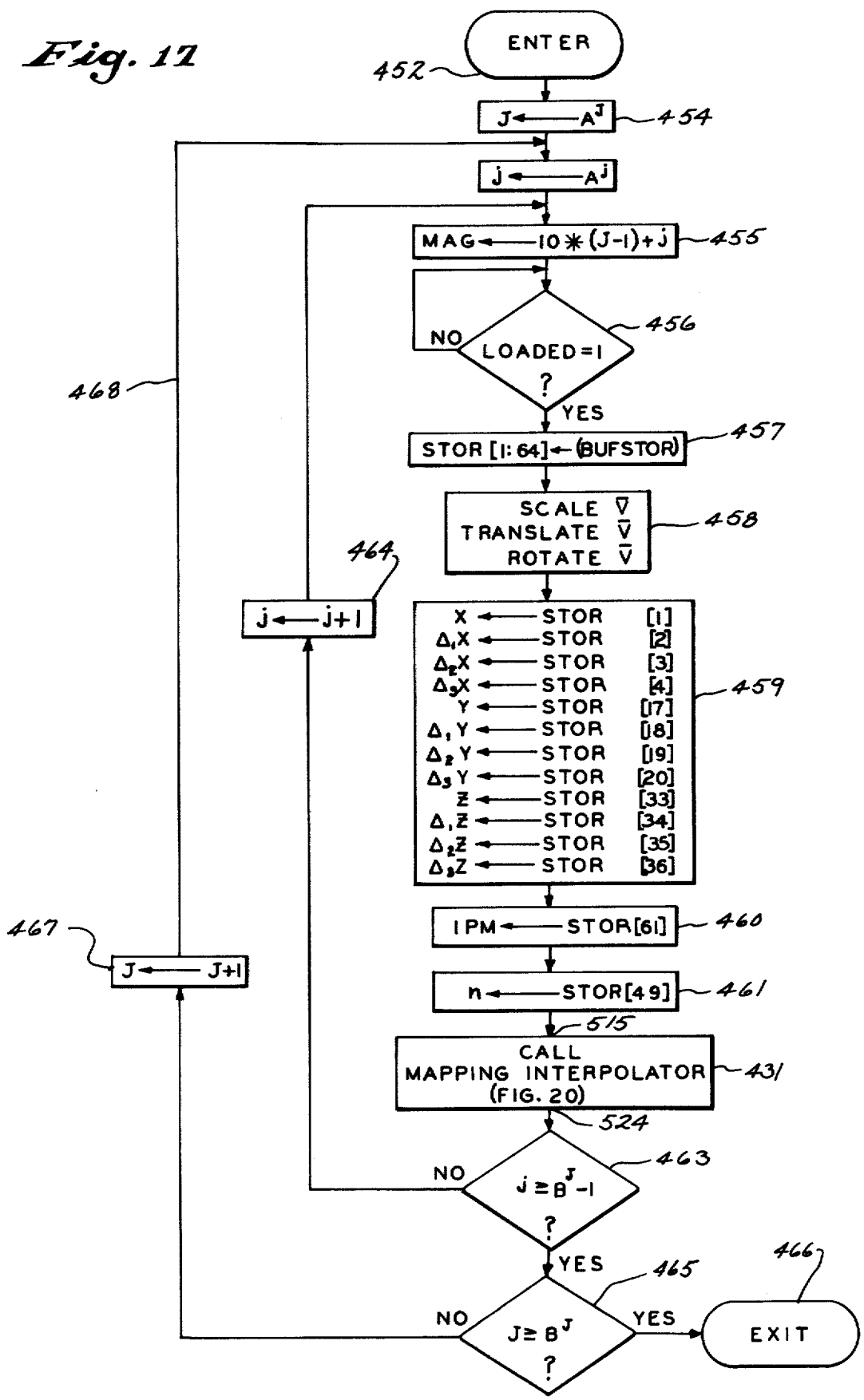

Referring to FIG. 17, the trajectory generator routine 447 is entered at the point 452 and the first step indicated by the process block 453 is to set the J index to the specified initial cross section boundary point $A^J$. The second step, as indicated by the process block 454, is to set the indexed $j$ to the specified initial trajectory boundary point $A^j$. Next, as indicated by the process block 455 the command vector V containing the complex state vector at the starting point is obtained from the central processor 400. This is accomplished by generating the address $[10(J-1)-j]$ to the memory address generator 412. The addressed command vector V is transmitted to the data receiver 413 and stored in the buffer storage 414. When the entire 64-element vector is received at the buffer storage 414, a flag identified as LOADED is set to 1 and the trajectory generator routine 447 continues. Until the entire command vector is received, however, processing is halted by a wait loop established by the decision block 456.

The received 64-element command vector V is then transferred from the buffer storage 414 to a location in the core memory of the digital computer 409 identified as STOR [1:64]. This step is indicated by the process block 457. The command vector V is then scaled, translated, and rotated if necessary for display purposes. This is indicated generally by the process block 458 which will be described in more detail hereinafter.

As indicated by the process block 459, the next step is to extract the twelve elements of the initial complex state vector from the command vector V and store them at the locations identified respectively as $x$, $\Delta_1 x$, $\Delta_2 x$, $\Delta_3 x$, $y$, $\Delta_1 y$, $\Delta_2 y$, $\Delta_3 y$, $z$, $\Delta_1 z$, $\Delta_2 z$, $\Delta_3 z$. The elements of the initial complex state vector are extracted from the locations STOR [1, 2, 3, 4, 17, 18, 19, 20, 33, 34, 35, 36]. Next, as indicated by the process block 460, the feedrate number located at STOR [61] is entered into the storage location identified as IPM. Finally, the granularity number $n_T$ at STOR [49] is entered into the temporary storage location identified as $n$. This is performed by an instruction indicated by the process block 461.

The data is now set up for the mapping interpolator routine 431 which is called and executed. Referring to the example surface in FIG. 16a, the mapping interpolator routine 431 operates to generate the initial trajectory segment identified by the line 462. The trajectory generator routine 447 is then re-entered to determine whether further trajectory segments are specified. This is accomplished by an instruction indicated by the decision block 463 which compares the index $j$ with the final boundary point $B^j$. When the index j equals one less than the boundary point $B^j$, the first trajectory is completed. Otherwise, the index $j$ is incremented one count as indicated by the process block 464 and the program is re-executed, or cycled one more time. In the example of FIG. 16a, two more trajectory segments must be generated to reach the specified final boundary point $B^j = 4$. Thus, two more cycles through the inner loop, or $j$ loop of the trajectory generator routine 447 are required. At the beginning of the second and subsequent cycles through the trajectory generator routine 447, a new command vector V is trajectory from the central processor 400. The initial complex state vector contained therein is extracted and applied to the mapping interpolator routine 431 as during the first cycle. The command vectors V stored at the successive addresses [1], [2] and [3] are thus obtained from the central processor 400 and used to generate the entire boundary trajector 438.

After the condition $j \geq B^j - 1$ is met, a second test is made to determine whether additional trajectories are specified. This is accomplished by an instruction indicated by a second decision block 465 in which the value of the index J is compared to the quantity $B^J$. In the example of FIG. 16a, three additional trajectories 439–441 are specified and the condition $J = 4$ is not satisfied. The index J is, therefore, incremented one count as indicated by the process block 467 and an additional cycle through an outer, or J loop is made. For each of the subsequent three cycles through the outer J loop, three cycles are made through the inner $j$ loop. Finally, when the condition indicated by the decision block 465 is met, the trajectory generator routine 447 is exited at the point 466.

Figure 18:
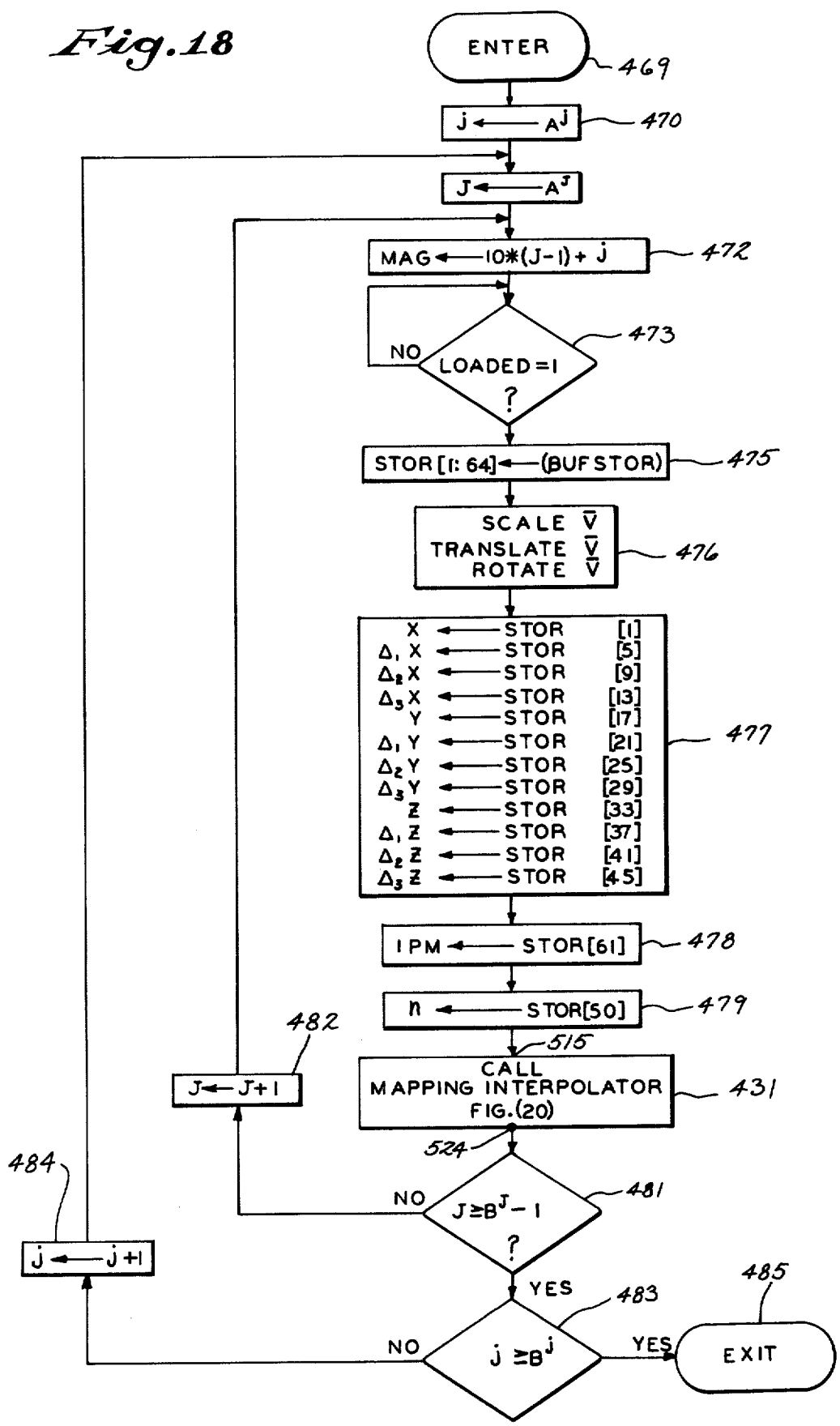

Referring to FIG. 18, the cross section generator routine 449 is quite similar in operation the trajectory generator routine 447 discussed above. The two major distinctions, however, are that the indexes $j$ and J have been interchanged and different elements from the command vector V are selected for application to the mapping interpolator routine 431. More specifically, the cross section generator routine is entered at the point 469 and the index $j$ is set to the value $A^j$ as indicated by the process block 470. The index J is then set to the value $A^J$ as indicated by the process block 471 and the first command vector V is addressed through the memory address generator 412 is indicated by the process block 472. The routine is held in a wait loop formed by a decision block 473 until the LOADED flag is set to 1 indicating that the desired command vector V has been transmitted to the buffer storage 414. The contents of the buffer storage 414 are then transferred to the core memory locations STOR [1:64] as indicated by the process block 475. The command vector V is then scaled, translated, and rotated as indicated by the process block 476 and twelve selected elements therein are then extracted to form an initial complex state vector for the mapping interpolator routine 431. This is performed by a set of twelve instructions indicated collectively by a process block 447. More specifically, STOR [5, 9, 13, 17, 21, 25, 29, 33, 37, 41, 45] are inserted at the respective locations, $x$, $\Delta_1 x$, $\Delta_2 x$, $\Delta_3 x$, $y$, $\Delta_1 y$, $\Delta_2 y$, $\Delta_3 y$, $z$, $\Delta_1 z$, $\Delta_2 z$ and $\Delta_3 z$. It should be noted that the twelve elements set up by the cross section generator routine for the mapping interpolator routine do not correspond with those set up by the trajectory generator routine 447. It is a feature of the present invention that a surface defined by a surface state vector may be generated either by a series of closely spaced trajectories which are generated in the trajectory direction, or by a series of closely spaced cross sections generated in the cross section direction. In other words, the system is symmetrical in both the trajectory and cross section directions and the manner in which the spacial form is generated varies depending on the choice of elements applied to the mapping interpolator.

The cross section generator routine 449 selects and applies the elements $x$, $c_x$, $d_x$, $e_x$ $y$, $c_y$, $d_y$, $e_y$, $z$, $c_z$, $d_z$, $e_z$ to the mapping interpolator. These elements along with the feedrate number IPM at STOR [61] and the granularity number $n_c$ at STOR [50] are applied to the mapping interpolator routine 431 as indicated by the respective process blocks 477, 478 and 479. The mapping interpolator routine 431 generates one cross section segment such as that indicated in FIG. 16a by the dashed line 480, and the cross section generator routine 449 is re-entered. A comparison is then made between the index J and the quantity $B^j - 1$ to determine whether further cross section segments are specified. This is indicated by the decision block 481. In the example of FIG. 16a, $B^J = 4$ and, therefore, two additional caoss section segments are specified to complete the first cross section. The index J is incremented one count as indicated by the process block 482 and two additional cycles through the inner J loop are performed.

After completion of a cross section by means of one or more cycles through the J loop, a test is made to determine whether further cross sections are specified. This is indicated by the second decision block 483 in which the value of the outer loop index $j$ is compared with the value of the final trajectory boundary point $B^j$. In the example of FIG. 16a, $B^j$ is equal to 4 and, therefore, three additional cross sections 443-445 are specified. Three additional cycles through the outer $j$ loop are thus required, the index $j$ being incremental by one count after each until $j = B^j = 4$. This condition being satisfied, the cross section generator routine 449 is exited at the point 485.

Figure 19:
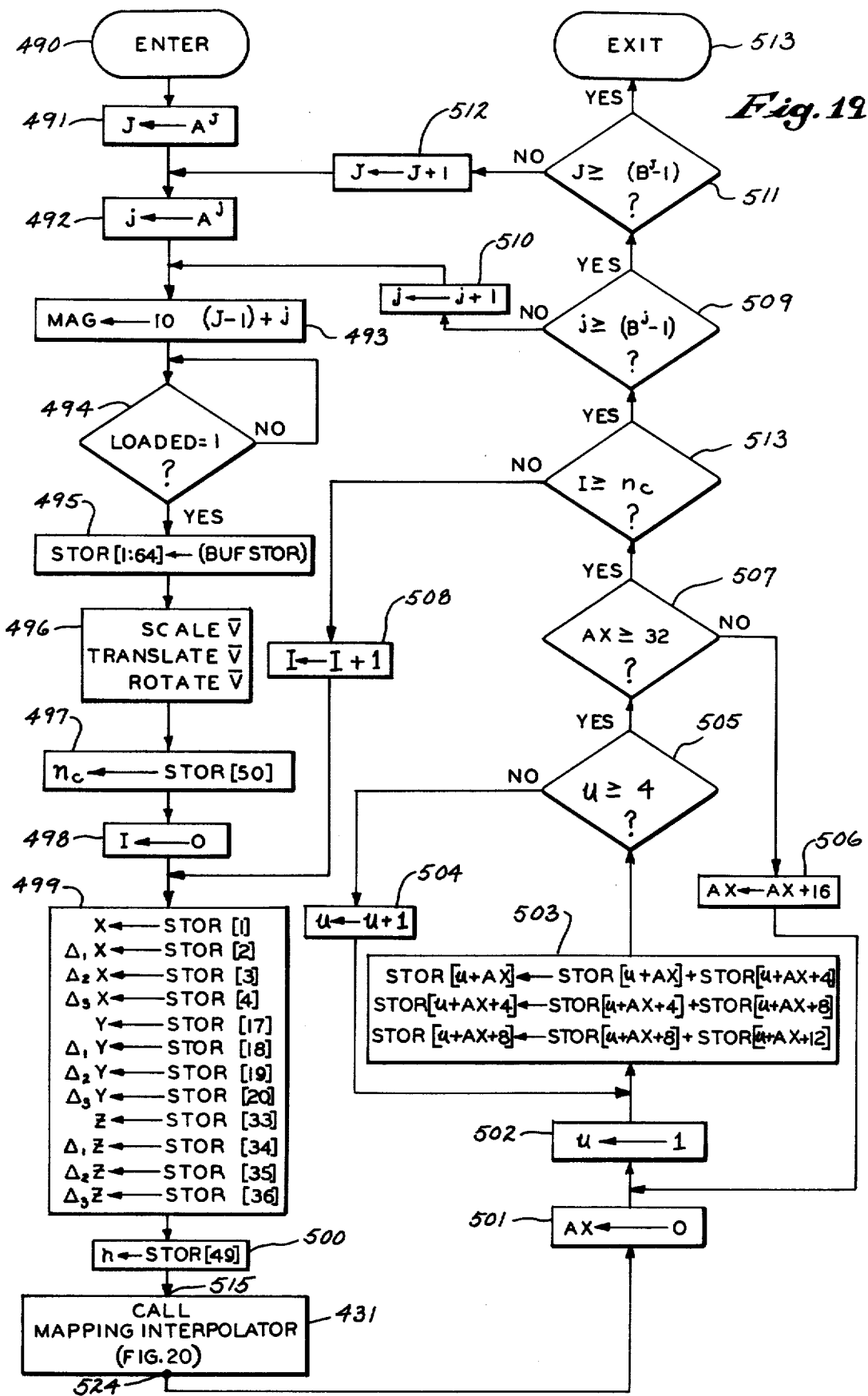

The surface generator routine 451 operates to generate successive patches of the defined surface and in the example of FIG. 16a, the successive patches [1], [2], [3], [11], [12], . . . [23]. Referring to FIG. 19, the surface generator routine 451 is entered at the point 490 and the index J is set to the value $A^J$, and the index $j$ is set to the value $a^j$ as indicated by the respective process blocks 491 and 492. The initial command vector V is addressed through the memory address generator 412 as indicated by the process block 493, and is received at the buffer storage 414. A wait loop is formed by the decision block 494 to halt further processing until the entire command vector V is received and the flag LOADED is set to 1. The contents of the buffer store 414 are then transferred to the respective core memory addresses STOR [1:64] as indicated by the process block 495.

The surface state vector contained in the command vector V is extracted, scaled, translated and rotated as indicated by the process block 496. The cross section granularity number is then stored at the address $n_c$ as indicated by the process block 497, and the iteration index I is set to zero as indicated by the process block 498. By means of a set of twelve instructions indicated collectively bh the process block 499, the elements of the initial complex state vector STOR [1-4, 17-20, 33-36] are entered into the respective temporary storage locations $x$, $\Delta_1 x$, $\Delta_2 x$, $\Delta_3 x$, $y$, $\Delta_1 y$, $\Delta_2 y$, $\Delta_3 y$, $z$, $\Delta_1 z$, $\Delta_2 z$, $\Delta_3 z$. The trajectory direction granularity number at STOR [49] is then entered at the location $n$ as indicated by the process block 500. The data is now set up and the mapping interpolator routine 431 is called and executed to generate a trajectory segment such as that indicated by the line 462 in FIG. 16a.

The next step in the surface interpolation process is to iterate the entire surface state vector once in the cross section direction. This is accomplished by executing equations (25) discussed under the heading "General Description of the Invention" for each of the axes of motion. More specifically, the axis index AX is set to zero as indicated by the process block 501 and the index $u$ is set to 1 as indicated by the process block 502. Equations (25) are then executed by making four successive cycles around $u$ loop which includes three instructions that are collectively indicated by the process block 503. Each cycle is counted using the index $u$ which is incremented one count as indicated by the process block 504. When $u=4$ as determined by an instruction in the decision block 505, the $u$ is exited. The calculations performed during the four cycles through the u loop are indicated by the following equations.

$$AX=0 \begin{cases} x - & x + c_x \\ c_x - & c_x + d_x \\ d_x - & d_x + e_x & U=1 \\ e_x & \text{unchanged} \\ \Delta_1 x - & \Delta_1 x + \Delta_1 c_x \\ \Delta_1 c_x - & \Delta_1 c_x + \Delta_1 d_x \\ \Delta_1 d_x - & \Delta_1 d_x + \Delta_1 e_x & U=2 \\ \Delta_1 e_x & \text{unchanged} \\ \Delta_2 x - & \Delta_2 x + \Delta_2 c_x \\ \Delta_2 c_x - & \Delta_2 c_x + \Delta_2 d_x \\ \Delta_2 d_x - & \Delta_2 d_x + \Delta_2 e_x & U=3 \\ \Delta_2 d_x - & \text{unchanged} \\ \Delta_3 x - & \Delta_3 x + \Delta_3 c_x \end{cases}$$

-Continued

| | | |
|---|---|---|
| $\Delta_3 c_r$ | $\Delta_3 c_r + \Delta_3 d_r$ | |
| $\Delta_3 d_r$ | $\Delta_3 d_r + \Delta_3 c_r$ | U=4 |
| $\Delta_3 e_r$ | unchanged | |

After the first set of four cycles through the u loop, the axis index AX is incremented by 16 and four more cycles are made to make the above calculations on the y axis elements of the surface state vector. Similarly, the axis index AX is again incremented to AX=32 to iterate the z axis elements once in the cross section direction. When AX=32 the condition established by the decision block 507 is satisfied and the entire surface state vector has been altered.

Next, the index I is compared with the cross section granularity number $n_c$ to determine whether additional trajectories are needed to complete the generation of the first surface patch [1]. This test is made by an instruction indicated by the decision block 513, and if additional trajectories are specified, the index I is incremented by one count as indicated by the process block 508. An additional cycle through the I loop is thus made, commencing with the instructions indicated by the process block 499. In summary, the first patch on the surface is formed by a succession of closely spaced trajectory segments generated by successive cycles through the I loop. The entire surface state vector is iterated once in the cross section direction during each cycle using the transition matrix of equation (16) discussed previously.

Upon completion of the first surface patch [1], a test is made to determine whether additional patches in the trajectory direction are specified (i.e., patches [2-10]). This test is conducted by an instruction indicated by the decision block 509 in which the index j is compared with the quantity $B^j - 1$.

If further surface patches are specified, the index j is incremented by one count as indicated by the process block 510 and an additional cycle through the j loop commencing with the process block 493 is performed. Additional surface patches are thus generated in succession in the trajectory direction until the condition established by the boundary point $B^j$ is satisfied. In the example of FIG. 16a three cycles through the j loop are executed to generate the surface patches [1, 2 and 3] in the first row.

After the first row of surface patches has been generated a test is made to determine whether additional rows of patches are specified, or in other words, whether additional patches in the cross section direction are to be generated. This is accomplished by comparing the value of the cross section index J with the quantity $B^J - 1$ as indicated by the decision block 511. If additional rows are specified, the index J is incremented by one count as indicated by the process block 512 and an additional cycle through the J loop is executed commencing with the process block 492. In the example of FIG. 16a, two additional rows containing the patches [11, 12 and 13] and [21, 22 and 23] respectively are specified by the boundary point variable $B^J$. At the completion of the surface patch [23], the conditions specified in the respective decision blocks 513, 509 and 511 are satisfied and the surface generator routine 451 is exited at the point 513.

As indicated by the above discussion, regardless of the mode of operation or the nature of the spacial form to be generated, the interpolation control routine 430 operates to provide a succession of twelve element complex state vectors to the mapping interpolator routine 431 along with a succession of associated granularity numbers n.

Figure 20:
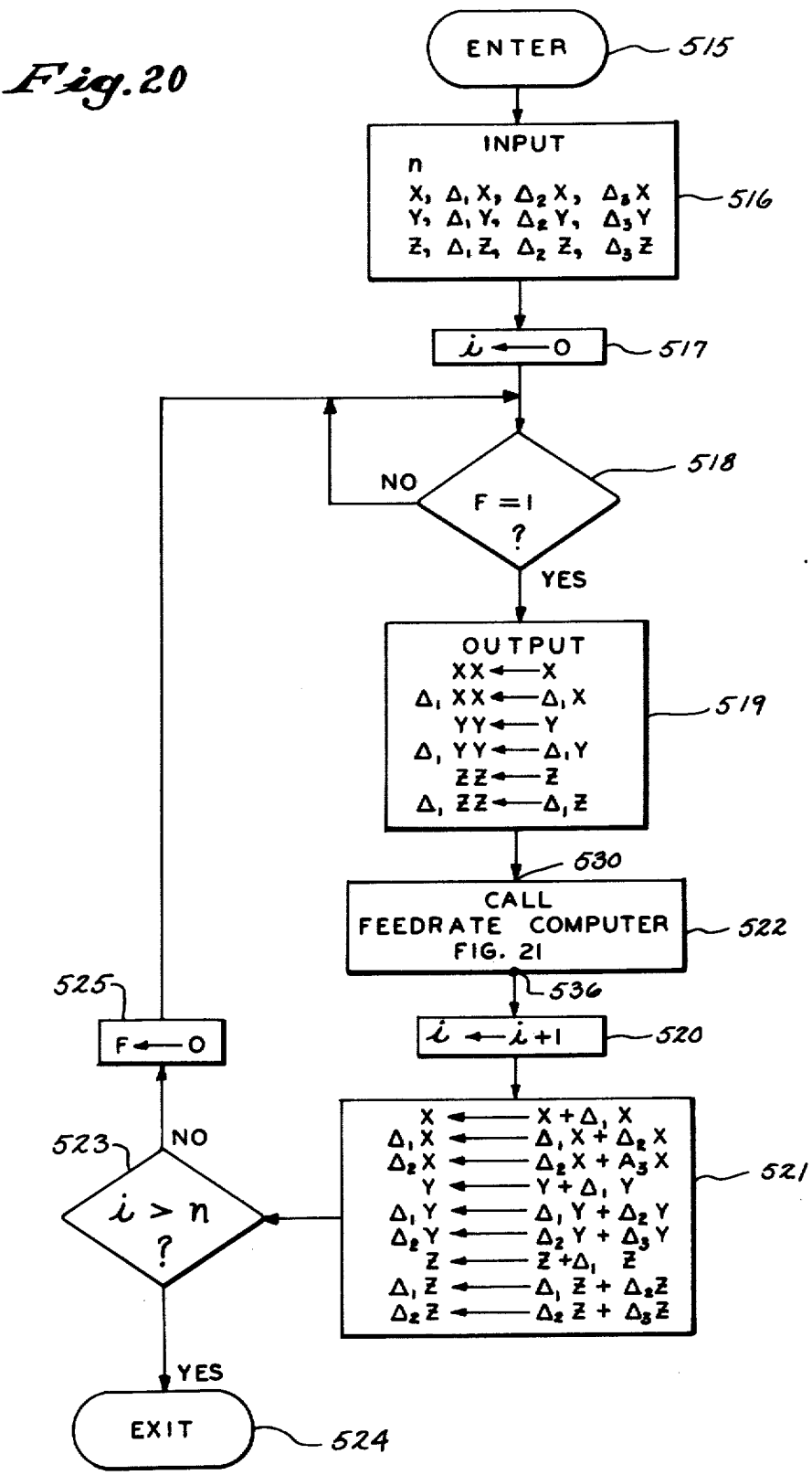
FIG. 20 is a flow chart of the mapping interpolator routine which forms a part of the system of FIG. 15.

Referring to FIGS. 15 and 20, the compiled mapping interpolator routine 431 is stored in the digital computer 409 along with the following variables, flag and index.

| VARIABLES | DESCRIPTION |
|---|---|
| $xx, \Delta_1 xx, yy,$ $\Delta_1 yy, zz, \Delta_1 zz$ | six 32-bit words which temporarily store elements of the state vector |
| INDEX $i$ | a 16-bit word which indicates the number of iterations performed by the mapping interpolator |
| FLAG F | a one-bit word which indicates when further command information is required from the mapping interpolator |

The mapping interpolator routine 431 is entered at the point 515 when called by the interpolation control routine 430. The granularity number n and the twelve element complex state vector are inputs to the routine as indicated by the process block 516. The first step is to set the iteration index i to zero as indicated by the process block 517, followed by a weight loop in which the condition of the flag F is tested as indicated by the decision block 518. When additional position command data is required by the linear interpolation routine 433, the flag F is set to 1 and the elements $x, \Delta_1 x, y, \Delta_1 y, z, \Delta_1 z$ are outputed to temporary locations identified by the respective addresses $xx, \Delta_1 yy, \Delta_1 zz, \Delta_1 zz$. This operation is performed by a set of six instructions indicated collectively by the process block 519. The feedrate computer is then called to make its calculations using the $\Delta_1 xx, \Delta_1 yy,$ and $\Delta_1 zz$ values as indicated by the process block 522. Upon re-entering the mapping interpolator routine 431, the iteration index i is incremented by one as indicated by the process block 520 and the complex state vector is then iterated once by altering nine of its twelve elements with a set of nine instructions indicated collectively by the process block 521. These nine instructions effectively apply the transition matrix of equation (16) discussed above to the complex state vector. The next instruction indicated by the decision block 523 determines whether further iterations are required to complete the trajectory segment. This is accomplished by comparing the iteration index i with the granularity number n, and if $i$ n, the last iteration has been made and the the program is exited at the point 524 back to the interpolation control routine 430. Otherwise, the flag F is set to zero as indicated by the process block 525 and another iteration, or cycle through the i loop is executed beginning at the decision block 518.

Further interpolation is stopped by the wait loop established by the decision block 518 until further command data is requested by the linear interpolator routine 433. When this occurs the flag F is set to 1 and the mapping interpolator routine 431 continues by immediately outputing command data as indicated by the process block 518.

Figure 21:
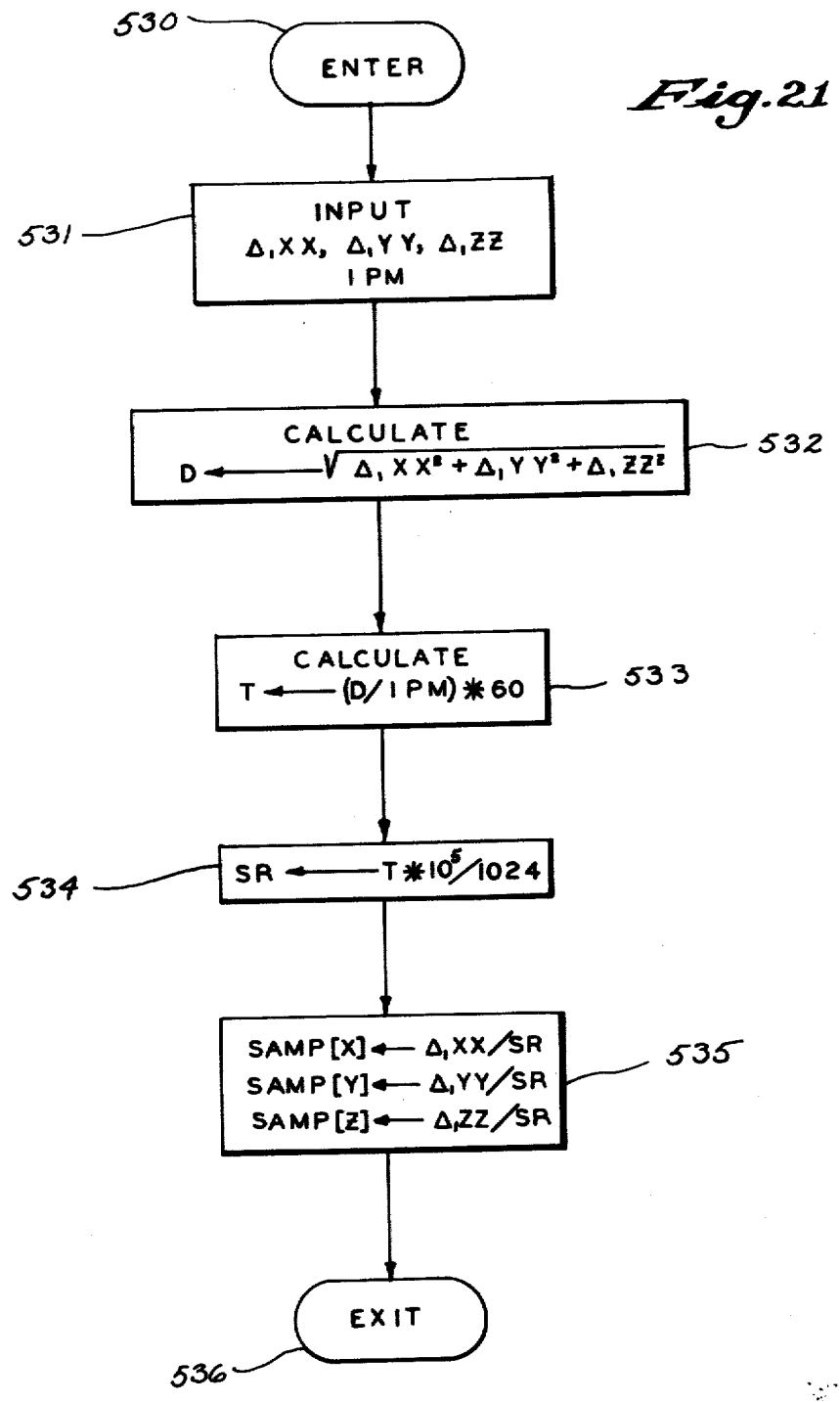
FIG. 21 is a flow chart of the feedrate computer routine which forms a part of the system of FIG. 15.

Referring to FIGS. 15 and 21, the feedrate computer routine 432 is entered at the point 530 each time the mapping interpolator routine 431 is iterated, or cycled through its i loop. The command data which is generated by the mapping interpolator and stored at $\Delta_1xx$, $\Delta_1yy$, and $\Delta_1zz$ is input to the feedrate computer routine 432 along with the feedrate number at IPM. This is indicated by the process block 531. In addition to the memory space required to store the compiled feedrate computer routine, space is required for the following variables.

| VARIABLE | DESCRIPTION |
| --- | --- |
| D | a 32-bit binary word which indicates a commanded distance |
| T | a 32-bit word which indicates the time required to travel the distance D at the specified feedrate |
| SR | a 32-bit word which indicates the number of ten millisecond time intervals |
| SAMP [x,y,z] | three 32-bit words which indicate the commanded distance along each axis of motion for a ten millisecond time interval |

As indicated by the process block 532, the first step performed by the feedrate computer routine 532 is to calculate the total straight line displacement ordered by the mapping interpolator and to store this quantity at D. The distance is calculated by computing the square root of the sum of the squares of the variables $\Delta_1xx$, $\Delta_1yy$ and $\Delta_1zz$. The quantity D indicates the total straight line distance commanded by the mapping interpolator 431 after each iteration. As indicated by the process block 533, this dimension is then divided by the commanded feedrate number IPM, multiplied by the integer sixty, and the result is stored at T. The resulting number at T indicates the time in seconds required to travel the distance (D) at the commanded feedrate (IPM). The next step indicated by the process block 534 is to divide the total time (T) by the 10.24 millisecond time interval established by the interrupt clock 434. The result is truncated to form a whole number, or integer, which is stored at SR and which indicates the number of 10.24 millisecond time intervals required to travel the commanded distance at the specified feedrate. The final step performed by the feedrate computer routine 432 is to divide the respective commanded displacements $\Delta_1xx$, $\Delta_1yy$, $\Delta_1zz$ by the number at SR. This computation is performed by a set of three instructions indicated collectively in FIG. 21 by the process block 535, and the results are stored at respective addresses SAMP [x], SAMP [y] and SAMP [z]. The feedrate computer routine 432 is exited at the point 536 back to the mapping interpolator routine 431.

Figure 22:
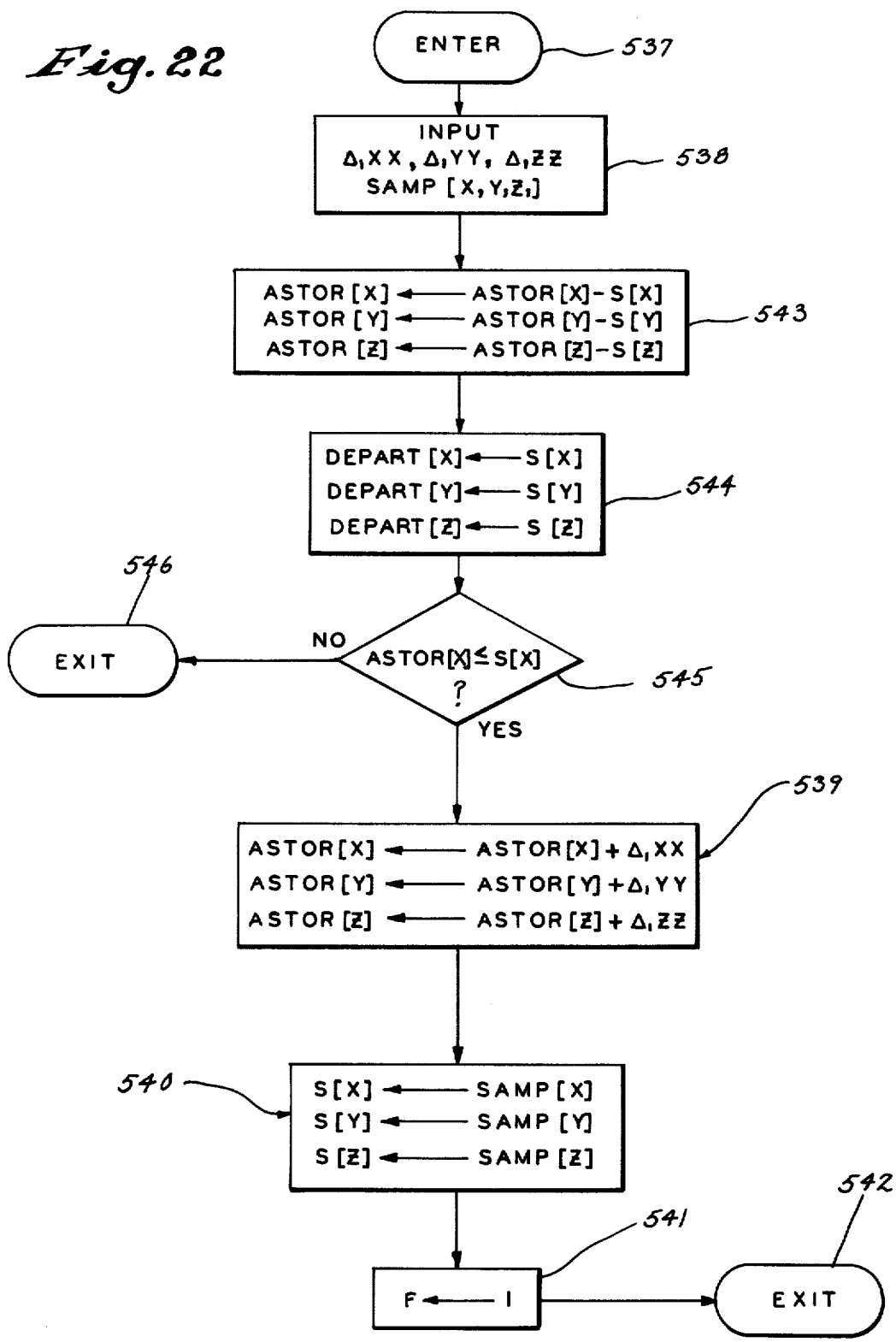
FIG. 22 is a flow chart of the linear interpolator routine which forms a part of the system of FIG. 15.

Referring to FIGS. 15 and 22, the linear interpolator routine 433 is executed every 10.24 milliseconds in response to the interrupt clock 434. The program is entered at the point 537 and the displacement numbers $\Delta_1xx$, $\Delta_1yy$, and $\Delta_1zz$, along with the sample numbers SAMP [x,y,z] are inputs as indicated by the process block 538. In addition to the memory space required to store the compiled linear interpolator routine 433, space is required for the following variables.

| VARIABLE | DESCRIPTION |
| --- | --- |
| ASTOR [x,y,z] | three 32-bit words which indicate the commanded distance yet to travel along each axis of motion |
| DEPART [x,y,z] | three 16-bit departure words which indicate the distance to travel each 10.24 milliseconds time interval |
| S [x,y,z] | three 16-bit departure words which indicate the distance to travel to maintain the specified feedrate |

When the first interrupt occurs after the numerical control processor 406 is energized the variables ASTOR [x,y,z], S [x,y,z] and DEPART [x,y,z] are at zero and the linear interpolator routine 433 commences processing with a set of three instructions indicated collectively by the process block 539. These instructions take the axis displacement commands $\Delta_1xx$, $\Delta_1yy$, and $\Delta_1zz$ generated by the mapping interpolator routine 431 and store them at the respective addresses ASTOR [x], ASTOR [y] and ASTOR [z]. Similarly, as indicated collectively by the process block 540, the sample departure numbers SAMP [x,y,z] generated by the feedrate computer routine 432 are stored at the respective addresses S [x], S [y], and S [z]. Finally, the flag F is set to 1 as indicated by the process block 541 and the linear interpolator routine 433 is exited at the point 542 directly to the servomechanism service routine 535. As discussed previously, the flag f indicates to the mapping interpolator routine 431 that an additional iteration is required to generate another set of output data.

During subsequent interrupts, the linear interpolator routine 433 is entered at the point 537 and three instructions indicated collectively by the process block 543 are executed. These instructions diminish the respective axis displacement numbers ASTOR [x, y and z] by the respective axis departure numbers S [x, y and z]. The sample, or departure numbers at S [x,y,z] are subtracted from the respective displacement numbers at ASTOR [x,y,z] and the resulting diminished displacement numbers are restored at ASTOR [x,y,z]. The next step as indicated by the process block 544 is to insert the sample numbers S [x,y,z] into the memory locations DEPART [x,y,z] for later use by the servomechanism service routine 435, and the final step indicated by the decision block 545 is to determine whether the distance, or displacement values have been diminished to less than the sample numbers S [x,y,z]. This is accomplished by comparing the present value of the x axis displacement number ASTOR [x] with the x axis sample number S [x]. If the displacement number is equal to or less than the sample number, additional input data from the mapping interpolator routine 431 is indicated and the displacement numbers ASTOR [x,y,z] are thereafter updated as described above and indicated by the respective process blocks 539, 540 and 551. If ASTOR [x] is greater than S [x], however, the linear interpolator routine 433 is exited at the point 546 to the servomechanism service routine 435.

In summary, the linear interpolator routine 433 operates to receive the axis displacement numbers $\Delta_1xx$, $\Delta_1yy$, and $\Delta_1zz$ from the mapping interpolator routine 431 and the sample dimensions SAMP [x,y,z] from the feedrate computer routine 432. During each 10.24 millisecond interrupt, the linear interpolator routine 433 operates to diminish each axis displacement dimension by the respective axis sample dimensions until the displacement dimensions are reduced to less than one sample. A new set of displacement dimensions are then requested from the mapping interpolator routine 431 along with a new set of sample dimensions from the feedrate computer routine 432. By setting the flag F to 1, the linear interpolator routine 433 directs the mapping interpolator routine 431 to iterate and to thereby generate a new set of displacement data.

The servomechanism service routine 435 is executed during every 10.24 millisecond interrupt immediately after the linear interpolator routine 433 is executed. In addition to the space required to store the compiled servomechanism service routine 435, space is also required for the following variables.

| VARIABLES | DESCRIPTION |
|---|---|
| COM [x,y,z] | three 12-bit command words which are generated to the D/A converters |
| IFB [x,y,z] | three 16-bit words which comprise the incremental feedback information received from the position accumulators 425 |
| FE [x,y,z] | three 16-bit words which indicate the following error of the respective x,y,z servomechanisms |

Figure 23:
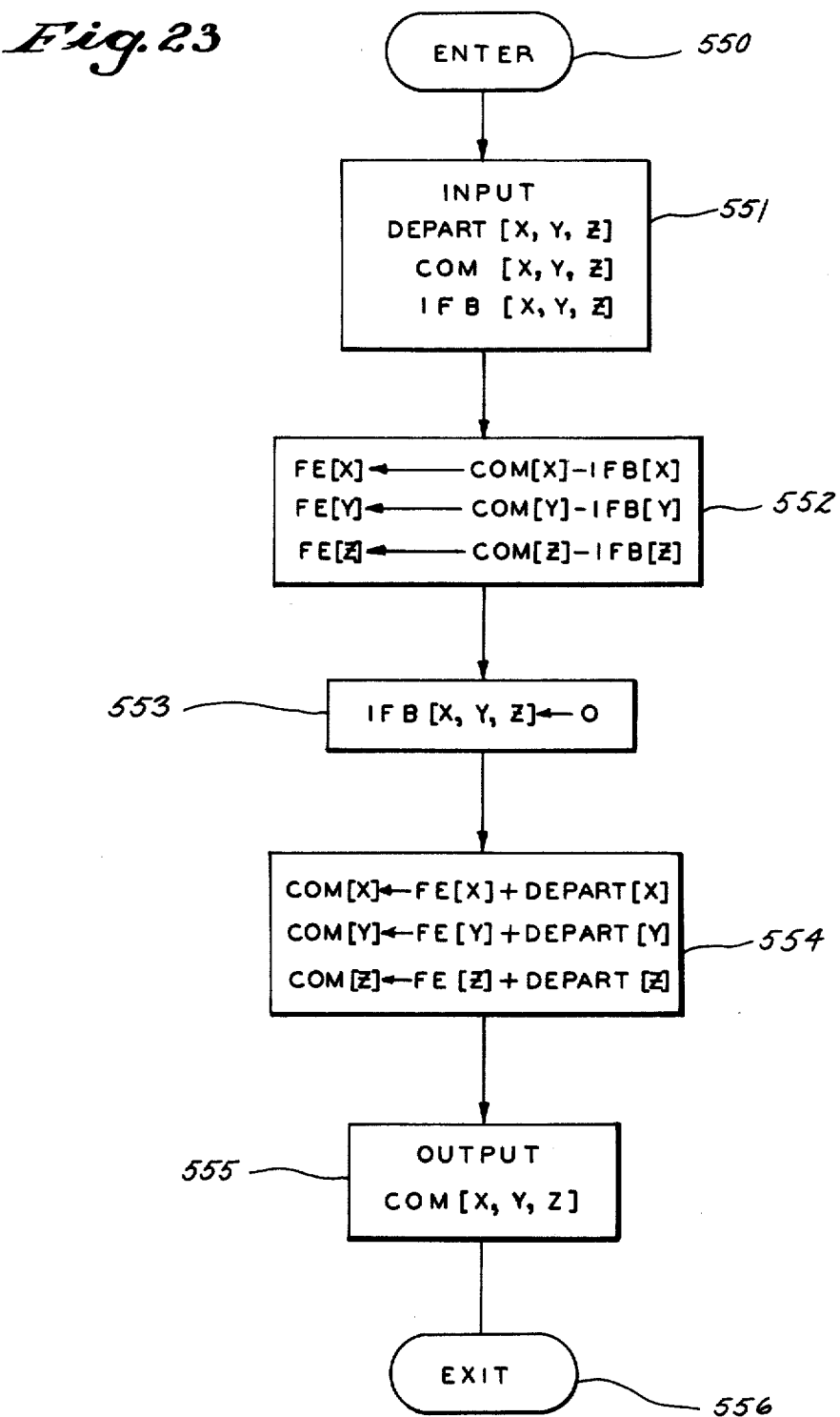
FIG. 23 is a flow chart of the servomechanism service routine which forms a part of the system of FIG. 15.

Referring to FIGS. 15 and 23, the servomechanism service routine 435 is entered at the point 550 and receives the departure words DEPART [x,y,z] for the next 10 msec. time interval as input data. As indicated by the process block 551, it also receives the command words COM [x,y,z] for the previous 10.24 msec. time interval from the D/A converters 421 and the incremental feedback words IFB [x,y,z] from the position accumulators 425. The next step as indicated by the three instructions designated collectively by the process block 552 is to calculate the following error FE [x,y,z] for each axis of motion. More specifically, the incremental feedback word (IFB) is subtracted from the command wordd (COM) for each axis of motion. The resulting following error word (FE) represents the distance, or displacement, between the actual position of the cutter on the milling machine 410 and the commanded position heretofore generated by the numerical control processor 406. Having calculated the following error for each axis of motion, the position accumulators 425 are reset to zero through the lead 426 by an instruction indicated by the process block 553. The new, or updated, command words COM [x,y,z] are then computed by adding the departure words DEPART [x,y,z] to the respective following error words FE (x,y,z). This is performed by three instructions indicated collectively by the process block 554. Finally, the updated command words COM [x,y,z] are generated to the digital-to-analog converters 421 by a set of instructions indicated by the process block 555. The servomechanism service routine 435 is then exited at the point 556.

Figure 37:
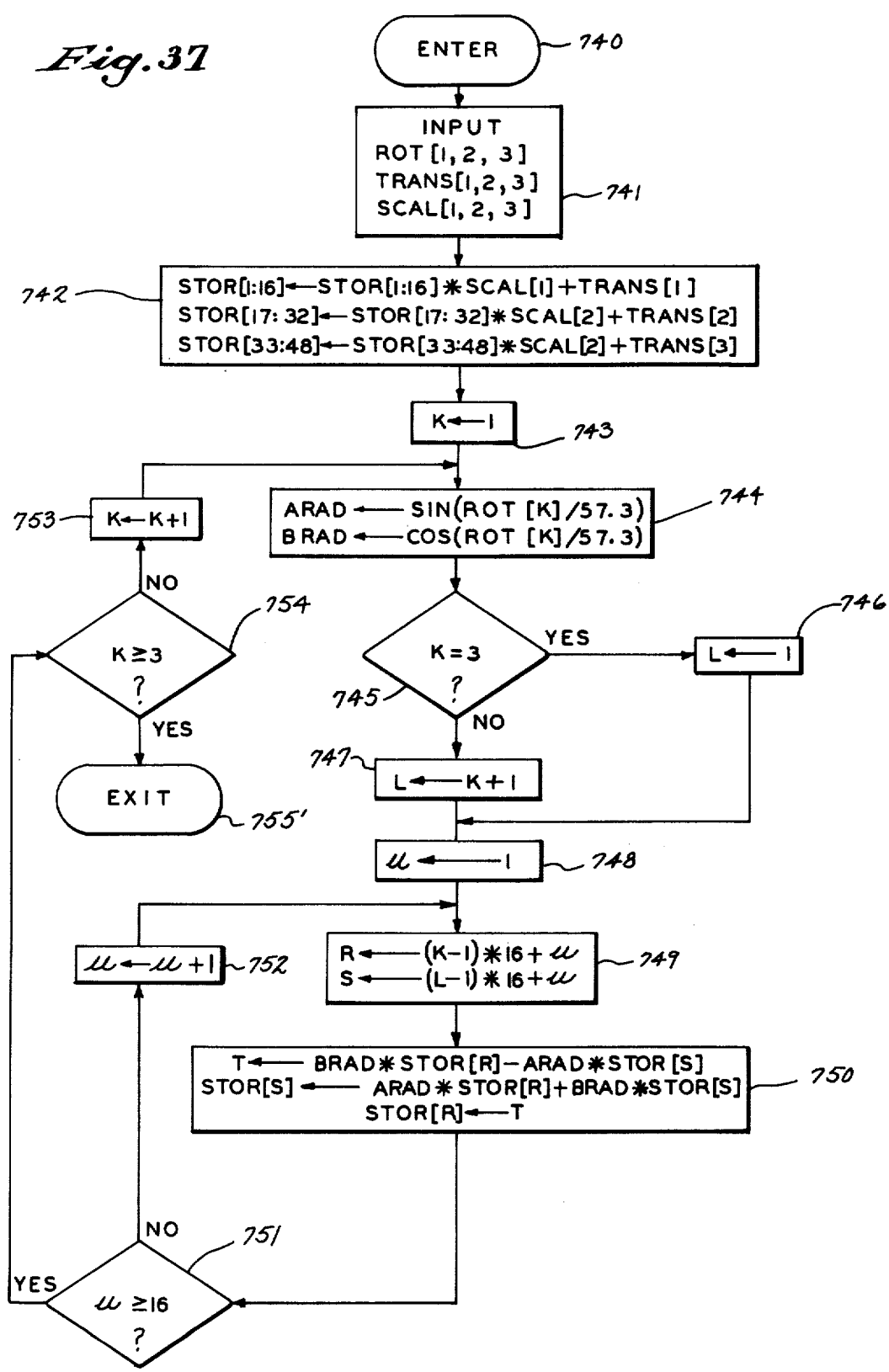
FIG. 37 is a flow chart of the rotation, scale and translation subroutine which forms part of the system of FIG. 15, FIGS. 38A, B and C are flow charts of the scale factor and translation number computer subroutine which forms a part of the system of FIG. 15.

As indicated above in the description of the mapping interpolator control routine 430, the spacial form defined by the command vectors V may be scaled down in size, translated in position, and rotated in two- or three-dimensional space. This is performed, for example, when the object is to be displayed on a cathode ray tube before being applied to the machine tool. Referring to FIGS. 15 and 37, after each command vector V is received at the buffer storage 414 and loaded into the digital computer 409 at STOR [1:64], a vector rotation, translation and scaling subroutine is entered. In addition to the memory space required to store this subroutine, space must also be provided for the following variables and indexes.

| VARIABLE | DESCRIPTION |
|---|---|
| ARAD | a 36-bit binary number |
| BRAD | a 36-bit binary number |
| R, S | two 6-bit binary numbers which select elements of the command vector V |
| INDEXES | |
| K | a 2-bit binary number used to select elements from the command vector V |
| L | a 2-bit binary number used to select elements from the command vector V |
| u | a four-bit binary number used to select elements from the command vector V |

The subroutine is entered at the point 740 and the variables ROT [1,2,3] TRANS [1,2,3] and SCAL [1,2,3] are input to the subroutine as indicated by the process block 741. The 16 x-axis elements of the command vector V are then each multiplied by the scale factor SCAL [1] and summed with the translation number TRANS [1]. Similarly, the 16 y-axis elements are scaled and translated and the 16 z-axis elements are scaled and translated. These steps are indicated collectively by the process block 742. Next, the index K is set to 1 with an instruction indicated by the process block 743 and the variables ARAD and BRAD are calculated using one of the rotation numbers ROT [K = 1, 2, or 3] and the instructions indicated collectively by the process block 744. The index K is then evaluated with an instruction indicated by the decision block 745, and if equal to 3 the index L is set to 1 with an instruction indicated by the process block 746. On the other hand, if K is not equal to 3 the index L is set to the value K+1 with an instruction indicated by the process block 747. The index u is then set to 1 with an instruction indicated by the process block 748 and the values of the variables R and S are then calculated with a set of instructions indicated collectively by the process block 749. Next, as indicated collectively by the process block 750, the variable T is calculated using the vector elements at STOR [R] and STOR [S] and the variables ARAD and BRAD. The vector element STOR [S] is then calculated and the variable T is stored at STOR [R]. The index u is then compared with the integer 16 to determine whether all the vector elements of one axis of motion have been rotated. This is performed with an instruction indicated by the decision block 751 and if further processing is required the index u is incremented by one count with an instruction indicated by the process block 752 and another cycle through the process blocks 749 and 750 is made. When 16 cycles have been made through the u loop, the index K is compared with the integer 3 with an instruction indicated by the decision block 754 to determine whether the x, y and z elements of the command vector V have been rotated. If not, the index K is incremented by one count with an instruction indicated by the process block 753 and another cycle through the K loop is made commencing with the process block 744. When the elements of each axis have been rotated, the subroutine is exited at the point 755'.

The variables RPT[1,2,3] are manually selected and stored at the numerical control processor 406. On the other hand, the variables SCAL [1,2,3] and TRANS [1,2,3] are calculated at either the central processor 400 or the numerical control processor 406 using a subroutine illustrated by the flow charts in FIGS. 38a, b and c. The routine is written for use at the numerical control processor 406. In addition to the space required to store the compiled program, space is required to store the following variables and flag.

| VARIABLES | DESCRIPTION |
|---|---|
| LIM [x,y,z] | three, 32-bit words which indicate the limits of motion along each axis |
| MAG | an eight-bit word which addresses a command vector V |
| STOR [1:64] | sixty-four, 36-bit elements of the command vector V |
| MAX [x,y,z] | three, 36-bit words which indicate the maximum extent of the spacial form along each axis |
| MIN [x,y,z] | three, 36-bit words which indicate the minimum extent of the spacial form along each axis |
| DMAX [x,y,z] | three 36-bit words which indicate the maximum dimensions of the spacial form along the respective axis of motion |
| D | a 36-bit word which indicates the maximum dimension of the spacial form |
| INDEXES | |
| J | a four-bit binary number which indicates position in the cross section direction |
| j | a four-bit binary number which indicates position in the trajectory direction |
| FLAG LOADED | a one-bit word which indicates when a command vector V has been received at the numerical control processor 406 |

Figure 38A:
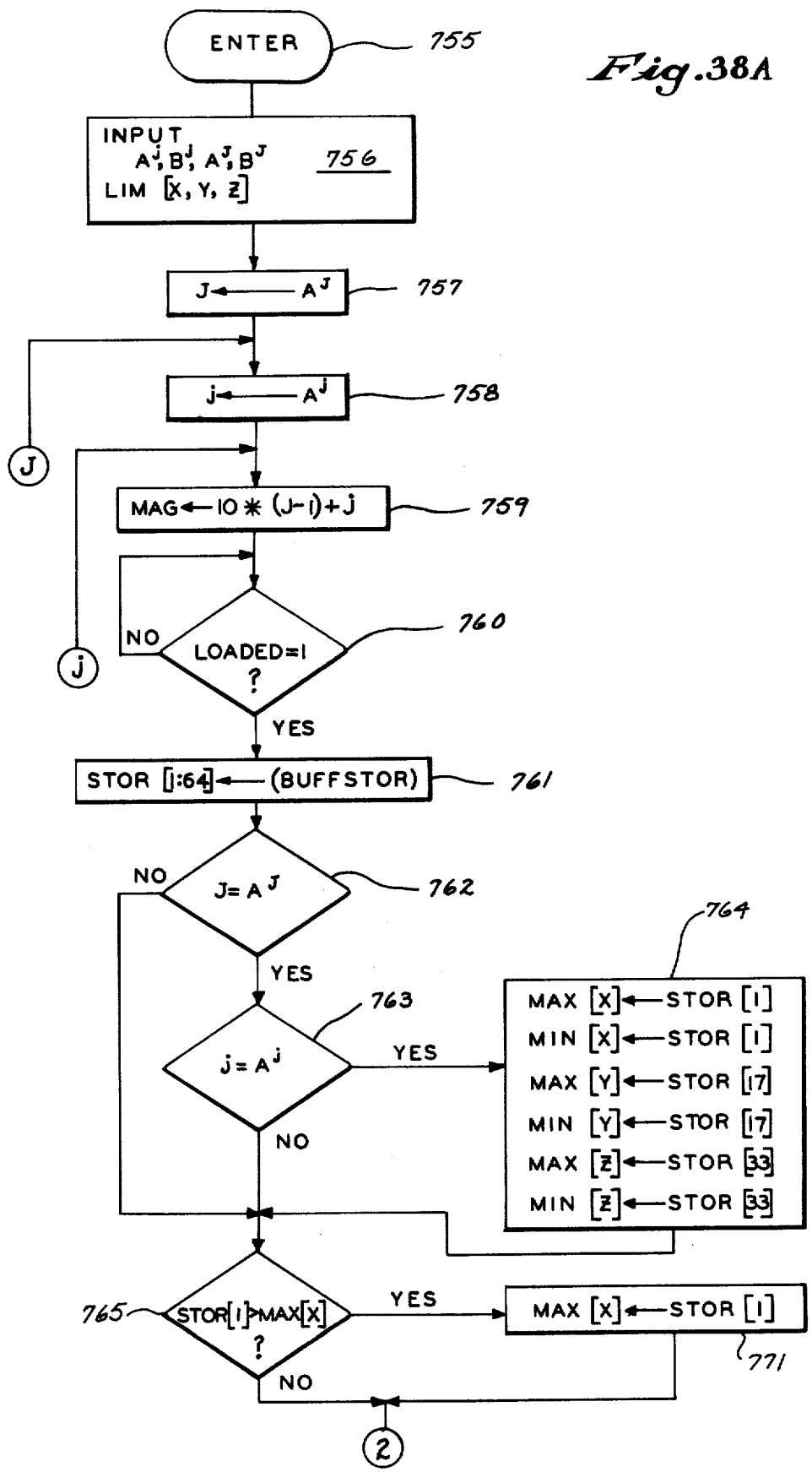
Figure 38B:
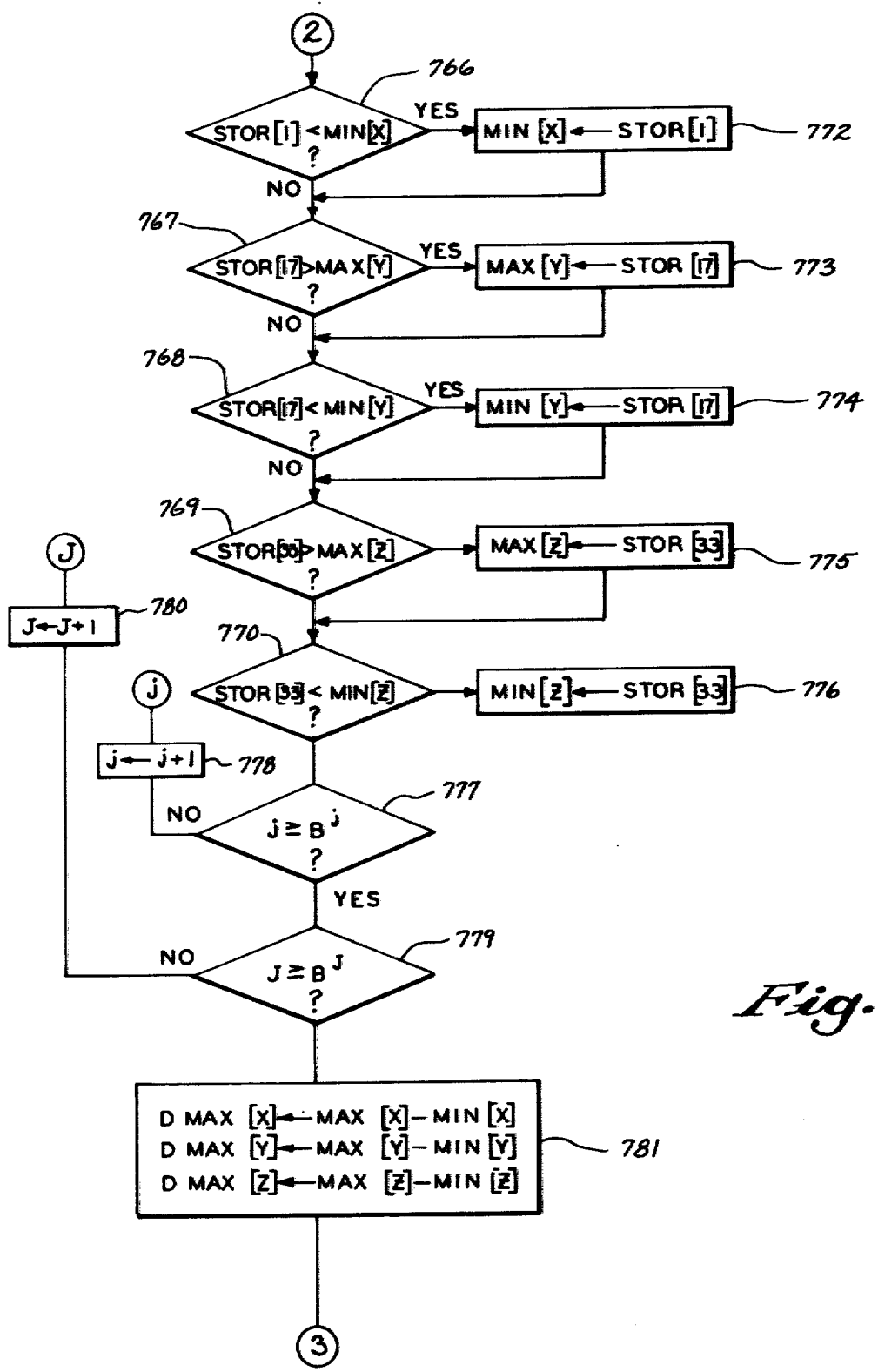
Figure 38C:
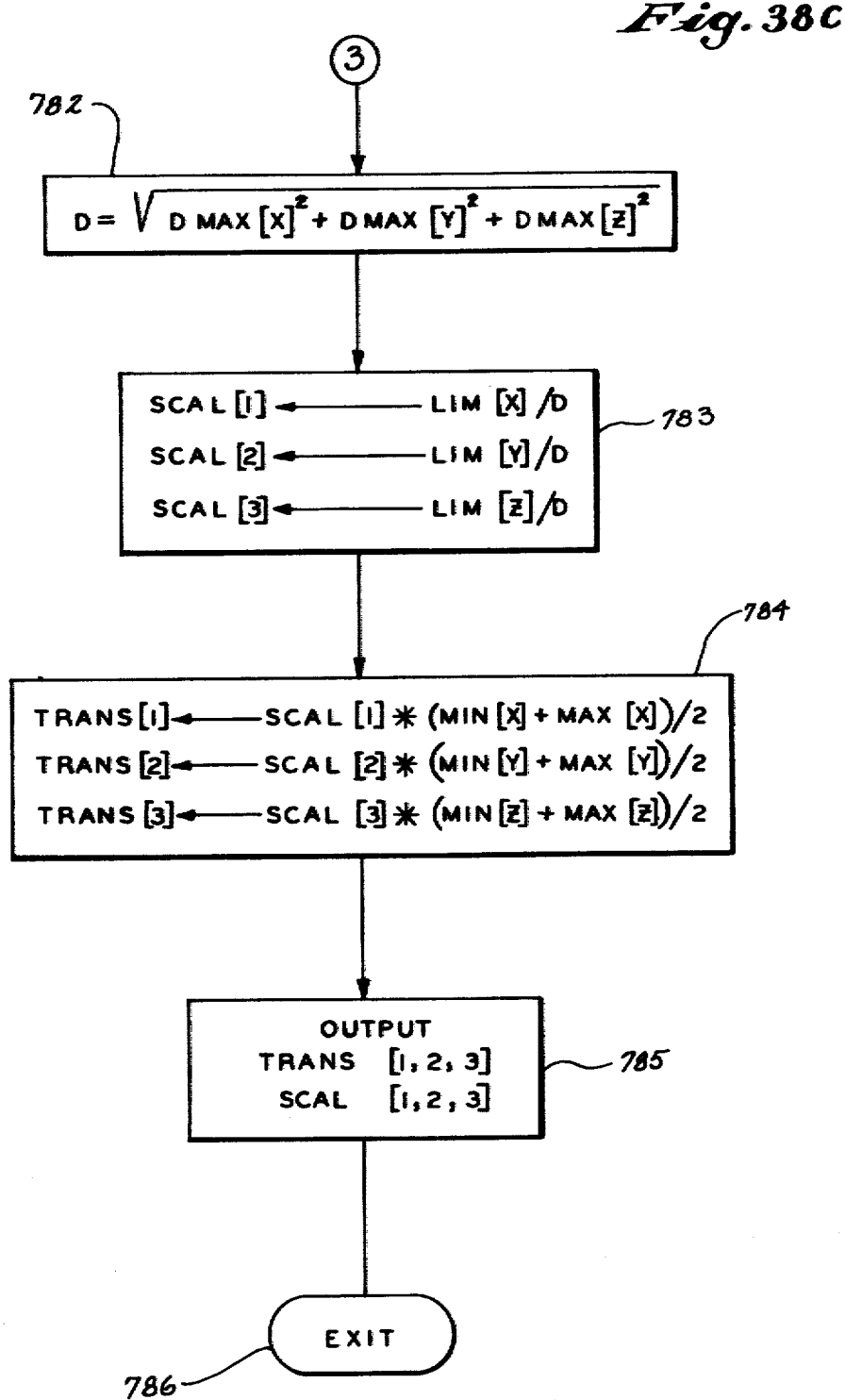

Referring specifically to FIGS. 38A, B and C, the routine is entered at the point 755 along with the boundary points of the spacial form and the dimensional limits LIM [x,y,z] as indicated by the process block 756. The first step as indicated by the process block 757 is to set the index J to the boundary point $A^J$ and to set the index j to the boundary point $A^j$ with an instruction indicated by the process block 758. An address is then generated using the indexes J and j and an instruction indicated by the process block 759. A wait loop is established with an instruction indicated by the decision block 760 and when the flag LOADED is set to 1 the command vector V in the buffer storage is loaded into the digital computer 409 with a set of instructions indicated by the process block 761. Next, as indicated by the decision blocks 762 and 763, the respective indexes J and j are compared with the initial boundary point $A^J$ and $A^j$ to determine whether the first command vector V is being processed. If so, the x, y and z coordinate elements of the command vector V are stored at the respective locations MAX [x,y,z] and MIN [x,y,z]. This is accomplished with a set of six instructions indicated collectively by the process block 764. Otherwise, the x, y and z coordinate elements of the command vector V are compared with values at MAX [x,y,z] and MIN [x,y,z] using a set of six instructions indicated by the respective decision blocks 765-770. More specifically, the x coordinate element at STOR [1] is compared with the variable MAX [x] to determine if it is larger. If so, the value at MAX [x] is replaced by the coordinate value at STOR [1] using an instruction indicated by the process block 771. A similar comparison is made between the x coordinate element and the variable MIN [x] to determine if it is smaller, and if so, the value at MIN [x] is replaced by the x coordinate value using an instruction indicated by the process block 772. Similar comparisons are made with the y and z coordinate elements. If the y coordinate element is greater than MAX [y] it replaces the quantity therein as indicated by the process block 773, and if less than MIN [y] it replaces the value therein as indicated by the process block 774. Similarly, if the z coordinate element is greater than MAX [z] it replaces the value therein as indicated by the process block 775, and if less than MIN [z] it replaces the value therein as indicated by the process block 776.

After the coordinate values are compared with the minimum and maximum values previously stored, the index j is compared with the boundary point $b^j$ to determine whether all points in the trajectory direction have been processed. This determination is made with an instruction indicated by the decision block 777. If not, the index j is incremented by one count with an instruction indicated by the process block 778 and another cycle is executed commencing with the process block 759. If the last point on the trajectory has been processed, the index J is compared with the boundary point $B^J$ to determine whether additional trajectories are to be processed. This is performed with an instruction indicated by the decision block 779, and if further trajectories are to be processed, the index J is incremented by one count with an instruction indicated by the process block 780 and another cycle through the J loop is executed commencing with the process block 758. Thus, the command vectors V at each data point on the spacial form are removed from disc storage and the coordinate values of each are inspected to determine the extent of the spacial form along each axis of motion. Next, as indicated collectively by the process block 781, the difference between the maximum and minimum coordinate values are calculated and the resulting distances are stored at the respective locations DMAX [x,y,z]. The square root of the sum of the squares of the variables DMAX [x,y,z] is then computed and the result stored at D as indicated by the process block 782. The number at D is an accurate indication of the maximum dimension of the spacial form to be generated. Next, the displacement limits for each axis of motion LIM [x,y,z] are divided by the quantity D to generate the scale factors SCAL [1,2,3]. This is performed with a set of three instructions indicated collectively by the process block 783. Finally, the translation numbers TRANS [1,2,3] are calculated by summing the minimum and maximum values of the respective coordinates x, y and z, dividing the result by two, and scaling the numbers with the respective scale factors SCAL [1,2,3]. This is indicated by the process block 784, and when completed, the translation numbers and scale factors are outputed as indicated by the process block 785 and the routine is exited at the point 786.

As indicated previously, the central processor 400 is comprised of a programmed general purpose digital computer connected to receive input data from a graphic cathode ray tube 402 and a tape reader 401. In addition to the conventional routines used to service the tape reader 401, CRT 402 and the mass storage 403, the central processor 400 includes a set of routines for performing the preprocessor function of the present invention. These include a granularity computer routine and a surface state vector routine which are executed in sequence after the data which describes the spacial form has been entered through one of the input devices. With the exception of portions of the forward sweep subroutine to be described, the programs for the central processor 400 are written in ALGOL. FORTRAN IV is used in portions of the forward sweep subroutine where double precision arithmetic is required.

Figure 24:
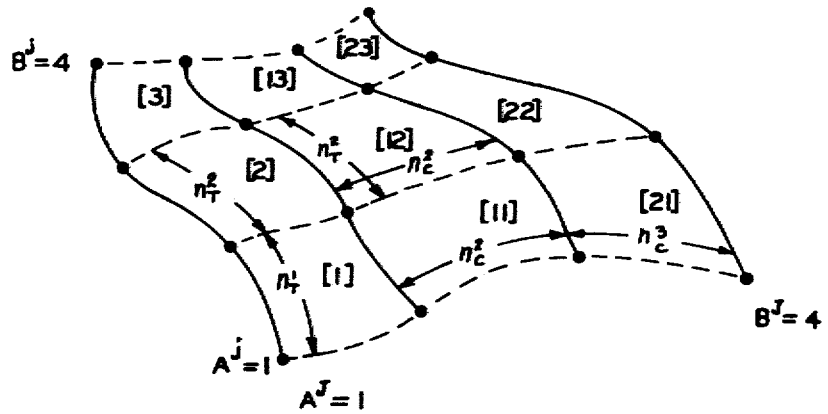
FIG. 24 is a graphic illustration used as an aid in describing the granularity computer routine.
Figure 25:
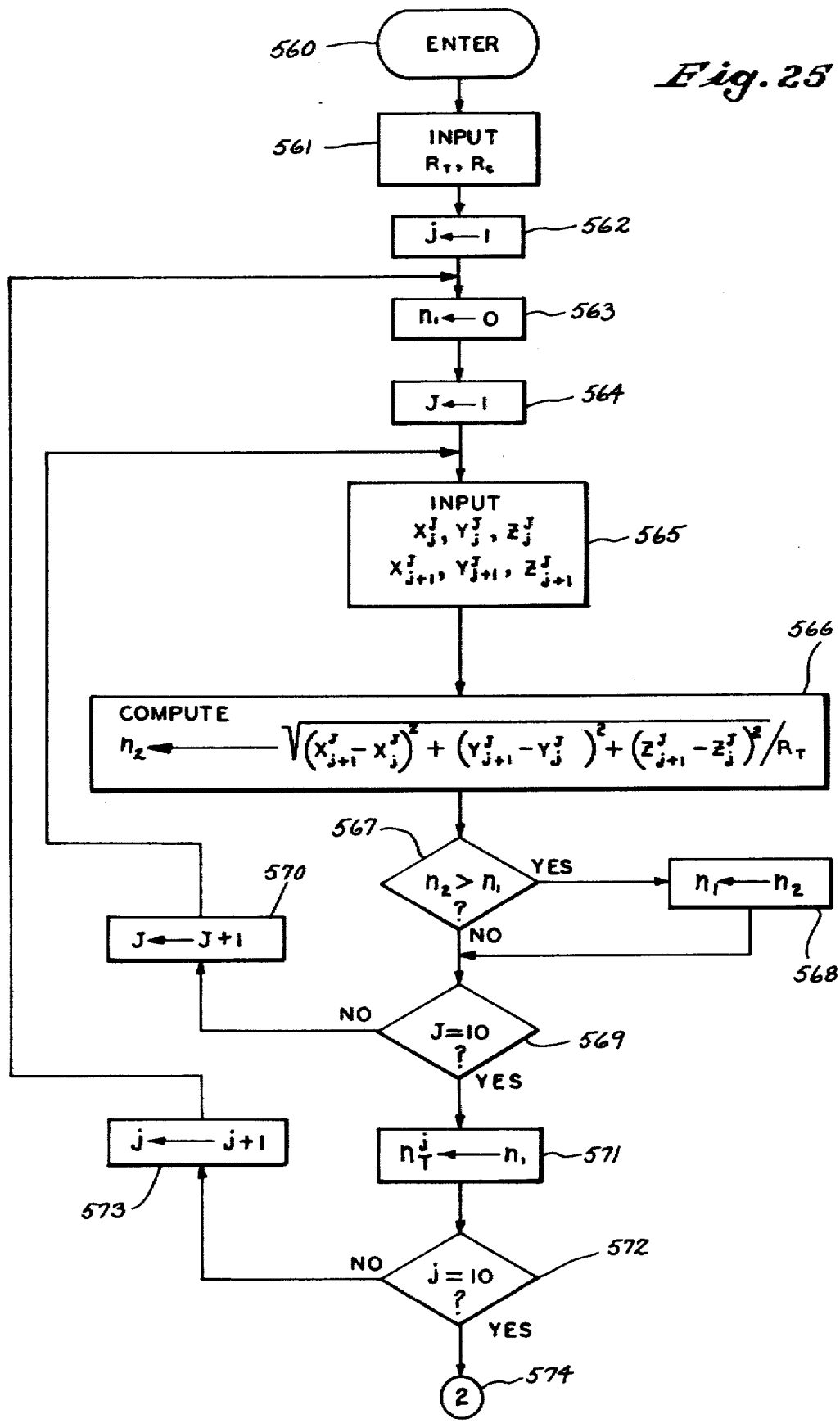
FIGS. 25 and 26 are flow charts of the granularity computer routine which forms part of the central processor in FIG. 15A.
Figure 26:
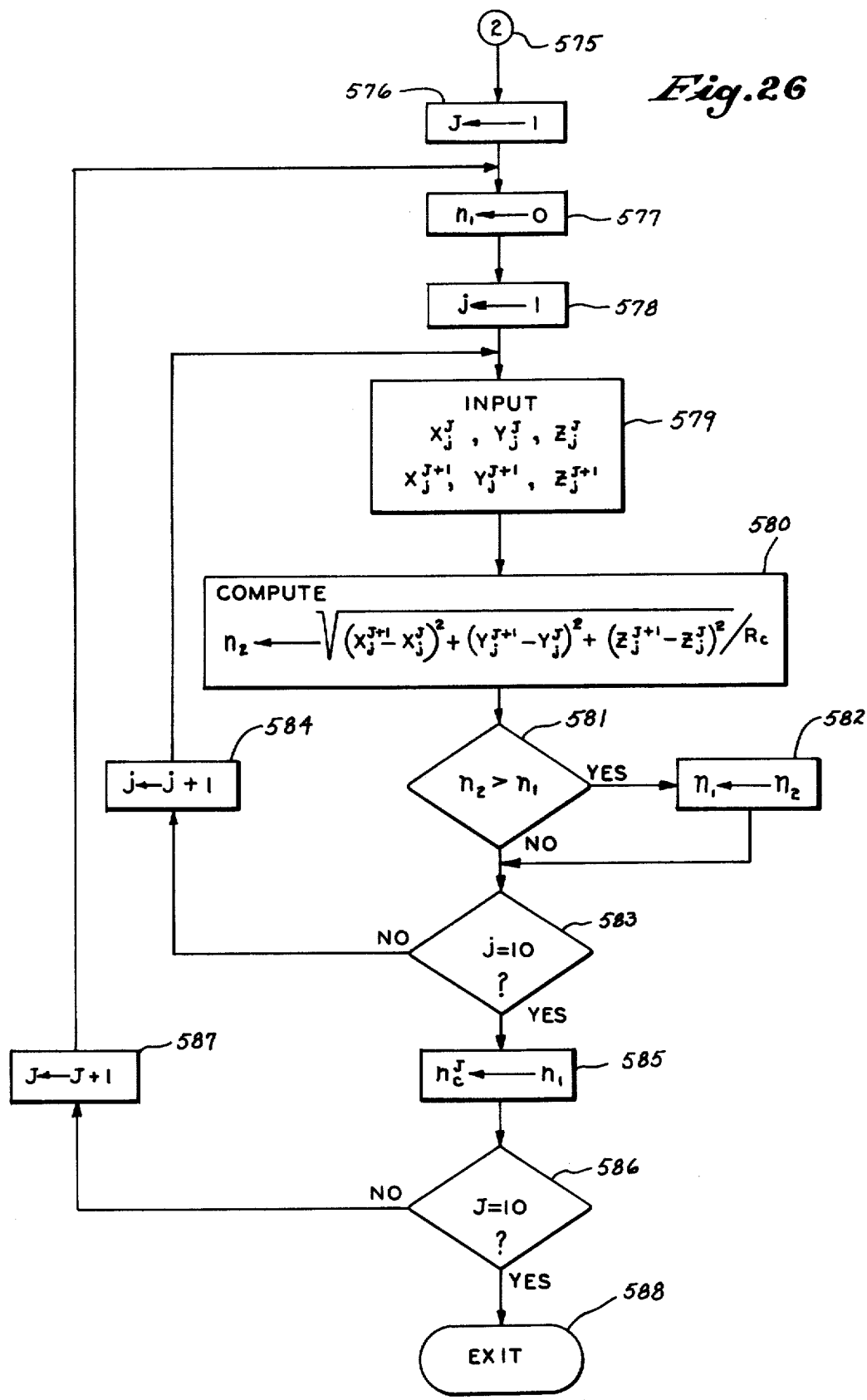

Referring to FIGS. 24–26, the granularity computer routine operates to generate granularity for each surface patch described by the data points. Referring specifically to FIG. 24, a granularity number ($n_T^j$) in the trajectory direction is computed for each column of surface patches and a granularity number ($n_c^j$) in the cross section direction is computed for each row of surface patches. For example, the granularity number $n_T^1$ applies in the trajectory direction to the surface patches 1, 11 and 21, and the granularity number $n_c^2$ applies in the cross section direction to the surface patches 11, 12 and 13. The granularity computer routine is comprised of two subroutines, a trajectory subroutine and a cross section subroutine. The trajectory subroutine is executed first and generates a set of granularity numbers $n_T^j$ for each column of the described surface and the cross section subroutine is then executed to generate a set of granularity numbers $n_c^j$ for each row.

In addition to the memory space required to store the compiled granularity computer routine, space is provided for the following variables and indexes.

| VARIABLE | DESCRIPTION |
|---|---|
| $R_T$ | a 36-bit interpolation constant for the trajectory direction |
| $R_c$ | a 36-bit interpolation constant for the cross section direction |
| $n_1$ | a 36-bit maximum computed granularity number |
| $n_2$ | a 36-bit calculated granularity number |
| INDEXES | |
| J | a 4-bit word which indicates location in the cross section direction |
| j | a 4-bit word which indicates location in the trajectory direction |

Referring specifically to FIG. 25, the granularity computer is entered at the point 560 and two interpolation constants $R_T$ and $R_c$ are entered by the parts programmer as indicated by the process block 561. The interpolation constants are chosen based on the required accuracy of the part to be machined and the nature of the surface. The greater the desired accuracy, the smaller the interpolation constants $R_T$ and $R_c$. Next, the trajectory direction index $j$ is set to 1 by an instruction indicated by the process block 562 and the granularity variable $n_1$ is set to 0. The cross section direction index J is next set to 1 as indicated by the process block 564 and the coordinate values for two successive data points in the trajectory direction are entered as indicated by the process block 565. The straight line distance between these data points is then calculated by taking the square root of the sum of the squares of the differences of the coordinates values. The result is divided by the interpolation constant $R_T$ to yield a granularity number which is stored at $n_2$ as indicated by the process block 566. The granularity number at $n_2$ is then compared with the granularity number $n_1$ to determine which is larger. This is performed with an instruction indicated by the decision block 567. If $n_2$ is greater than $n_1$ its value is entered at $n_1$ for comparison with subsequent calculated granularity numbers as indicated by the process block 568. Next, the value of the cross section direction index J is compared with the integer 10 to determine whether the granularity numbers for an entire column on the surface have been calculated. This is performed by an instruction indicated by the decision block 569 which establishes an inner, or J loop. If the granularity numbers $n_2$ have not been calculated for each pair of data points which describe the column of surface patches, the index J is incremented by one as indicated by the process block 570 and the cycle repeats commencing at the process block 565. After ten cycles through the J loop (or in the example of FIG. 24, four cycles through the J loop) the maximum calculated granularity number at $n_1$ is stored at $n_T$ as indicated by the process block 571. By means of an instruction indicated by the decision block 572 it is determined next whether granularity numbers for additional columns on the surface are to be calculated. This is accomplished by comparing the value of the trajectory direction index $j$ with the integer 10. If less than 10, the index $j$ is incremented by one count as indicated by the process block 573 and an additional cycle through the $j$ loop is executed commencing at the process blcok 563. A granularity number $n_T^j$ for each column of surface patches is thus calculated and the trajectory subroutine is exited at the point 574.

Referring to FIG. 26, the cross section is similar to the trajectory subroutine. The function of the indexes J and $j$ have been reversed, however, and different coordinate values are used to calculate each granularity number. More specifically, the routine is entered at the point 575, the cross section direction index J is set to 1 by an instruction indicated by the process block 576, the granularity number at $n_1$ is set to 0 by an instruction indicated by the process block 577 and the trajectory direction index $j$ is set to 1 by an instruction indicated by the process block 578. The coordinate values of two successive data points are then received as input data as indicated by the process block 579.

The straight line distance between the two data points is then computed by taking the square root of the sum of the squares of the difference between the coordinate values. The resulting distance is divided by the interpolation constant $R_c$ as indicated by the process block 580 and the result is stored at $n_2$. Next, the granularity number at $n_2$ is compared in value with the granularity number at $n_1$ by an instruction indicated by the decision block 581. If the newly calculated granularity number $n_2$ is greater than that stored at $n_1$, it is used to update $n_1$ as indicated by the process block 582. The end of a row is detected by an instruction which compares the value of the trajectory index $j$ with the integer 10 as indicated by the decision blcok 583. If further granularity numbers are yet to be calculated, the index $j$ is incremented by one count with an instruction indicated by the process block 584 and another cycle through the $j$, or inner loop is repeated commencing at the process block 579. After ten cycles through the inner loop (or in the example of FIG. 24 after four cycles) the maximum calculated granularity number at $n_1$ is entered at $n_c^J$ with an instruction indicated by the process block 585. Finally, a determination is made with an instruction indicated by the decision block 586 whether further rows are to be processed. If so, the direction index J is incremented by one count as indicated by the process block 587 and another cycle through the outer, or J loop, is executed commencing with the process block 577. After the granularity number $n_C{}^j$ has been calculated for each row of patches on the surface, the routine is exited at the point 588.

As discussed previously, a 64-element command vector V is generated for each data point on the spacial form. The initial input data supplies a number of the elements of each command vector including at least the coordinate values of the data point. Other data may also be supplied initially, including the initial slopes of the spacial form in the trajectory direction ($\Delta_1 x$, $\Delta_1 y$, $\Delta_1 z$), the initial slopes in the cross section direction ($c_x$, $c_y$, $c_z$), the feedrate (IPM) and the mode of operation. Also, the boundary condition type is specified in both the trajectory and cross section directions (IBC or FBC). The remaining unknown elements of the command vector V necessary to define the spacial form are calculated using the command vector routine now to be described. In addition to the drawings, reference is made to the list of command vector elements discussed previously.

Figure 27:
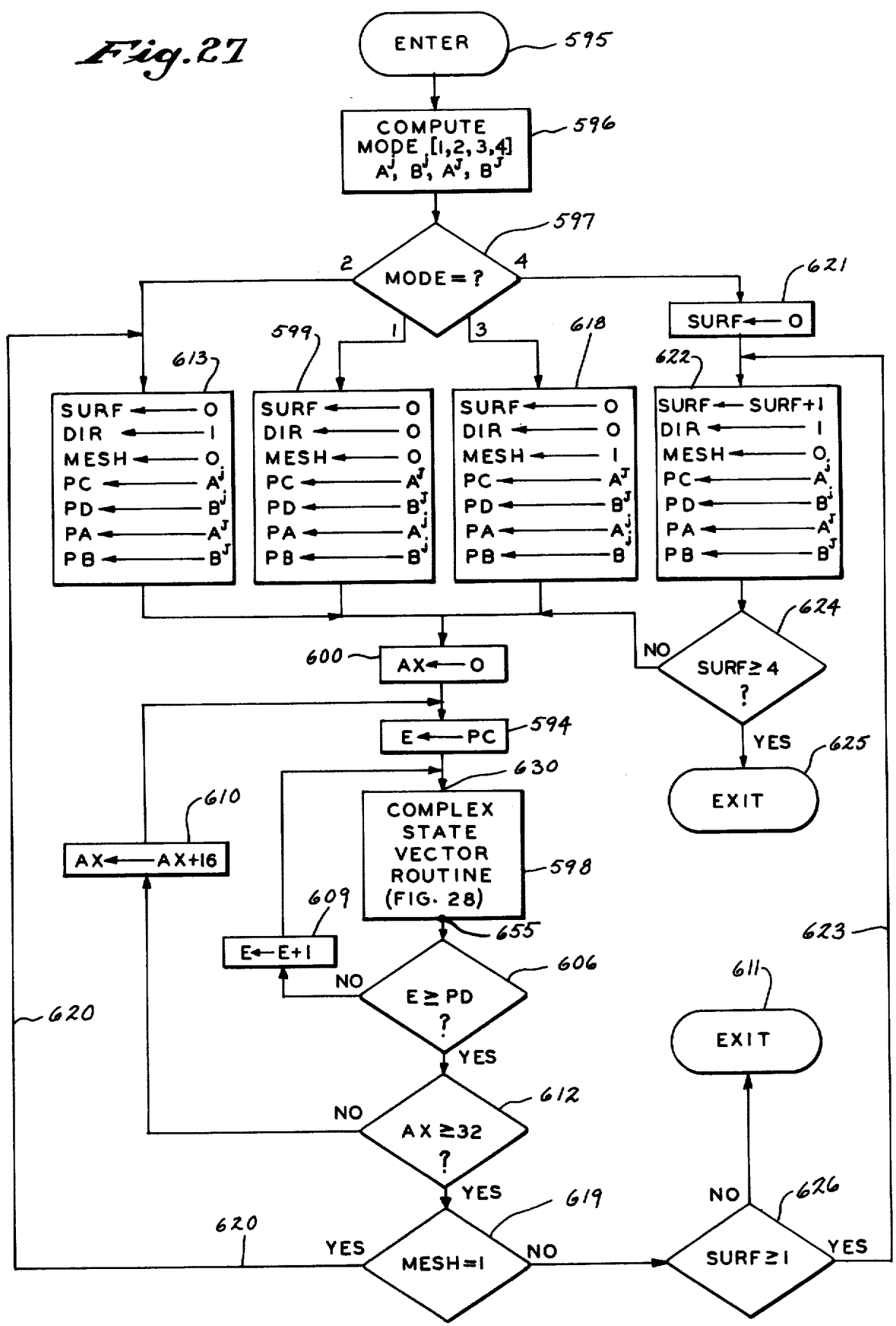
FIG. 27 is a flow chart of the preprocessor routine which forms a part of the central processor of FIG. 15A.

After the granularity numbers $n_T{}^j$ and $n_C{}^j$ have been calculated and stored at the respective element numbers 49 and 50 of each command vector V the unknown elements of the surface state vector are calculated. The elements required in each surface state vector depends on the mode of operation of the preprocessor and may vary from eight for a two-dimensional trajectory to forty-eight for a three-dimensional surface. Referring to FIG. 27, the command vector routine is entered at the point 595 and a MODE [1, 2, 3 or 4] is selected by the programmer along with the boundary points of the spacial form to be processed. This input data is entered through one of the peripheral devices at the central processor and is indicated by the process block 596. In addition to the memory space required to store the compiled command vector routine, space is required for the following variables, indexes and flags.

| VARIABLES | DESCRIPTION |
|---|---|
| MODE [1,2,3,4] | a two-bit binary number which indicates the mode of operation |
| $A^j$, $B^j$, $A^J$, $B^J$ | four 4-bit binary numbers which indicate the boundary points of the spacial form |
| PA, PB, PC, PD | four 4-bit binary numbers which indicate the boundaries of the spacial form to be processed |
| P | a 4-bit binary number which indicates the starting point of a particular trajectory |
| ASTOR, BSTOR | 128, 36-bit words containing the elements of two successive command vectors being processed |
| A [A, $\Delta_1$A, $\Delta_2$A, $\Delta_3$A] | four 36-bit words which store four initial elements of a complex state vector during the forward sweep process |
| B [B, $\Delta_1$B, $\Delta_2$B, $\Delta_3$B] | four 36-bit words which store four final elements of a complex state vector during the forward sweep process |
| C [C, $\Delta_1$C, $\Delta_2$C, $\Delta_3$C] D [D, $\Delta_1$D, $\Delta_2$D, $\Delta_3$D] | eight 36-bit words which store the elements of an initial and final dummy vector during the forward sweep process |
| E [E, $\Delta_1$E, $\Delta_2$E, $\Delta_3$E] F [F, $\Delta_1$F, $\Delta_2$F, $\Delta_3$F] | eight 36-bit words which store the elements of another initial and final dummy vector during the forward sweep process |
| ADDRESS | an eight-bit word which addresses a command vector in the disc storage |
| $d_1$, $d_2$ | two 36-bit binary scaler numbers |
| $a$, $b$ | two 36-bit binary numbers |
| $n$ | a 36-bit granularity number |
| $\Delta_1$T, $\Delta_2$T | two 36-bit words which temporarily store initial elements of a complex state vector during the forward sweep process |

INDEXES

| VARIABLES | DESCRIPTION |
|---|---|
| SURF | a two-bit binary number used to preprocess a surface |
| AX | a five-bit binary number which is used to preprocess each axis of motion |
| E | a four-bit binary number which indicates the number of preprocessed trajectories or cross sections |
| SWP | a one-bit word which indicates the number of forward sweeps performed by the preprocessor |
| GEN | a one-bit word which indicates when the calculated vector elements are to be generated to the disc storage |
| $e$ | a four-bit binary number which indicates the data point being preprocessed on a trajectory or cross section |

FLAGS

| | |
|---|---|
| MODE [1,2,3,4] | a two-bit binary number which indicates the mode of operation |
| DIR | a one-bit word which distinguishes between the trajectory direction and cross section direction |
| MESH | a one-bit word which indicates that a mesh is to be preprocessed |
| FSTP | a one-bit word which indicates that the first point on the trajectory or cross section is being preprocessed |
| LSTP | a one-bit word which indicates that the last point is being preprocessed |
| IBC | a five-bit binary number which indicates the initial boundary condition situation |
| FBC | a five-bit binary number which indicates the final boundary condition situation |
| TYPE | a four-bit binary number which indicates the type of initial boundary condition |
| TYPF | a four-bit binary number which indicates the type of final boundary condition |

Referring to FIG. 27, the mode of operation is first determined by evaluating the MODE flag as indicated by the decision block 597. MODE [1] indicates that one or more trajectories are to be preprocessed, MODE [2] indicates that one or more cross sections are to be preprocessed, MODE [3] indicates that a MESH, or set of trajectories and cross sections are to be preprocessed, and MODE [4] indicates that an entire surface is to be preprocessed. Regardless of the mode of operation, the surface vector routine preprocesses the input data using a single complex state vector routine indicate in FIG. 27 by the block 598. This is accomplished by properly initializing the flags SURF, DIR, MESH and by properly assigning the boundary point data $A^j$, $B^j$, $A^J$, $B^J$ to the boundary variables PA, PB, PC and PD.

Figure 34:
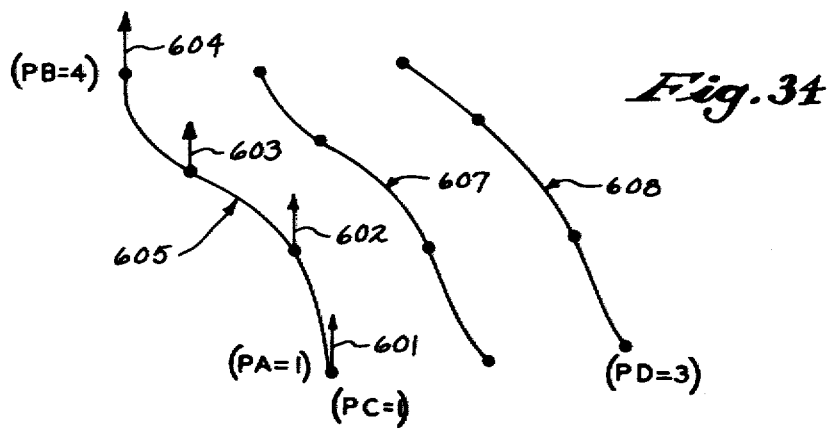

When preprocessing one or more trajectories (MODE [1] the above flags are initialized by a set of seven instructions indicated collectively by the process block 599. A main program branch is then entered in which the index AX is first set to 0 as indicated by the process block 600 and the index E is set to the initial boundary point PC as indicated by the process block 594. The complex state vector routine 598 is then executed to generate a set of X axis complex state vectors which are illustrated by way of example in FIG. 34. In the example, four vectors 601–604 are thus generated and disposed along a first trajectory 605. After the routine 598 is executed, the index E is compared with the value of the boundary point PD as indicated by the decision block 606 to determine whether additional trajectories are to be preprocessed. In the example of FIG. 34, two additional trajectories 607 and 608 are preprocessed by first incrementing the index E one count as indicated by the process block 609 and re-executing the complex state vector routine 598. A total of three cycles through the E loop are made and a complex state vector for the X axis of motion is generated at each data point on the spacial form. In the example of FIG. 34, the Y and Z axes of motion must also be preprocessed and the index AX is, therefore, incremented by 16 as indicated by the process block 610 and another cycle through an AX loop is initiated commencing with the process block 594. Three additional cycles through the E loop are thus made to generated the Y axis elements of the complex state vectors at each data point. Finally, the index AX is again incremented by 16 and another cycle through the AX loop is made to generate the Z elements of each complex state vector. After three cycles through the AX loop, the condition (AX ≥ 32) established with an instruction indicated by the decision block 612 is satisfied and the preprocessor is exited at the point 611.

The operation of the surface vector routine is quite similar when MODE [2] is selected. Referring to FIG. 27 and the example of FIG. 35 when preprocessing one or more cross sections the flags SURF, DIR and MESH are set along with the boundary variables PC, PD, PA and PB by a set of seven instructions indicated collectively by the process block 613. The main branch is then entered commencing with the process block 600 in which the index AX is set to zero. The index E is then set to the boundary value PC as indicated by the process block 594 and a first cycle through the E loop is executed. The complex state vector routine 598 generates the X axis elements of a complex state vector at each data point, which in the example of FIG. 35, lie along a first cross section 614. Three additional cycles through the E loop are then made to generate the X axis elements of three complex state vectors lying along three additional cross sections 615-617. The condition E ≥ PD established by the decision block 606 is then satisfied and the index AX is incremented by 16 to generate the Y axis elements of each complex state vector. Finally, a third cycle through the AX loop is made to generate the Z axis elements of each complex state vector and the routine is exited at point 611.

Figure 35:
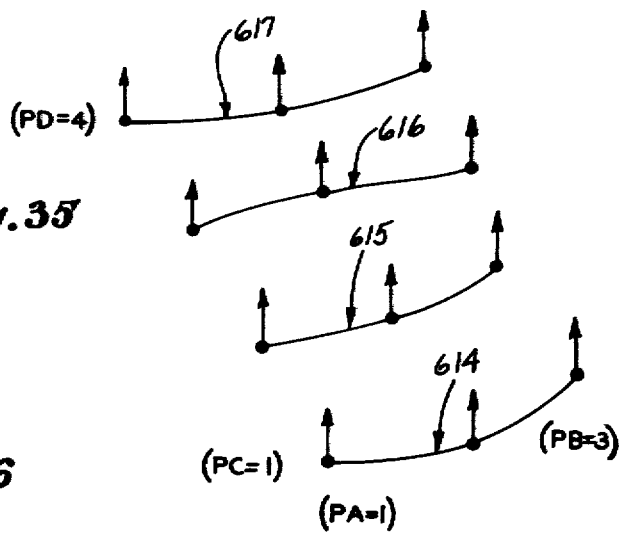

When operated in MODE [3] the preprocessor generates state vectors at each data point on the spacial form which contain the elements necessary to generate both a set of trajectories, such as the trajectories 605-608 in FIG. 34, and a set of cross sections, such as the cross sections 614-617 in FIG. 35. The flags SURF, DIR and MESH are set along with the boundary point variables PC, PD, PA and PB by a set of seven instructions indicated collectively by the process block 618. Except for the flag MESH, this initialization is identical to that performed for MODE [1]. In other words, the surface vector routine is first operated to preprocess a set of trajectories through the data points. The main branch of the routine is entered and executed in the manner described above to generate a set of complex state vectors which define the described trajectories. Before the main branch is exited, however, the status of the flag MESH is tested with an instruction indicated by the decision block 619. When operated in MODE [3] the condition MESH = 1 is satisfied and a loop indicated by the line 620 is established to perform further preprocessing. Specifically, the input data is preprocessed further commencing with the seven initialization instructions indicated by the process block 613. As a result, the main branch of the routine is re-entered and executed to generate the necessary elements of the state vectors which define cross sections through the data points. The routine is then exited at the point 611.

When preprocessing an entire surface, MODE [4] is selected and a 48-element surface state vector is generated at each data point on the surface. Before this is performed, however, the input data is first preprocessed in MODE [3] to generate 21 elements of the surface state vector at each data point. These elements include $x, \Delta_1 x, \Delta_2 x, \Delta_3 x, y, \Delta_1 y, \Delta_2 y, \Delta_3 y, z, \Delta_1 z, \Delta_2 z, \Delta_3 z, c_x, d_x, e_x, c_y, d_y, e_y, c_z, d_z,$ and $e_z$, which are stored in the disc storage 403. The remaining 27 elements of each surface state vector are then calculated by selecting MODE [4].

Referring specifically to FIG. 27, the first step in preprocessing the entire surface is to set the index SURF to zero with an instruction indicated by the process block 621. Next, the routine is initialized with a set of seven instruction indicated collectively by the process block 622. These include setting the index SURF to 1, the flag DIR to 1 and the flag MESH to 1. Additionally, the boundary variables PC, PD, PA and PB are set to the respective boundary points $A^j, B^j, A^J$ and $B^J$. The 21 unknown elements of each surface state vector are then calculated by making three cycles through the entire main branch of the routine. This is accomplished by establishing a loop with a line 623 connecting the end of the main branch with the process block 622. The loop is entered with an instruction indicated by the decision block 626 in which the index SURF is compared with the integer 1 after the main branch has been executed. The number of cycles through this loop, hereinafter referred to as the surface loop, is determined with an instruction indicated by the decision block 624 that compares the index SURF with the integer 4. After three cycles through the surface loop, the index SURF is equal to 4 and the routine is exited at the point 625. The 48-element surface state vectors at each data point are thus calculated by a succession of cycles through the complex state vector routine 598.

Figure 36:
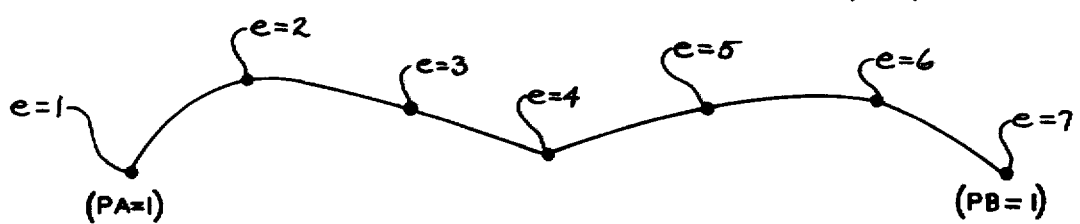
Figure 28:
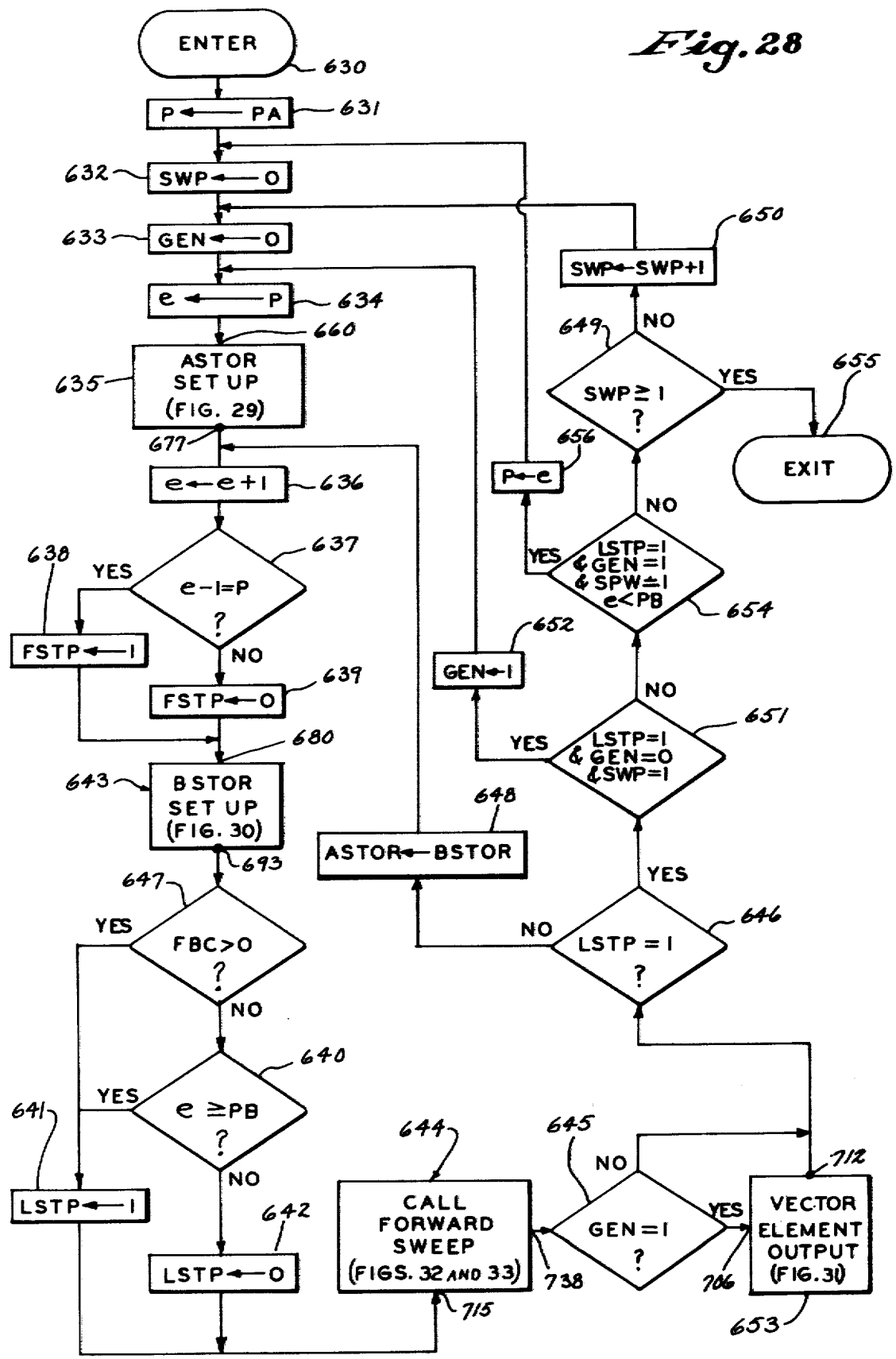
FIG. 28 is a flow chart of the complex state vector routine which forms a part of the preprocessor routine of FIG. 27.

The complex state vector routine 598 is entered repeatedly when preprocessing in any of the modes [1,2,3,4]. It operates to calculate unknown elements of the initial state vectors using the single forward sweep technique discussed above. Referring specifically to FIG. 28 and an example trajectory in FIG. 36, the routine is entered at the point 630 and the boundary variable PA is entered into a temporary storage location P with an instruction indicated by the process block 631. In two succeeding instructions indicated by the respective process blocks 632 and 633, the index SWP is set to zero and the index GEN is set to zero. Next, a data point index $e$ is set to the initial boundary point stored at P with an instruction indicated by the process block 634. In the example of FIG. 36, seven data points are disposed between an initial boundary point PA = 1 and a final boundary PB = 7. The index e identifies the point being preprocessed and is incremented from $e=1$ to $e = 7$. Although the seven data points in the example describe a single trajectory, a discontinuity is specified at the point $e = 4$ which requires the generation of two minimum energy trajectories between the boundary points PA and PB. As will become apparent from the description to follow, the variable P is needed to provide this capability.

The next step in the routine is to fetch the command vector V for the data point $e=1$ and determine the boundary condition situation. These functions are performed by a subroutine identified as ASTOR SETUP 635 which will be described in detail below. Next, the index e is incremented by one count with an instruction indicated by a process block 636. The routine now fetches the command vector V for the data point $e = 2$ and determines the boundary condition situation specified therein. These functions are performed by a subroutine identified as BSTOR SETUP 643. The quantity $e - 1$ is then compared with the value at P to determine whether ASTOR [1:64] contains the elements of the first point on the minimum energy trajectory. This is accomplished with an instruction indicated by the decision block 637. If so, the flag FSTP is set to 1, but if not, the flag FSTP is set to 0 with instructions indicated by the process blocks 638 and 639. The next step, indicated by the decision block 647, is to determine if the point $e=2$ is contrained by a boundary condition. This is accomplished by determining if FBC > 0, and if so, the flag LSTP is set to 1 as indicated by the process block 641. Then, the index e is compared with the value of the final boundary variable PB to determine whether the last specified data point ($e=7$ in the example) has been reached. If so, the flag LSTP is set to 1, but if not, the flag LSTP is set to 0. This function is performed by a set of three instructions indicated by the decision block 640 and the process blocks 641 and 642.

As will be described in more detail below, the ASTOR SETUP routine 635 and BSTOR SETUP routine 643 establish trial state vectors A [A, $\Delta_1$A, $\Delta_2$A, $\Delta_3$A] and B [B, $\Delta_1$B, $\Delta_2$B, $\Delta_3$B] for use by a forward sweep subroutine 644. In the example of FIG. 36, the forward sweep subroutine 644 operates to sweep the trial state vector A from the point $e=1$ to the next point, $e=2$. The resulting state vector elements at the point $e=2$ are then stored at BSTOR. After the forward sweep routine is executed, an instruction indicated by the decision block 645 is executed to determine the state of the flag GEN. This flag remains at zero during the first two forward sweeps and the instruction indicated by the decision block 646 is executed next. This instruction determines the status of the flag LSTP which, in the example, remains at zero until the point $e=4$ is reached. Therefore, the next instruction indicated by the process block 648 transfers the 64 elements of the command vector at BSTOR to ASTOR. In other words, the state vector at the point $e=2$ is transferred to ASTOR and a loop is formed commencing with the process block 636 to continue the forward sweep process through the successive data points on the trajectory.

The procedure is identical for the next cycle through the e loop. It commences by incrementing the index e by one ($e=3$) and then determining whether either a first or last data point is involved in the segment being preprocessed. The forward sweep subroutine 644 is then called and the trial complex state vector is swept forward to the point $e=3$ and transferred to ASTOR. The index e is again incremented to $e=4$ and the cycle repeats again. This time, however, since a discontinuity has been specified, the flag FBS is > 0 and the flag LSTP is set to 1 with the instruction indicated by the process block 641. Consequently, after the complex state vector is swept forward to the point $e=4$ by the forward sweep subroutine 644, the condition established by the decision block 646 is met and the e loop is exited. As will be described further below, the forward sweep subroutine 644 calculates values for the scalers $d_1$ and $d_2$ during the last cycle through the e loop, and these are added to the trial $\Delta_1$ and $\Delta_2$ elements of the state vector at the initial point $e=1$. Due to roundoff errors associated with the digital computer, however, an additional cycle, or forward sweep is performed to improve the accuracy of the process. This is accomplished with an SWP loop formed by an instruction indicated by the decision block 649 and an instruction indicated by the process block 650. Specifically, the index SWP is compared to the integer 1 and the flag SWP is incremented by one count. The entire routine is thus re-executed a second time commencing with the process block 633. The complex state vector at the point $e=1$ is thereby swept forward through the points $e=2$ and $e=3$ to the point $e=4$ and the routine exits the e loop at the decision block 646.

After the second forward sweep, or cycle through the SWP loop, the conditions established by three instructions indicated by a decision block 651 are met. Specifically, the flag LSTP is equal to 1, the index GEN is equal to 0, and the index SWP is equal to 1. As a result, an instruction indicated by the process block 652 is executed to set the index GEN to 1. The routine is then re-entered commencing with the process block 634 and the optimal initial complex state vector calculated during the first two forward sweeps is swept forward from the point $e=1$ to the point $e=2$. During this forward sweep, however, the condition established by the process block 645 is met and a vector element output subroutine 653 is executed to store the calculated, optimal complex state vector elements at the appropriate locations in the command vector V for the data point $e=2$. Two additional cycles through the e loop result in the generation of the optimal complex state vector elements for the subsequent data points $e=3$ and $e=4$.

After the vector elements for the data point $e=4$ have been generated, the e loop is exited at the decision block 646 and the GEN loop is exited at the decision block 651. However, the conditions established by a set of four instructions indicated collectively by the decision block 654 are met, the index P is set to the value at e with an instruction indicated by the process block 656, and the entire complex state vector generator routine 598 is re-executed for the remaining portion of the trajectory. In the example of FIG. 36, three forward sweeps were performed on the portion of the trajectory connecting the data points $e=1$ and $e=4$, and the calculated optimal complex state vectors were stored. The same procedure is now executed for the remainder of the trajectory commencing with the process block 632. The routine is executed in the manner just described and the optimal complex state vectors for the points $e=5$, 6 and 7 are thus calculated and stored. When completed, the condition ($e<$PB) established by the decision block 654 is not met and the condition (SWP 1) established by the decision block 649 is met, and the complex state vector generator routine 598 is exited at a point 655.

Figure 29:
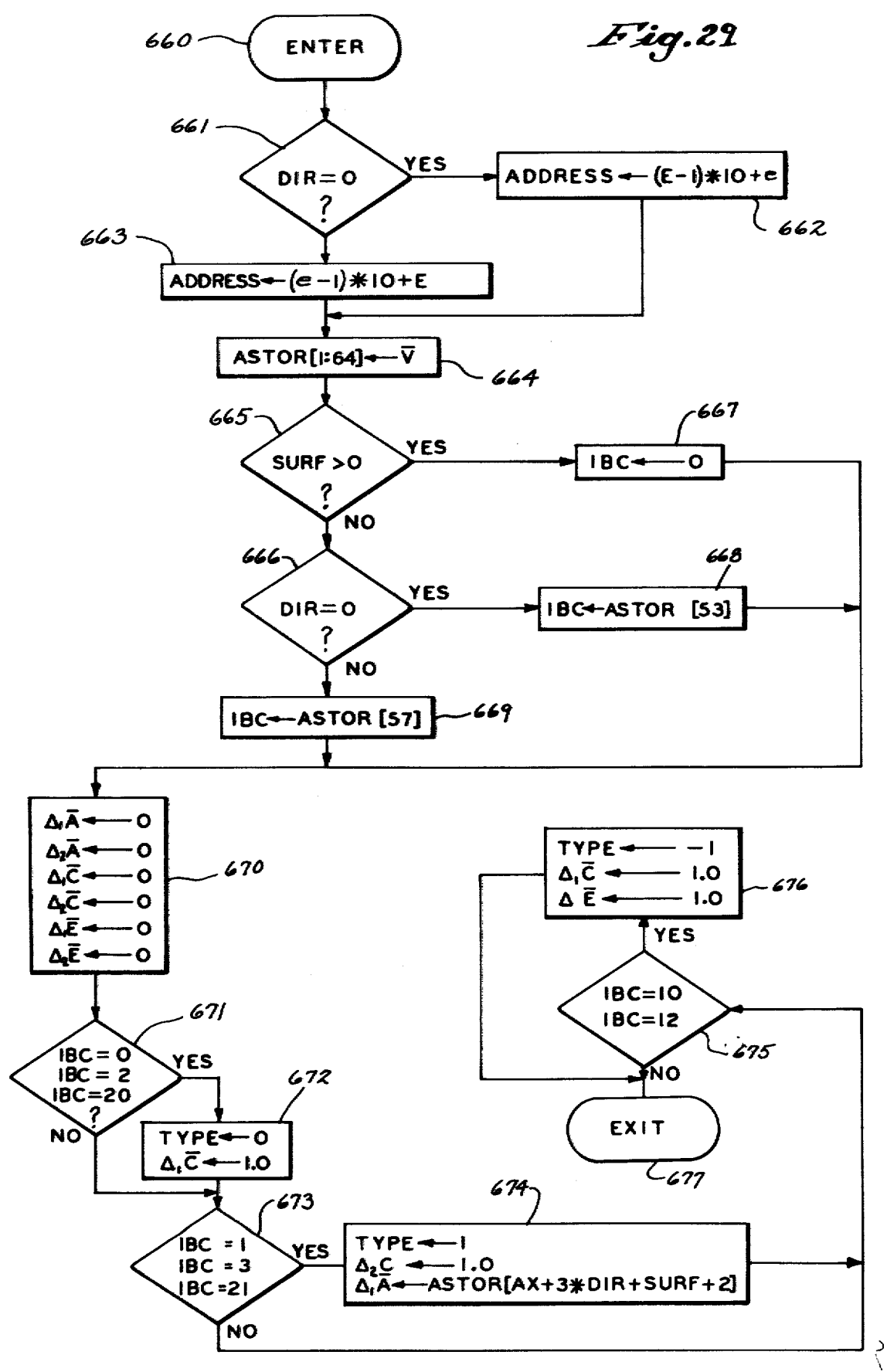
FIG. 29 is a flow chart of the ASTOR setup routine which forms a part of the routine of FIG. 28.

Referring to FIG. 29, the ASTOR SETUP subroutine 635 is entered at the point 660. A first instruction indicated by a decision block 661 determines the direction (trajectory or cross section) in which the preprocessing is to be performed. Accordingly, an address is calculated using the indexes $\iota$ and E and one of the instructions indicated by the process blocks 662 and 663. The command vectors V are stored in the disc storage 403 in the order discussed previously and the addresses are generated in a manner similar to that used by the numerical control processor 406 discussed previously. The addressed command vector is stored at the locations ASTOR [1:64] with a set of instructions indicated by a process block 664. Having retrieved the command vector V, the next step is to determine the boundary condition situation with a set of five instructions indicated by the decision blocks 665 and 666 and the process blocks 667, 668 and 669. Specifically, if the index SURF is greater than zero indicating surface preprocessing, the flag IBC is set to zero as indicated by the process block 667. If preprocessing in either modes 1, 2 or 3, however, the boundary condition situation is obtained from either element 53 or 57 of the command vector V being preprocessed. If preprocessing is in the trajectory direction, the flag IBC is set to the condition in vector element 53 with an instruction indicated by the process block 668. If, on the other hand, preprocessing is in the cross section direction, the flag IBC is set to the condition in element 57 with an instruction indicated by the process block 669.

The following is a list of the possible boundary conditions.

0—Free point
    1—Initial slope specified
    2—Final slope specified
    3—Initial and final slopes specified
    10—Initial closed path
    12—Initial closed path and final slope specified
    20—Final closed path
    21—Initial slope specified and final closed path After determining the boundary condition situation, the next step which is performed by a set of six instructions indicated collectively by the process block 670, is to set the $\Delta_1 A$, $\Delta_2 A$, $\Delta_1 C$, $\Delta_2 C$, $\Delta_1 E$, and $\Delta_2 E$ elements to zero. The $\Delta_1$ and $\Delta_2$ elements of the initial complex state vector A and the dummy vectors C and E are thus initially set to zero. Next, the boundary condition situation indicated at IBC is evaluated to determine the type [0, 1 0r −1] of situation specified. If IBC equals 0, 2 or 20, a TYPE 0 situation is presented as determined by a set of three instructions indicated collectively by the decision block 671. In this instance, the flag TYPE is set to 0 and the element $\Delta_1$ C is set to 1 with a pair of instructions indicated by the process block 672. On the other hand, if the flag IBC is equal to 1, 3 or 21 as determined by a set of three instructions indicated collectively by the decision block 673, the flag TYPE is set to 1, the $\Delta_2 C$ element is set to 1, and the $\Delta_1 A$ element is set to the specified slope stored at ASTOR [AX + 3 *DIR+SURF+2]. The latter three functions are performed with a set of three instructions indicated collectively by the process block 674. Finally, if the flag IBC is equal to 10 or 12 as determined by a pair of instructions indicated collectively by the decision block 675, the flag TYPE is set to −1, the element $\Delta_1 C$ is set to 1 and the element $\Delta_2 E$ is set to 1 with a set of three instructions indicated collectively by the process block 676. The elements of the vectors A, C and E are thus set up for the forward sweep subroutine 644 and the ASTOR SETUP routine is exited at the point 677.

Figure 30:
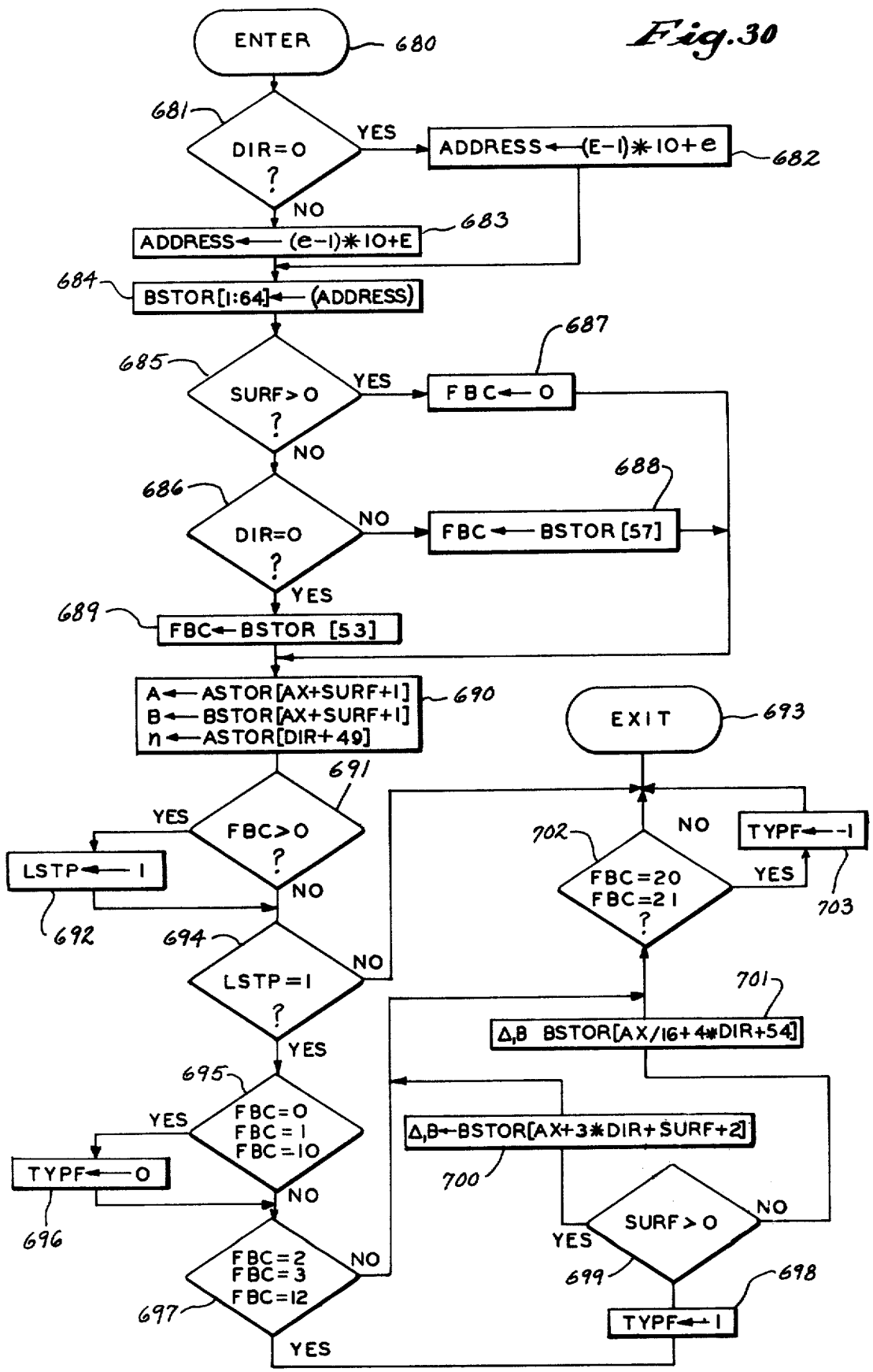
FIG. 30 is a flow chart of the BSTOR setup routine which forms a part of the routine of FIG. 28.

Referring to FIG. 30, the BSTOR SETUP routine performs essentially the same function as the ASTOR SETUP routine. It is entered at the point 680 and the direction of preprocessing is determined with an instruction indicated by the decision block 681. If preprocessing is in the trajectory direction, an instruction indicated by the process block 682 is executed to address the next data point on the trajectory. On the other hand, if preprocessing is in the cross section direction, an instruction indicated by the process block 683 is executed to address a command vector for the next data point in the cross section direction. The addressed command vector V is stored at successive locations designated BSTOR [1:64] with a set of instructions indicated by the process block 684. Next, the boundary condition situation is evaluated with a set of five instructions indicated by a pair of decision blocks 685 and 686, and three process blocks 687, 688 and 689. Specifically, if the index SURF is greater than zero, the condition established by the decision block 685 is met and the flag FBC is set to 0 as indicated by the process block 687. However, if preprocessing in modes 1, 2 or 3, the flag FBC is set either to the value of element [57] or element [53] of the command vector at BSTOR.

The next function performed by the BSTOR SETUP routine is to set the values of the vector elements A and B and the value of the granularity number n. This is performed with a set of three instructions indicated collectively by the process block 690 in which the command vector elements at ASTOR [AX + SURF +1] BSTOR [AX+SURF±1] and ASTOR[DIR+49] are selected. The next step indicated by the decision block 691 is to determine whether the flag FBC is greater than 0, or in other words, whether the minimum energy curve terminates at the data point described by BSTOR [1:64]. If so, the flag LSTP is set to 1 with an instruction indicated by the process block 692. However, if a "free point" is being preprocessed, or in other words, one which is not the last point on the minimum energy curve, the BSTOR SETUP routine is exited at the point 693. This determination is made with an instruction indicated by the decision block 694 in which the flag LSTP is evaluated.

If the last point on the minimum energy curve is being preprocessed, the value of the flag FBC is determined to establish the type of boundary condition situation present. Specifically, a set of three instructions indicated collectively by a decision block 695 are executed to determine whether the flag FBC is equal to 0, 1 or 10. If so, the flag TYPF is set to 0 with an instruction indicated by the process block 696. By means of three additional instructions indicated collectively by the decision block 697, it is next determined whether the flag FBC is equal to 2, 3 or 12. If so, the flag TYPF is set to 1 and the value of the $\Delta_1 B$ vector element is determined. The slope, or $\Delta_1$ element, is obtained from the command vector V and its location therein is determined by the mode of operation. With an instruction indicated by the decision block 699, the index SURF is first evaluated. If greater than zero, the $\Delta_1 B$ element is retrieved from BSTOR with an instruction indicated by the process block 700. If not, however, the $\Delta_1 B$ element is retrieved from BSTOR with an instruction indicated by the process block 701.

Finally, the presence of a TYPE −1 boundary condition situation is determined with a pair of instructions indicated collectively by the decision block 702. If the flag FBC is equal to 20 or 21, the flag TYPF is set to −1 with an instruction indicated by the process block 703. The BSTOR SETUP routine is then exited at the point 693.

Figure 31:
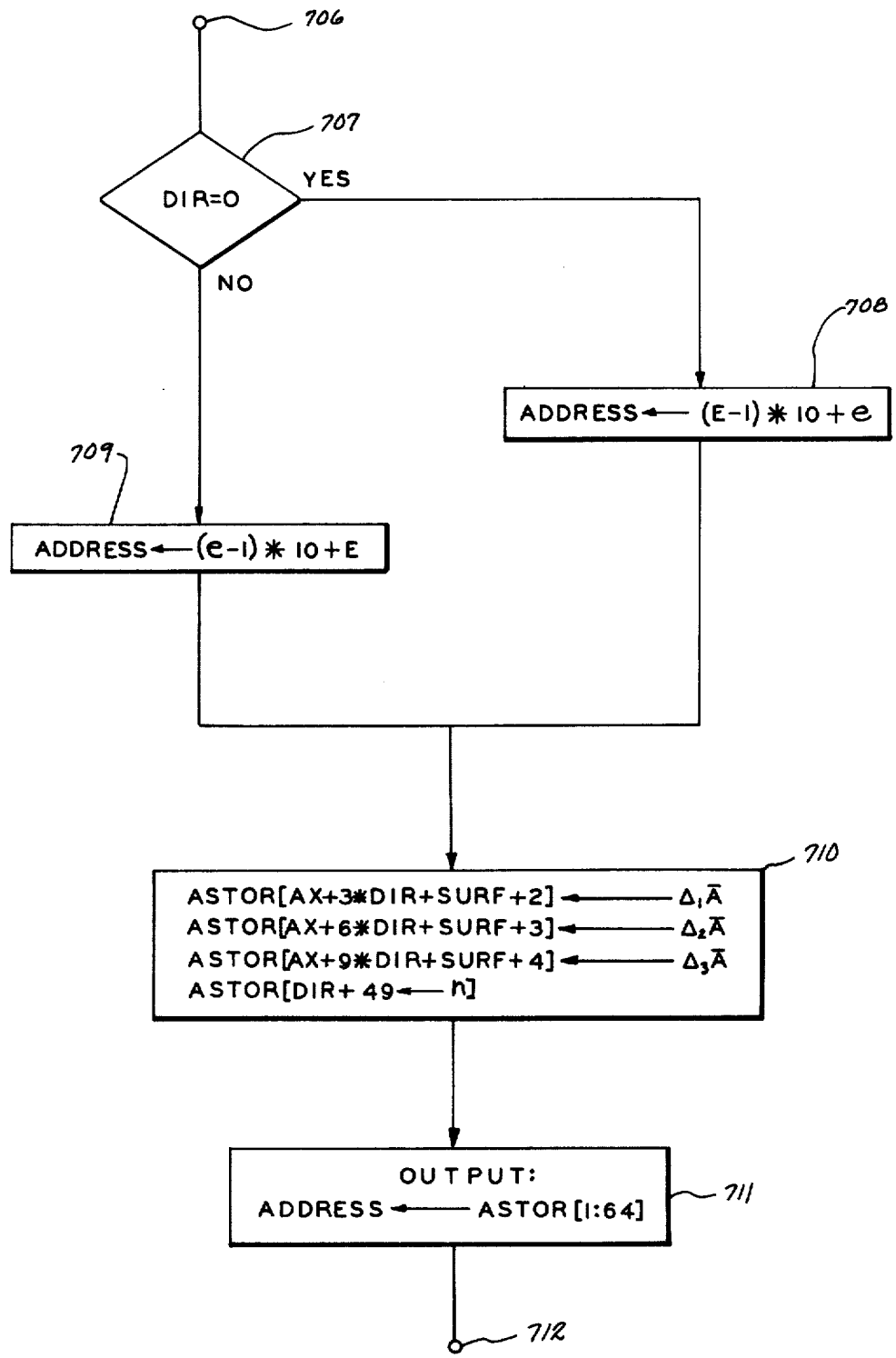
FIG. 31 is a flow chart of the vector element output routine which forms a part of the routine of FIG. 28, FIGS. 32 and 33 are flow charts of the forward sweep routine which is called by the routine of FIG. 28, FIGS. 34–36 are graphic illustrations used as an aid in describing the routines of FIGS. 27–33.

As indicated previously, the vector element output subroutine 653 is entered during the third forward sweep (when GEN=1). Referring to FIG. 31, this routine is entered at a point 706 and an instruction indicated by the decision block 707 is executed to determine the direction of preprocessing. If preprocessing in the trajectory direction, an address is generated with an instruction indicated by the process block 708, and if preprocessing in the cross section direction, an address is generated with an instruction indicated by the process block 709. Next, as indicated by a process block 710, the optimal values of the complex state vector elements at $\Delta_1 A$, $\Delta_2 A$ and $\Delta_3 A$ are stored at the appropriate locations in the command vector at ASTOR. The location of each element is determined by the indexes AX, DIR and SURF. Additionally, the granularity number n used during the forward sweep process is stored at its appropriate location in the command vector. Finally, the command vector at ASTOR [1:64] is generated to the disc storage 403 with an instruction indicated by the process block 711 and the subroutine is exited at the point 712. As indicated previously, the contents of BSTOR are then shifted to ASTOR and a new command vector V is obtained from the disc storage 403 and stored at BSTOR.

Figure 32:
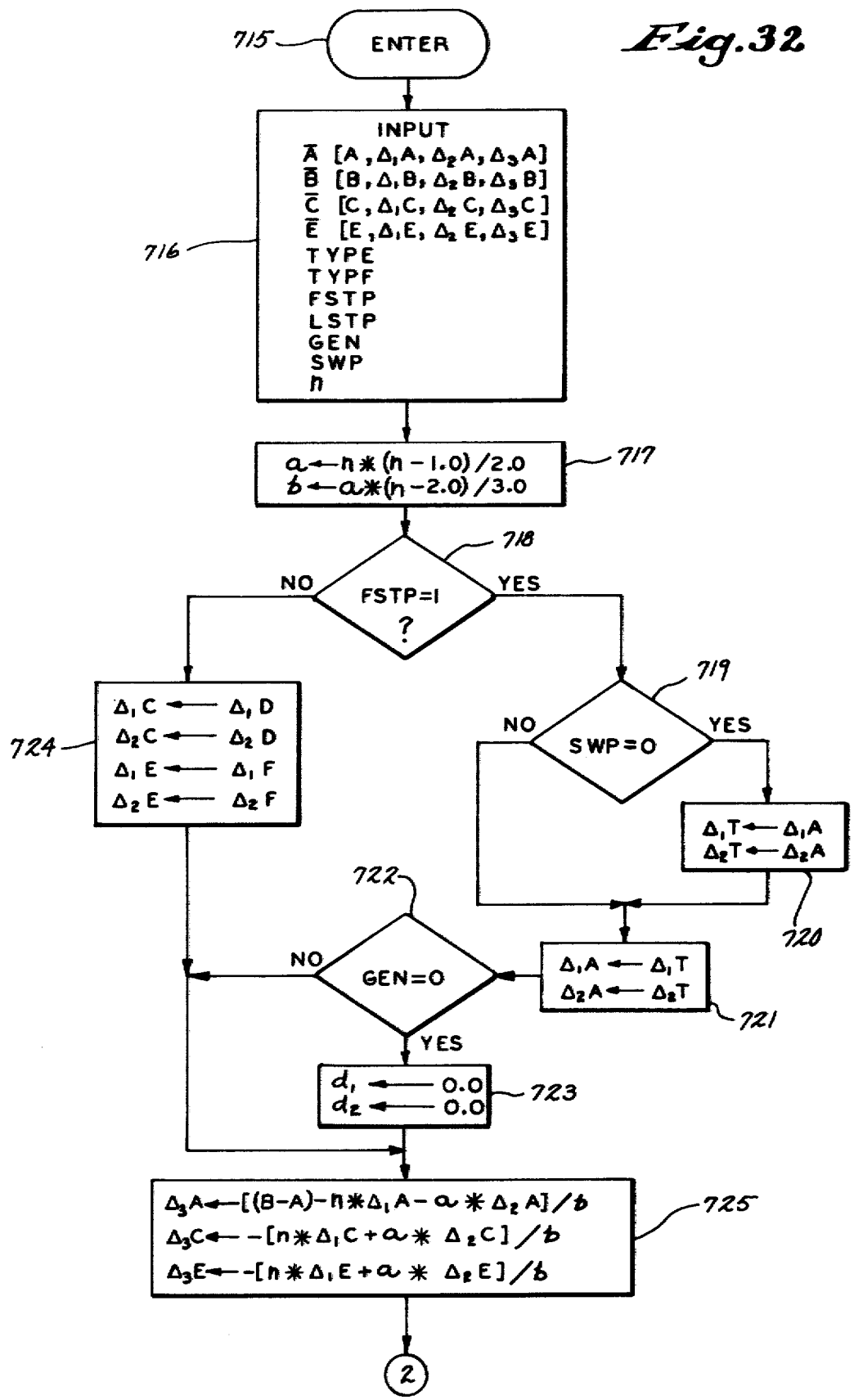
Figure 33:
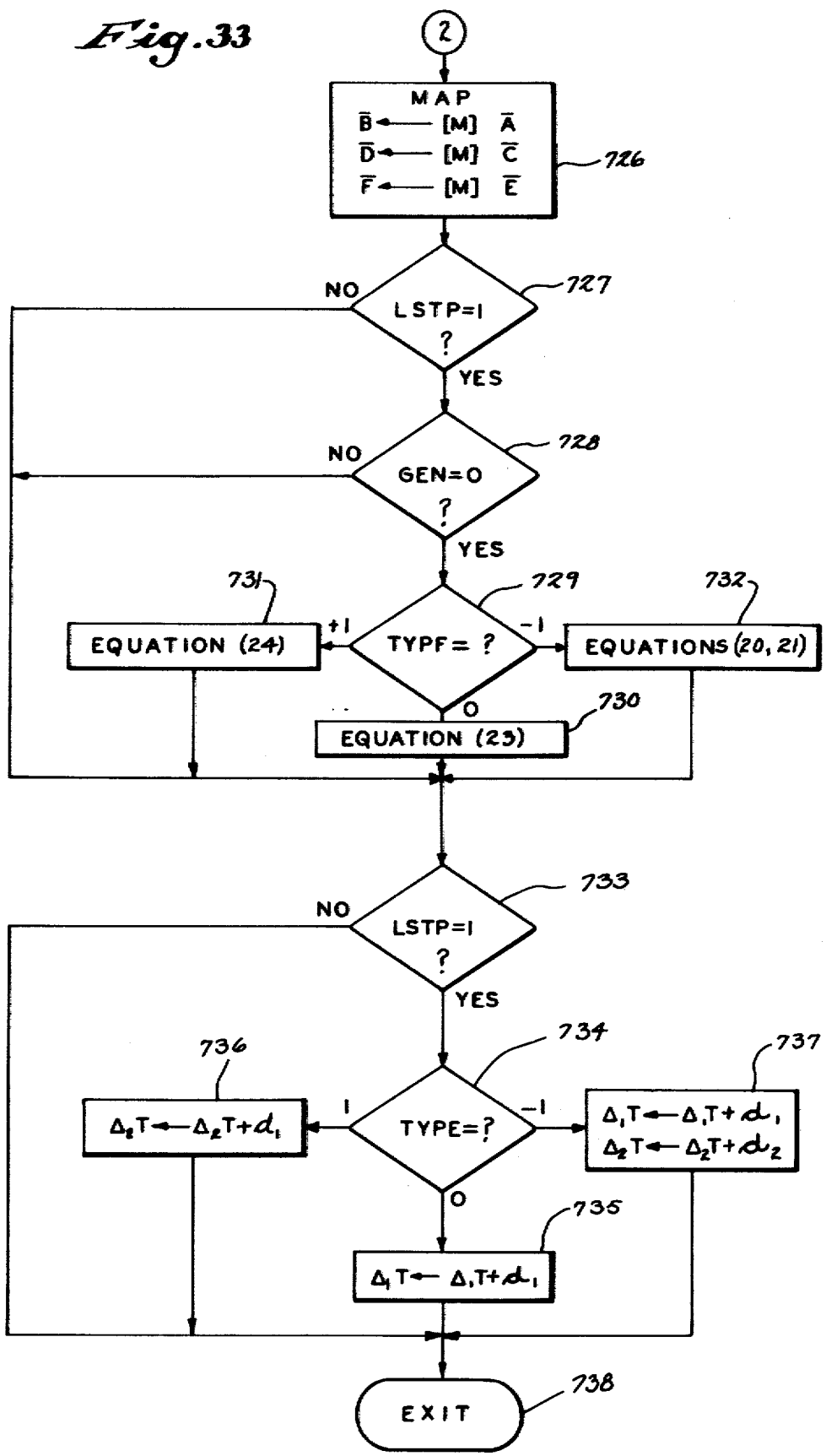

The second forward sweep process described above is performed at the central processor 400 by a forward sweep subroutine 644. Referring to FIGS. 32 and 33, the forward sweep subroutine is entered at a point 715 along with the variables, indexes and flags indicated collectively by the input block 716. The first step performed by the forward sweep subroutine is to calculate the values of a and b according to equation (16') discussed previously. This is accomplished with a pair of instruction indicated collectively by the process block 717. Next, by determining the state of the flag FSTP with an instruction indicated by the decision block 718, it is determined whether the first point on the minimum energy curve is being preprocessed. If so, it is then determined whether the initial forward sweep is being conducted by evaluating the state of the flag SWP as indicated by the process block 719. If the initial trial complex state vector is being swept forward from the first point on the minimum energy curve, the values of the $\Delta_1 A$ and $\Delta_2 A$ elements are temporarily stored at the respective locations $\Delta_1 T$ and $\Delta_2 T$ as indicated by the process block 720. On the first and subsequent forward sweeps from the initial data point on the minimum energy curve, the values at $\Delta_1 T$ and $\Delta_2 T$ are re-entered at $\Delta_1 A$ and $\Delta_2 A$ with a pair of instructions indicated collectively by the process block 721. On the first and second forward sweeps from the first point on the minimum energy curve, the scalers $d_1$ and $d_2$ are set to zero. This function is performed with a set of three instructions indicated by the decision block 722 and the process block 723. Referring back to the decision block 718, if the complex state vector is being swept forward from an intermediate point on the minimum energy curve, the $\Delta_1$ and $\Delta_2$ elements of the vectors D and F are transferred to the respective vectors C and E. This is accomplished by a set of four instructions indicated collectively by the process block 724.

The value of the initial complex state vector element $\Delta_3 A$ and the values of the dummy vector elements $\Delta_3 C$ and $\Delta_3 E$ and next computed. These computations are performed with a set of instructions indicated collectively in FIG. 32 by the process block 725. The four elements of each of the vectors A, C and E are thus established and may be swept forward to the next point on the minimum energy curve using the matrix [M] of equation (16') described above. More specifically, the elements of the vector A are swept forward through the matrix [M] to generate the elements of the vector B, the elements of the vector C are swept forward to generate the elements of the vector D, and the elements of the vector E are swept forward to generate the elements of the vector F. These instructions are indicated collectively by the process block 726 in FIG. 33. Next, the flag LSTP is evaluated to determine whether the last point on the minimum energy curve has been reached. This is performed using an instruction indicated by the decision block 727. If the last point has been reached, the index GEN is evalued to determine if the third forward sweep is being performed. This is accomplished with an instruction indicated by the decision block 728. If the first or second forward sweep is being performed, the next step is to determine the type of boundary condition situation at the last point on the minimum energy curve. This is accomplished with an instruction indicated by the decision block 729 in which the flag TYPF is evaluated to determine if it is at 1, −1 or 0. If a TYPE 0 situation is presented, the value of the scaler $d_1$ is calculated using equation (23) as indicated by the process block 730. If a TYPE 1 situation is presented, the value of the scaler $d_1$ is calculated using equation (24) as indicated by the process block 731. And finally, if a TYPE −1 situation is specified, the values of the scalers $d_1$ and $d_2$ are calculated using equations (20) and (21) as indicated by the process block 732. The values of the scalers $d_1$ and $d_2$ are thus calculated at the last point on each minimum energy curve after both the first and second forward sweeps (SWP=0 and 1).

The final step in the forward sweep process is to alter the $\Delta_1$ and $\Delta_2$ elements of the initial complex state vector with the scaler quantities $d_1$ and $d_2$. First, however, an instruction indicated by the decision block 733 is executed to determine if the last point on the minimum energy curve has been reached. If so, the next instruction indicated by the decision block 734 determines the type of boundary condition situation at the initial point on the minimum energy curve. If a TYPE 0 situation exists, the scaler $d_1$ is added to the variable $\Delta_1 T$ with an instruction indicated by the process block 735. If a TYPE 1 situation exists, however, the scaler quantity $d_1$ is added to the $\Delta_2 T$ variable with an instruction indicated by the process block 736. Finally, if a type −1 boundary situation exists, the scaler quantity $d_1$ is added to the variable $\Delta_1 T$ and the scaler quantity $d_2$ is added to the variable $\Delta_2 T$ with a pair of instructions indicated by the process block 737. The forward sweep subroutine is then exited at the point 738.

The forward sweep subroutine 644 is executed three times for each minimum energy curve. In the first sweep (SWP=0) the variables $\Delta_1 T$ and $\Delta_2 T$ are set to the values $\Delta_1 A$ and $\Delta_2 A$ for the initial point on the curve. The scaler quantities $d_1$ and $d_2$ are set to zero as indicated by the process block 723 and the values of the $\Delta_3 A$, $\Delta_3 C$ and $\Delta_3 E$ elements are computed as indicated by the process block 725. The three vectors A, C and E are then swept forward to the next point on the minimum energy curve by means of the process block 726. If this next point is intermediate the ends of the minimum energy curve, the forward sweep routine is exited at the point 738, back to the complex state vector routine where the $e$ loop is cycled. The forward sweep subroutine is re-entered at the point 715 and the values of the $\Delta_1$ and $\Delta_2$ elements for each of the vectors D and F are transferred to the respective vectors C and E as indicated by the process block 724. Second order continuity is thus established across the intermediate points along the minimum energy curve. New values for the $\Delta_3 A$, $\Delta_3 C$ and $\Delta_3 E$ elements are calculated as indicated by the process block 725, and the vectors A, C and E are again swept forward to the next point on the minimum energy curve by the process block 726. The cycle repeats for each intermediate data point on the minimum energy curve, and when the last point on the minimum energy curve is reached, the scaler quantities $d_1$ and $d_2$ are calculated using the instructions in one of the process blocks 730, 731 or 732. These scalers are then added to the variables $\Delta_1 T$ and $\Delta_2 T$ with the instructions indicated by the process block 735, 736 or 737, and during the second forward sweep (SWP=1) the corrected elements $\Delta_1 T$ and $\Delta_2 T$ are inserted as the initial complex state vector elements $\Delta_1 A$ and $\Delta_2 A$ as indicated by the process block 721. The scalers $d_1$ and $d_2$ are again set to zero as indicated by the process block 723 and a second forward sweep to the final point on the minimum energy curve is again conducted. New values of the scalers $d_1$ and $d_2$ are again calculated and used to alter the quantities $\Delta_1 T$ and $\Delta_2 T$. On the subsequent, final forward sweep (GEN=1) the $\Delta_1 T$ and $\Delta_2 T$ elements become the "optimal" initial complex state vector elements $\Delta_1 A$ and $\Delta_2 A$. The optimal $\Delta_3 A$ element is then calculated as indicated by the process block 725 and the optimal initial complex state vector is swept forward to subsequent points on the minimum energy curve with the instructions indicated by the process block 726. On this final forward sweep, the vector element output subroutine 653 is executed to output the optimal complex state vectors at each data point.

As indicated previously, with the exception of a portion of the forward sweep subroutine, the software for the both the central processor 400 and the numerical control processor 406 is written in ALGOL. Due to its length, the entire listing of the above described software will not be reproduced herein. Instead, the granularity computer routine illustrated in FIGS. 25 and 26 is listed below to exemplify the instructions actually applied to the central processor 400 and numerical control processor 406. The reference number of the process or decision block in FIGS. 25 and 26 to which each instruction corresponds appears in the column to the right.

|   |   |   |
|---|---|---|
|   | BEGIN |   |
|   | PROCEDURE RFWR(RT,RC,X,Y,Z,NT,NC); |   |
|   | REAL RT,RC; | 561 |
|   | REAL ARRAY X[1:11,1:11],Y[1:11,1:11],NT[1:11]; | 565, 579 |
|   | REAL ARRAY NC[1:10]; |   |
|   | INTEGER CAPJ,LITTLEJ,N1,N2; |   |
|   | LITTLEJ ← 1; | 562 |
|   | LABEL N563,N565,N579,N586,N588,NUMBER2; |   |
| N563: | N1 ← 0; | 563 |
|   | CAPJ ← 1; | 564 |
| N565: | N2 ← SQRT((X(CAPJ,LITTLEJ+1) − X(CAPJ,LITTLEJ))↑2 |   |
|   | +(Y(CAPJ,LITTLEJ+1) − Y(CAPJ,LITTLEJ))↑2 |   |
|   | +(Z(CAPJ,LITTLEJ+1) − Z(CAPJ,LITTLEJ))↑2)/RT; | 566 |
|   | IF (N2>N1) THEN N1 ← N2; | 567, 568 |
|   | IF (CAPJ=10) THEN GO TO N571; | 569 |
|   | CAPJ ← CAPJ+1; | 570 |
|   | GO TO N565; |   |
| N571: | NT(LITTLEJ) N1; | 571 |
|   | IF (LITTLEJ=10) GO TO NUMBER2; | 572 |
|   | LITTLEj ← LITTLEJ+1 | 573 |
|   | GO TO N563; |   |
| NUMBER2: | CAPJ ← 1; | 576 |
| N577: | N1 ← 0; | 577 |
|   | LITTLEJ ← 1; | 578 |
| N579: | N2 ← SQRT((X(CAPJ+1,LITTLEJ) − X(CAPJ,LITTLEJ))↑2 |   |
|   | +((Y(CAPJ+1,LITTLEJ) − Y(CAPJ,LITTLEJ))↑2 |   |
|   | +((Z(CAPJ+1,LITTLEJ) − Z(CAPJ,LITTLEJ))↑2)/RC; | 580 |
|   | IF (N2>N1) THEN N1 ← N2; | 581, 582 |
|   | IF (LITTLEJ=10) THEN GO TO N586. | 583 |
|   | LITTLEJ ← LITTLEJ+1; | 584 |
|   | GO TO N579; |   |
| N586: | NC(CAPJ) ← N1; | 585 |
|   | IF (CAPJ=10) THEN GO TO N588; | 586 |
|   | CAPJ ← CAPJ+1; | 587 |
|   | GO TO N577; |   |
| N588: | END $ | 588 |

DESCRIPTION OF THE SUBCIRCUITS

Figure 43:
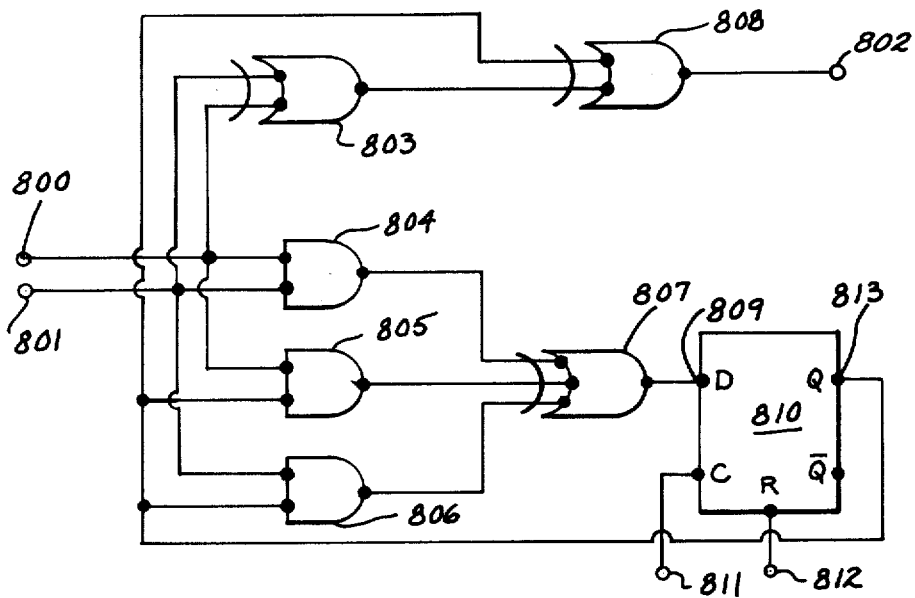
FIG. 43 is an electrical schematic diagram of the serial full adder circuit which is used throughout the system of FIG. 7.

Referring to FIG. 43, the serial full adder circuits used in the first embodiment of the present invention include a first input terminal 800, a second input terminal 801 and an output terminal 802. The first input terminal 800 connects to a first input terminal on an EXCLUSIVE OR gate 803, to an input terminal on a first AND gate 804, and to an input terminal on a second AND gate 805. The second input terminal 801 connects to a second input terminal on the EXCLUSIVE OR gate 803, to a second input on the first AND gate 804 and to an input terminal on a third AND gate 806. An output terminal on each of the AND gates 804, 805 and 806 connect to one of three input terminals on an OR gate 807 and the output terminal of the OR gate 807 connects to a D input 809 on a flip-flop 810. A clock input terminal 811 on the flip-flop 810 connects to a control circuit to receive a set of clock pulses when data is applied to the serial full adder input terminals 800 and 801. Similarly, an R input terminal 812 on the flip-flop 810 connects to the control circuit to receive the logic low reset pulse before each addition operation is performed. A Q output terminal 813 on the flip-flop 810 connects to a first input terminal on a second EXCLUSIVE OR gate 808, to a second input terminal on the second AND gate 805, and to a second input terminal on the third AND gate 806. Finally, an output terminal on the EXCLUSIVE OR gate 803 connects to a second input terminal on the second EXCLUSIVE OR gate 808, and an output terminal on the gate 808 connects to the adder output terminal 802. The serial full adder circuit operates to generate the sum of two binary numbers applied to its input terminals 800 and 801. Binary numbers in two's complement form are applied least significant bit first and clock pulses are synchronously applied to the clock input terminal 811 on the flip-flop 810 to store the generated carries. The sum is generated serially at the adder output terminal 802.

Figure 44:
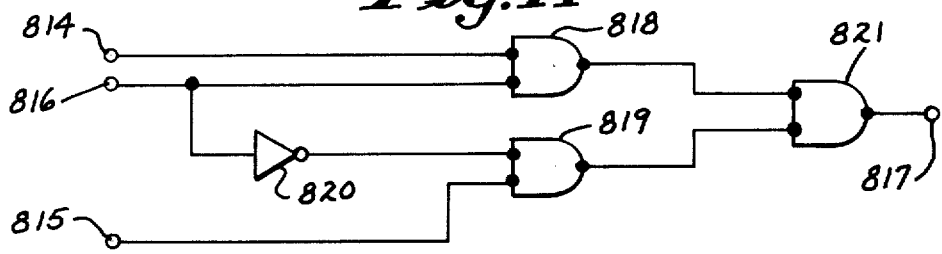
FIG. 44 is an electrical schematic diagram of the multiplexer circuit which is used throughout the system of FIG. 7.

Referring to FIG. 44, the multiplexer circuits used throughout the first embodiment of the invention include a pair of input terminals 814 to 815, a control terminal 816, and an output terminal 817. The input terminal 814 connects to an input terminal on a first AND gate 818 and the input 815 connects to a first input terminal on a second AND gate 819. The control terminal 816 connects to a second input on the AND gate 818 and connects through an inverter gate 820 to a second input on the AND gate 819. An output terminal on the first AND gate 818 connects to a first input terminal on an OR gate 821 and an output terminal on the second AND gate 819 connects to a second input on the OR gate 821. An output terminal on the OR gate 821 connects to the multiplexer output terminal 817. If a logic high voltage is applied to the control terminal 816, the logic signal applied to the first input terminal 814 is gated through the AND gate 818 and through the OR gate 821 to the output terminal 817. On the other hand, the application of a logic low voltage to the control terminal 816 gates the logic signal applied to the second input terminal 815 to the multiplexer output terminal 817.

Figure 39:
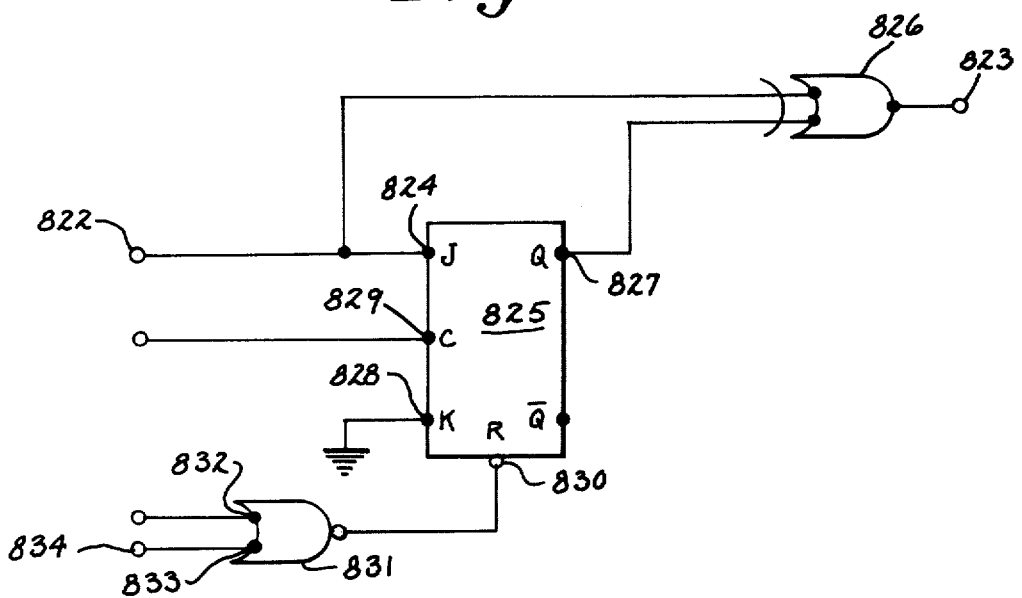
FIG. 39 is an electrical schematic diagram of the serial inverter circuit which is used throughout the system of FIG. 7.

Referring to FIG. 39, the serial inverter circuit used throughout the first embodiment of the invention include an input terminal 822 and an output terminal 823. The input terminal 822 connects to a J terminal 824 on a J-K flip-flop 825 and to one input terminal of an EXCLUSIVE OR gate 826. The Q output terminal 827 on the J-K flip-flop 825 connects to a second input on the EXCLUSIVE OR gate 826 and an output terminal on the OR gate 826 connects to the inverter output terminal 823. The K input terminal 828 on the J-K flip-flop 825 connects to circuit ground, the C input terminal 829 connects to receive clock pulses from a control circuit and a reset terminal 830 connects to the output of a NOR gate 831. A first input terminal 832 on the NOR gate 831 connects to the control circuitry to receive a logic high initialization pulse and a second input terminal 833 connects to an inhibit input terminal 834.

A two's complement binary number is applied serially to the input terminal 822 least significant digit first. When the first logic high, or 1 is received, the flip-flop 825 is set and a logic high voltage is thus generated to the EXCLUSIVE OR gate 826. As a result, subsequent bits of the binary number are inverted by the gate 826 and generated at the output terminal 823. The J-K flip-flop 825 is reset by the application of a logic low voltage to a reset terminal 830. This is performed automatically by a reset pulse applied to the first input terminal 832 of the NOR gate 831 immediately before the circuit is operated. Another mode of operation is selected by applying a logic high voltage to the inhibit terminal 834. The J-K flip-flop 825 is held in its reset state and the binary number is generated at the output terminal 823 without being inverted.

Figure 40:
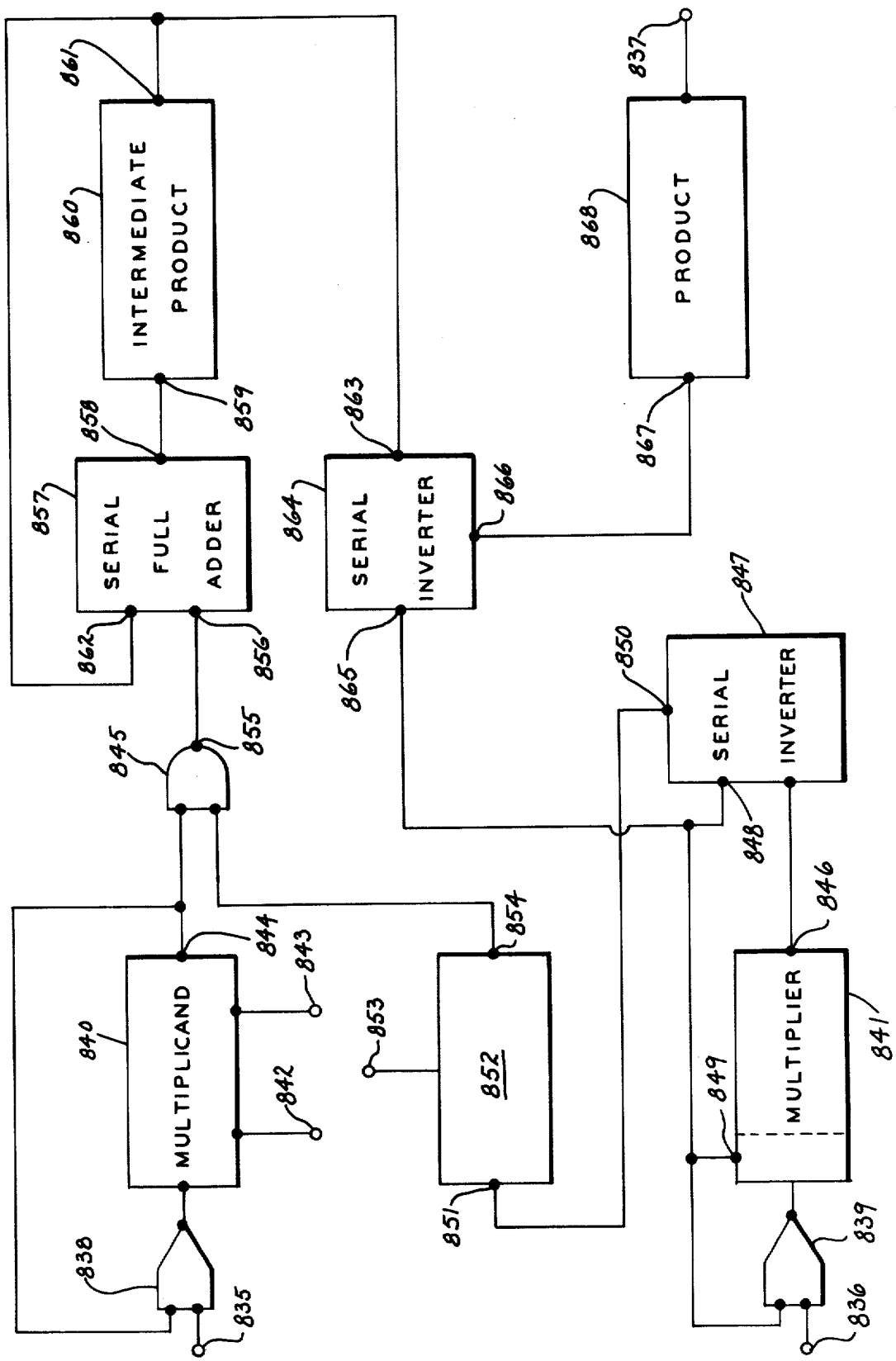
FIG. 40 is an electrical schematic diagram of the multiplier circuit which is used throughout the system of FIG. 7.

Referring to FIG. 40, the multiplier circuits used throughout the first embodiment of the invention include a multiplicand input terminal 835, a multiplier input terminal 836 and an output terminal 837. The multiplicand input terminal connects to one input of a first multiplexer circuit 838 and the multiplier input terminal 836 connects to a first input terminal on a second multiplexer circuit 839. An output terminal on the first multiplexer 838 connects to a 72-bit bidirectional multiplicand shift register 840 and an output terminal on the second multiplexer circuit 839 connects to the input terminal of a 72-bit multiplier shift register 841. The multiplicand shift register 840 includes a left shift input terminal 842, a right shift input terminal 843, and an output terminal 844. The output terminal 844 connects to a second input terminal on the multiplexer circuit 838 and to a first input terminal on an AND gate 845. The multiplier shift register 841 includes an output terminal 846 which connects to the input terminal of a serial inverter circuit 847 and a sign bit output terminal 849 which connects with an inhibit terminal 848 on the serial inverter 847. The output terminal 849 also connects to a second input terminal on the multiplexer circuit 839 so that the sign bit remains during the multiplication operation. An output terminal 850 on the serial inverter circuit 847 connects to an input terminal 851 on a 72-bit shift register 852. The shift register 852 includes a right shift input terminal 853 and an output terminal 854 which connects with a second input terminal on the AND gate 845.

An output terminal 855 on the AND gate 845 connects to a first input terminal 856 on a serial full adder circuit 857, and an output terminal 858 on the adder circuit connects to an input terminal 859 on a 72-bit intermediate product shift register 860. An output terminal 861 on the shift register 860 connects to a second input terminal 862 on the serial full adder 857 and to an input terminal 863 on a serial inverter circuit 864. An inhibit input terminal 865 on the inverter circuit 864 connects to the sign bit output terminal 849 on the multiplier shift register 841 and an output terminal 866 on the serial inverter 864 connects to an input terminal 867 on a 72-bit product shift register 868.

The 36-bit multiplier and multiplicand numbers are loaded into the respective shift registers 841 and 840 and the multiplier is shifted through the serial inverter circuit 847. The two's complement multiplier is thereby converted to a magnitude which is loaded into the shift register 852. The least significant digit of this number is generated at the output terminal 854 and applied to the AND gate 845. The multiplicand shift register 840 is then cycled and the multiplicand is shifted out the terminal 844, to the AND gate 845 and through the multipliexer 838. If the least significant bit generated at the shift register output terminal 854 is a 1 the multiplicand is gated through the AND gate 845 and applied to the serial full adder circuit 857. If not, a 0 is applied to the input terminal 856 of the serial full adder 857 during the first cycle. The result of the first cycle is stored in the intermediate product shift register 860. After completion of the first cycle, the multiplier stored in the shift register 852 is shifted one bit to the right by the application of a clock pulse to the right shift terminal 853, and the multiplicand is shifted left on bit by the application of a logic high clock pulse to its left shift input terminal 842. The cycle is then repeated and the number generated at the output of the AND gate 845 is summed with the number stored in the intermediate product shift register 860. This sequence is repeated until all 36 bits of the multiplier stored in the shift register 852 have been generated at the output terminal 854. The sign of the resulting product stored in the intermediate product shift register 860 is then determined using the serial inverter circuit 864, and the result is stored in the product shift register 868.

Figure 41:
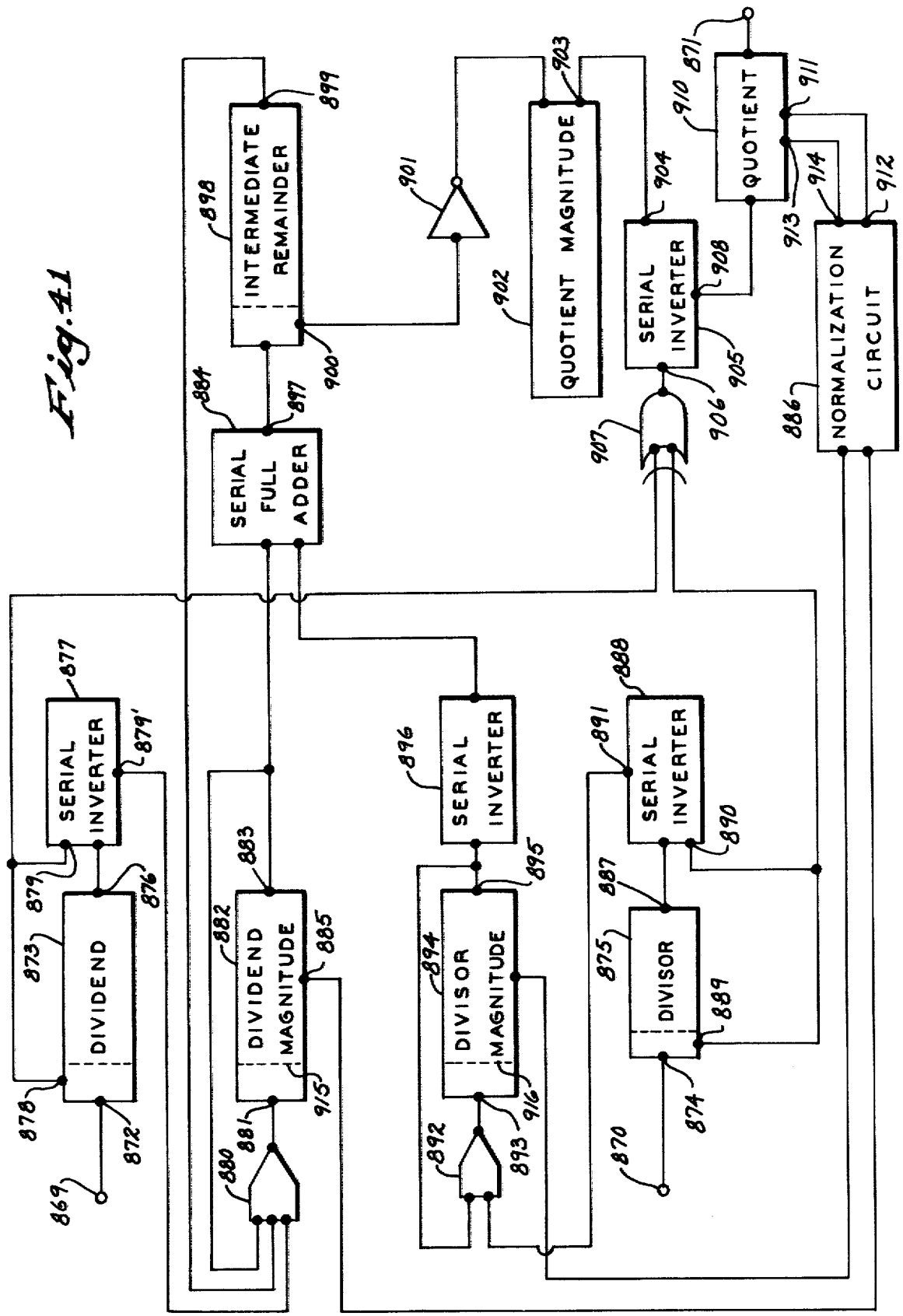
FIG. 41 is an electrical schematic diagram of the divider circuit which is used throughout the system of FIG. 7.

Referring to FIG. 41, the divider circuit used throughout the first embodiment of the invention includes a dividend input terminal 869, a divisor input terminal 870 and an output terminal 871. The dividend input terminal 869 connects to an input 872 on a 36-bit dividend shift register 873 and the divisor input terminal 870 connects to the input 874 on a 36-divisor shift register 875. An output terminal 876 on the dividend shift register 873 connects to an input terminal on a serial inverter circuit 877, and a sign bit output terminal 878 on the dividend shift register 873 connects to an inhibit terminal 879 on the serial inverter 877. The output 879 of the inverter 877 connects to a first input terminal on a multiplexer circuit 880, and the output of the multiplexer circuit 880 connects to an input terminal 881 on a 36-bit dividend magnitude shift register 882. The shift register 882 includes an output terminal 883 connected to one input of a serial full adder circuit 884 and a lift shift input terminal 885 connected to a normalization circuit 886. The divisor shift register 875 includes an output terminal 887 which connects to the input of a serial inverter circuit 888. A sign bit output terminal 889 on the divisor shift register 875 connects to an inhibit terminal 890 on the inverter 888 and an output terminal 891 on the inverter 888 connects to one input terminal of a multiplexer circuit 892. The output terminal of the multiplexer circuit 892 connects to an input terminal 893 on a 36-bit divisor magnitude shift register 894. An output terminal 895 on the shift register 894 connects to a second input terminal on the multiplexer circuit 892 and to the input terminal on a serial inverter circuit 896. The output of the serial inverter 896 connects to a second input terminal on the serial full adder circuit 884.

An output terminal 897 on the serial full adder 884 connects to the input of a 36-bit intermediate remainder shift register 898. The register 898 includes an output terminal 899 which connects to a second input terminal on the multiplexer circuit 880 and a sign bit output terminal 900 which connects through an inverter gate 901 to the input of a 36-bit quotient magnitude shift register 902. An output terminal 903 on the shift register 902 connects to the input 904 of a serial inverter circuit 905, and an inhibit terminal 906 on the inverter 905 connects to the output of an EXCLUSIVE OR gate 907. A first input terminal on the EXCLUSIVE OR gate 907 connects to the sign bit terminal 878 on the dividend shift register 873, and a second input terminal connects to the sign bit output terminal 889 on the divisor shift register 875. An output terminal 908 on the serial inverter circuit 905 connects to the input 909 of a 36-bit quotient shift register 910, and the output of the quotient shift register 910 connects to the divider circuit output terminal 871. A left shift input terminal 911 on the register 910 connects to a first output terminal 912 on the normalization circuit 886, and a right shift input terminal 913 connects to a second output terminal 914 on the normalization circuit 886.

The dividend is stored in two's complement form in the dividend shift register 873 and is shifted through the serial inverter circuit 877 and stored in the dividend magnitude shift register 882 as a magnitude. Similarly, the divisor is stored in two's complement form in the divisor shift register 875 and is shifted through the serial inverter 888 and stored in the divisor magnitude shift register 894. Both numbers are then normalized by shifting them to the left until the most significant digit of each is located in the sign bit location indicated by the dotted lines 915 and 916. The number of shifts required to normalize each number is stored by the normalization circuit 886. Next, the dividend and divisor are shifted in synchronism to the right through the serial full adder 884 to effectively subtract the divisor from the dividend and store the result of the intermediate remainder shift register 898. The divisor is also cycled through the multiplexer circuit 892 and restored in the divisor magnitude shift register 894. If the resulting remainder is positive, a logic low voltage is generated at the sign bit output terminal 900 of the intermediate remainder shift register 898 and a 1 is entered into the least significant digit of the quotient magnitude shift register 902. The intermediate remainder 899 is then shifted to the right through its output terminal 899, through the multiplexer circuit 880 and is stored in the dividend magnitude shift register 882.

If on the other hand the resulting remainder is negative, a zero is applied to the least significant bit of the quotient magnitude shift register 902 and the number in the dividend magnitude shift register 882 is recycled and remains the same. Next, the number stored in the dividend magnitude shift register 882 is left shifted one place and the number stored in the quotient magnitude shift register 902 is left shifted one place. The cycle is then repeated, subtracting the divisor from the dividend magnitude, determining the sign of the result, and setting up the dividend magnitude shift register 882 for the next cycle. After 36 cycles the number stored in the quotient magnitude shift register 902 is shifted to the right through the output terminal 903 and through the serial inverter circuit 905 to the quotient shift register 910. The serial inverter circuit 905 is controlled by the EXCLUSIVE OR gate 907 to determine the proper sign of the resulting quotient. Finally, the number stored in the quotient shift register 910 is denormalized by the normalization circuit 886.

Figure 42:
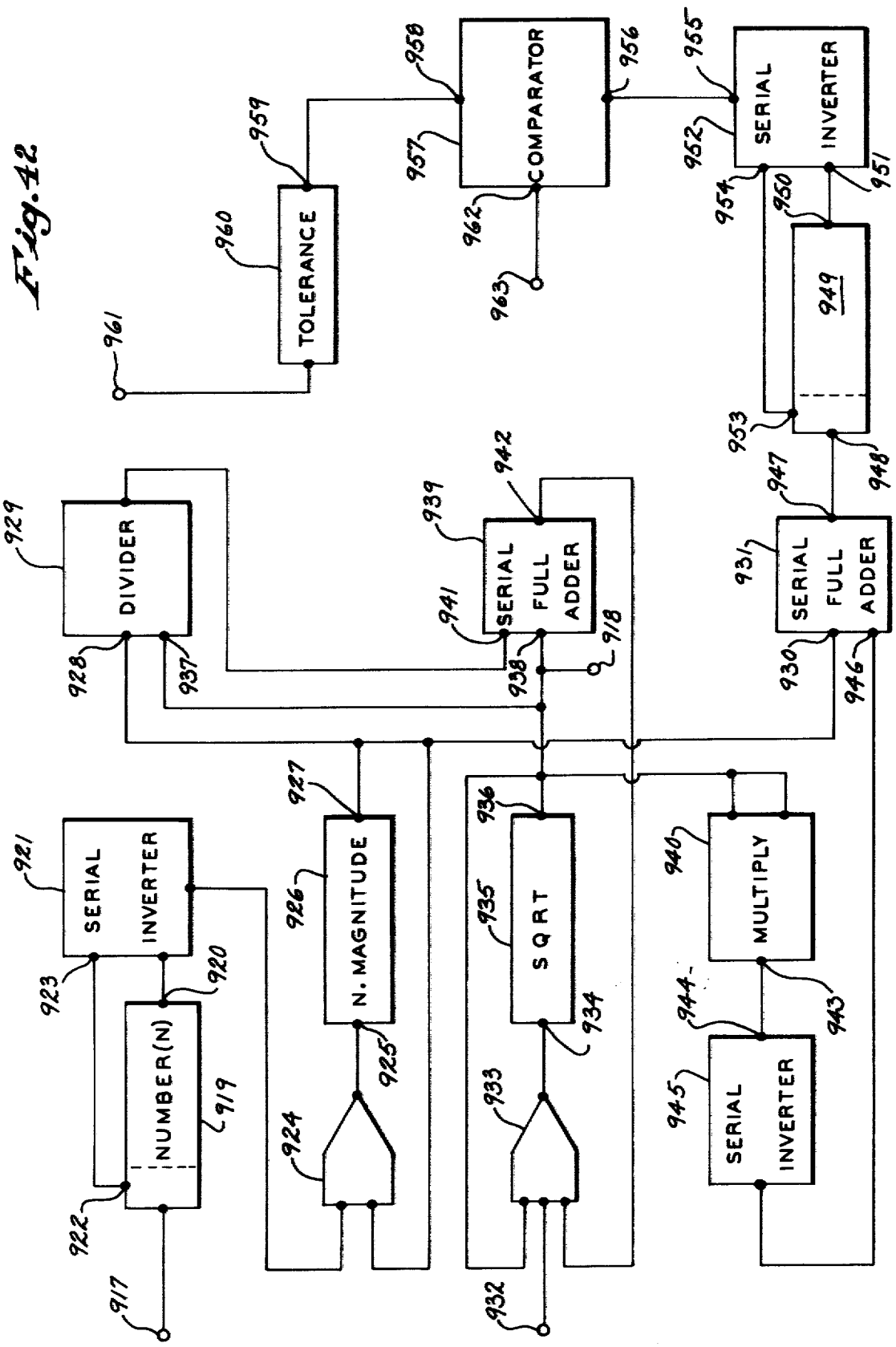
FIG. 42 is an electrical schematic diagram of the square root circuit used in the system of FIG. 7.

Referring to FIG. 42, the square root circuit includes an input terminal 917 and an output terminal 918. The circuit makes use of a Newton Raphson iterative technique for computing the square root of a two's complement number. The number is serially applied to the circuit at the input terminal 917 and stored in a 72-bit N shift register 919. An output terminal 920 on the shift register 919 connects to the input of a serial inverter circuit 921 and a sign bit output terminal 922 connects to an inhibit terminal 923 on the serial inverter 921. The output of the serial inverter 921 connects to a first input terminal on a multiplexer circuit 924, and the output of the multiplexer circuit 924 connects to an input terminal 925 on a 72-bit N magnitude shift register 926. An output terminal 927 on the shift register 926 connects to a dividend input terminal 928 on a divider circuit 929 and connects to a second input terminal on the multiplexer circuit 924. The output terminal 927 also connects to an input terminal 930 on a first serial full adder circuit 931.

A second input terminal 932 on the square root circuit receives an initial guess of the square root of the number stored in the N shift register 926 (for example, N/2). The input terminal 932 connects to one input terminal of a multiplexer circuit 933, the output terminal of which connects to an input terminal 934 on a 72-bit square root (SQRT) shift register 935. An output terminal 936 on the shift register 935 connects to a second input terminal on the multiplexer circuit 933, to a divisor input terminal 937 on the divider circuit 929, to the square root circuit output terminal 918, to an input terminal 938 on a second serial full adder circuit 939 and to both input terminals of a multplier circuit 940. The output of the divider circuit 929 connects to a second input terminal 941 on the second adder 939. An output terminal 942 on the adder 939 connects to an input terminal on the multiplexer circuit 933 and an output terminal 943 on the multiplier circuit 940 connects to an input terminal 944 on a second serial inverter circuit 945. The output terminal of the inverter 945 connects to a second input terminal 946 on the first adder circuit 931 and an output terminal 947 on the adder 931 connects to an input terminal 948 on a 36-bit shift register 949. An output terminal 950 on the shift register 949 connects to an input terminal 951 on a third serial inverter circuit 952, and a sign bit output terminal 953 connects to an inhibit terminal 954 on the inverter 952. An output terminal 955 on the inverter 952 connects to a first input terminal 956 on a digital comparator circuit 957 and a second input terminal 958 on the comparator 957 connects to an output terminal 959 on a 36-bit tolerance storage register 960. An input terminal on the tolerance shift register 970 connects to the control circuitry to receive a tolerance number through a terminal 961. An output terminal 962 on the comparator circuit 957 also connects to the control circuitry through a terminal 963.

The number to be operated on is applied to the N shift register 919 and a number equal to half its value is entered into the SQRT shift register 935 through the input terminal 932. The number N is in two's complement form, but is converted to a magnitude by the operation of the serial inverter circuit 921. It is stored in the N magnitude shift register 926 and it along with the number of the SQRT shift register 935 are then shifted to the right and applied to the input terminals 928 and 937 on the divider circuit 929. They are also recycled through their respective multiplexer circuits 924 and 933. The quotient generated by the divider circuit 929 and the initial guess stored in the SQRT shift register 935 are then applied to the input terminals of the serial full adder circuit 939 and the result (SQRT + N/SQRT) is applied through the multiplexer circuit 933 to the SQRT shift register 935. This resulting number is shifted right one place to effectively divide it by two and to form the first calculated value of the square root of N. The above cycle is repeated until the calculated value of the square root meets the accuracy requirements established by the number stored in the tolerance shift register 960.

After each such cycle, the calculated square root stored in the shift register 935 is applied to both input terminals of the multiplier circuit 940 and the resulting squared number is inverted by the inverter circuit 945 and applied to the serial full adder circuit 931. Simultaneously, the number N stored in the magnitude shift register 926 is applied to the serial full adder circuit 931 and the resulting quantity $[N - (SQRT)^2]$ is stored in two's complement form in the shift register 949. Finally, this number is converted into a magnitude which is applied to one input of a comparator circuit 957 and the tolerance number stored in the shift register 960 is applied to a second input terminal 958 on the comparator 957. If the number stored in the shift register 949 is less than the tolerance number in the shift register 960, a logic high voltage is generated at the comparator output terminal 962 and the result stored in the SQRT shift register 935 is generated at the output terminal 918 to complete the operation.

I claim:

1. An interpolation system, the combination comprising:
  a preprocessor having input means for receiving an ordered set of input data which relates to a spacial form to be reproduced, including the coordinate values of selected data points on the spacial form, said preprocessor including means for calculating the elements of an initial state vector which describes said spacial form at one of said selected data points, means for calculating the elements of an initial steering vector, and means for storing the elements of an initial complex state vector which defines the spacial form and which includes the elements of said initial state vector and the elements of said initial steering vector;
  a mapping interpolator having input means connected to receive the initial complex state vector elements generated by the preprocessor and including adjoint interpolator means for iteratively altering the values of selected elements of said initial state vector, and dynamic interpolator means for iteratively altering selected elements of said initial steering vector, said mapping interpolator thereby performing a state transition on the initial complex state vector;
  interpolation control means connected to control the iterations of said mapping interpolator; and
  controlled means for reproducing said spacial form, said controlled means being connected to continuously receive selected elements of said complex state vector which are iteratively generated by said mapping interpolator during said state transition.

2. The interpolation system as recited in claim 1 wherein said mapping interpolator is a digital differential analyzer having a set of input terminals each connected to receive one element of the initial complex state vector.

3. The interpolation system as recited in claim 2 wherein said preprocessor includes a granularity computer having an input connected to receive the coordinate values of successive data points on the spacial form and a chordal error number, said granularity computer being operable to calculate a granularity number $(n)$.

4. The interpolation system as recited in claim 3 in which said ordered set of input data includes an initial coordinate value ($x_0$) and slope ($\Delta_1 x_0$) at a first data point in the spacial form, and a final coordinate value ($x_n$) and slope ($\Delta_1 x_n$) at a second data point on the spacial form and in which said preprocessor calculates the value of a first variable $a = x_n - n\Delta_1 x_n - x_0,$ and calculates the value of a second variable $b = \Delta_1 x_n - \Delta_1 x_0,$ and said initial steering vector calculating means calculates a first element ($\theta x_0$) of the initial steering vector according to the following expression:

$$\theta x_0 = \frac{1}{a(2n^3 + 3n^2 + n)/6 - b(n^2 + n)/2}$$

and calculates a second element ($\phi x_0$) of the initial steering vector according to the following expression:

$$\theta x_0 = \frac{1}{-a(n^2 + n)/2 + bn}.$$

5. The interpolation system as recited in claim 4 in which said mapping interpolator is connected to receive the initial complex state vector elements $x_0$, $\Delta_1 x_0$, $\theta x_0$ and $\phi x_0$ from said preprocessor and is operable to iteratively apply the following transition matrix $$\begin{bmatrix} 1 & 1 & 0 & 0 \\ 0 & 1 & -1 & 1 \\ 0 & 0 & 1 & 0 \\ 0 & 0 & -1 & 1 \end{bmatrix}$$

to said elements.

6. The interpolation system as recited in claim 3 in which said initial steering vector calculating means includes a $\theta$ element computer connected to receive the granularity number ($n$), the coordinate value of two successive data points on the spacial form ($x_0^1 x_0^2$), and two initial complex state vector elements ($\Delta_1 x_0^1$, $\phi x_0^1$) at the first of two successive data points, said $\theta$ element computer being operable to calculate the value of another initial complex state vector element ($\theta x_0$) be executing the following equations:

$a = n(n-1)(n+1)/6$
$b = n(n-1)/2$
$\theta x_0 = [x_0^2 - x_0^1 - n\Delta_1 x_0^1 - b\phi x_0^1]/a$ 7. The interpolation system as recited in claim 6 in which said mapping interpolator is connected to receive the initial complex state vector elements $x_0^1, \Delta_1 x_0^1, \phi x_0^1, \theta x_0^1$ from said preprocessor and perform a state transition by iteratively calculating a succession of complex state vector elements ($x_i^1$, $\Delta_1 x_i^1, \theta x_i^1, \phi x_i^1$) according to the following expressions:

$x_{i+1}^1 = x_i^1 + \Delta_1 x_i^1$
$\Delta_1 x_{i+1}^1 = \Delta_1 x_i^1 - \theta x_i^1 + \phi x_i^1$
$\theta x_{i+1}^1 = \theta x_i^1$
$\phi x_{i+1}^1 = -\theta x_i^1 + \phi x_i^1$ wherein $i$ is an iteration index which indicates the number of times the calculations have been made during said state transition and which ranges from zero to ($n$).

8. The interpolation system as recited in claim 1 in which said preprocessor includes a granularity computer that calculates a granularity number ($n$) from the received input data, in which said preprocessor includes means for calculating a pair of variables ($a$ and $b$) according to the following expressions:

$a = n(n-1)/2$
$b = n(n-1)(n-2)/6$ and in which the coordinate values of two successive data points (A and B) along with a pair of complex state vector elements at the first of said data points ($\Delta_1 A$ and $\Delta_2 A$) are applied to said means for calculating the elements of said initial steering vector to calculate the value of another complex state vector element ($\Delta_3 A$) according to the following expression:

$\Delta_3 A = (B - A - n\Delta_{1 A} - a\Delta_2 A)/b$

9. The interpolation system as recited in claim 8 in which said mapping interpolator is connected to receive the $\Delta_1 A$, $\Delta_2 A$ and $\Delta_3 A$ complex state vector elements from said preprocessor and is operable to calculate therefrom a succession of corresponding elements by repeatedly executing the following expressions:

$\Delta_1 A \quad \Delta_1 A + \Delta_2 A$
$\Delta_2 A \quad \Delta_2 A + \Delta_3 A$ 10. The interpolation system as recited in claim 1 in which the input data describes the spacial form to be reproduced with respect to a multi-axis coordinate system and the complex state vector generated by said preprocessor includes a set of elements for each axis;

in which said mapping interpolator performs said state transition on each set of complex state vector elements by iteratively and concurrently altering the value of selected elements in each set; and in which said controlled means includes drive means for each axis of the coordinate system and each drive means is connected to said mapping interpolator to receive one of said iteratively altered complex state vector elements to the set to which it corresponds.

11. The interpolation system as recited in claim 10 in which said preprocessor includes a granularity computer which receives selected input data describing the spacial form to be reproduced and calculates a granularity number, and in which the number of iterations made by said mapping interpolator to perform said state transition is determined by said granularity number.

12. In an electronic system for controlling motion, a method of electrically reproducing a trajectory which is described with respect to the axes of a coordinate system by an ordered set of digital input data points, the steps comprising:

1. storing said digital input data points in an electronic digital preprocessor along with a preselected chordal error number;

2. calculating and storing in said preprocessor a set of granularity numbers, the values of which are determined by the spacing between data points on said trajectory and the value of said stored chordal error number;

3. calculating complex state vectors in said preprocessor from said stored digital input data, said complex state vectors defining said trajectory and each having a set of elements for each axis of the coordinate system;

4. storing selected elements, in each of said sets of complex state vector elements in a mapping interpolator;

5. iteratively altering selected elements stored in said mapping interpolator to perform a state transition which maps a set of output data points that connect a pair of said stored input data points with a smooth trajectory, the number of said iterations being controlled by a selected one of said stored granularity numbers; and 6. repeating steps 4 and 5 until said stored input data points are connected with closely spaced output data points that describe a trajectory.

13. The method as recited in claim 12 in which the iterative alteration of said selected elements in each of said sets of complex state vector elements is performed independently as a function of time.

14. The method as recited in claim 12 in which one element in each set of said initial complex state vector elements is calculated in said preprocessor by a forward sweep process comprising the steps of:
  storing a preselected trial value for said one element in each set;
  calculating the value of said elements in each set at each of said digital input data points using said stored preselected trial value for said one element in each set, said calculations performing a trial state transition on said sets of elements to sweep them through said ordered set of digital input data points;
  storing the calculated values of the elements of each set at the last digital input data point on a smooth segment of said trajectory to be reproduced; and
  calculating an optimal value for said one element in each set of complex state vector elements based on the results of said trial state transition.

15. The method as recited in claim 14 in which the optimal value of said one element in each set of complex state vector elements is calculated by computing the value of a scaler quantity using one of said stored elements which resulted from the trial state transition, and adding said scaler quantity to the stored preselected trial value of said one element.

16. The method as recited in claim 15 in which a state transition is also performed on the elements of a dummy vector to sweep them through said ordered set of digital input data points, and a selected one of said resulting dummy vector elements is used to calculate the value of said scaler quantity.

17. The method as recited in claim 12 in which each set of complex state vector elements $(x, \Delta_1 x, \Delta_2 x, \Delta_3 x)$ has an initial value at a first data point $(A, \Delta_1 A, \Delta_2 A, \Delta_3 A)$ and is altered by said state transition to form a resulting set of complex state vector elements at a second data point $(B, \Delta_1 B, \Delta_2 B, \Delta_3 B)$, and in which the alteration of each set of complex state vector elements during the $i+1$ iteration of said mapping interpolator is defined by the following expressions, $$x_{i+1} = x_i + \Delta_1 x_i$$
$$\Delta_1 x_{i+1} = \Delta_1 x_i + \Delta_2 x_i$$
$$\Delta_2 x_{i+1} = \Delta_2 x_i + \Delta_3 x_i$$
$$\Delta_3 x_{i+1} = \Delta_3 x_i$$

wherein $(x_i, \Delta_1 x_i, \Delta_2 x_i, \Delta_3 x_i)$ is the value of each set of complex state vector elements after i iterations of said mapping interpolator.

18. The method as recited in claim 17 in which the value of said $\Delta_3 A$ element in each set at said first data point is calculated in said preprocessor according to the following expression:

$$\Delta_3 A = B - A - n\Delta_1 A - a\Delta_2 A)/b$$

wherein
$a = n(n-1)/2$
and
$b = n(n-1)(n-2)/6$

19. The method as recited in claim 18 in which either said $\Delta_1 A$ element or said $\Delta_2 A$ element in each set of complex state vector elements is an unknown element, and the value is calculated using a forward sweep process which includes the steps of:
  assigning a trial value to said unknown element;
  performing a trial state transition on said set of complex state vector elements $(A, \Delta_1 A, \Delta_2 A, \Delta_3 A)$ to generate a resulting trial set of complex state vector elements $(B, \Delta_1 B, \Delta_2 B, \Delta_3 B)$ at said second data point;
  performing a state transition on a dummy vector with said mapping interpolator;
  calculating a scaler quantity from selected elements of said resulting trial set of vector elements and said final dummy vector; and
  adding said scaler quantity to said trial value of said unknown element to produce the optimal value thereof.

20. The method as recited in claim 19 in which the trial state transition in said forward sweep process is performed according to the following expressions:

$$B = A + n\Delta_1 A + a\Delta_2 A + b\Delta_3 A$$
$$\Delta_1 B = \Delta_1 A + n\Delta_2 A + a\Delta_3 A$$
$$\Delta_2 B = \Delta_2 A + n\Delta_3 A$$
$$\Delta_3 B = \Delta_3 A$$

21. In a numerical control system having a preprocessor for receiving digital input data and performing arithmetic calculations thereon to generate digital output data, means for storing said preprocessor output data for subsequent use, and a function generator operable to generate analog output signals responsive to said stored preprocessor output data, a method of reproducing a spacial form, the steps comprising:
  selecting a limited set of data points lying on said spacial form and entering digital data into said preprocessor which describes the spacial form at these data points;
  calculating a complex state vector in said preprocessor and storing it in said storage means, said calculation being performed by calculating a steering vector from said input data which is based on a prescribed smoothness criteria and calculating an initial state vector which describes the spacial form at one of these selected data points;
  generating as a function of time in said function generator a steering function from said calculated steering vector;
  dynamically applying said generated steering function to said calculated initial state vector in said function generator to perform a state transition which generates as a function of time an ordered set of digital output data; and
  converting the ordered set of digital output data to analog output signals, which signals are employed to reproduce the spacial form.

22. The method as recited in claim 21 in which said steering function is generated concurrently with its dynamic application to said state vector in a digital differential analyzer.

23. A method as recited in claim 22 in which said preselected smoothness criteria is a minimum energy smoothness criteria and said state transition is a linear transformation of said initial state vector to a final state vector which describes the spacial form at another of said selected data points.

24. In a numerical control system having means for storing digital input data comprising a surface state vector having a plurality of elements, a mapping interpolator for receiving selected elements of said surface state vector and iteratively altering their value, and interpolation control means for applying selected elements of said surface state vector to said mapping interpolator and for controlling the iteration of said mapping interpolator, a method of generating a surface patch from a stored surface state vector, the steps comprising:
1. transferring a set of surface state vector elements which form a complex state vector from said storage means to said mapping interpolator;
2. generating output data that describes a trajectory from said complex state vector by iteratively altering the elements thereof with said mapping interpolator to generate a sequence of output data;
3. altering the surface state vector in said storage means by sequentially applying selected groups of elements therein to said mapping interpolator and altering selected elements in each group by iterating said mapping interpolator; and
4. sequentially generating output data that describes additional trajectories by repeating steps 1, 2 and 3 until output data which describes the surface patch has been generated.

25. The method as recited in claim 24 in which said mapping interpolator is iterated once when each of said groups of elements is applied thereto, and each trajectory is generated from a complex state vector by iterating said mapping interpolator a plurality of times.

26. The method as recited in claim 25 in which said surface state vector defines a three-dimensional surface with respect to three orthogonal axes and it contains forty-eight elements, sixteen of which are associated exclusively with each of the three axes,
wherein said complex state vector is formed by selecting twelve of said surface state vector elements, four of which are associated with each of said axes, and wherein each of said groups includes four elements, one of which is also in said complex state vector.

27. In the numerical control system as recited in claim 24 which includes a preprocessor having means for receiving and storing digital input data which describes a surface, means for performing arithmetic calculations on said stored digital input data for generating said digital data comprising said surface state vector, a method of generating said surface state vector which concisely defines a surface which is described by a grid of digital data points, the steps comprising:
storing said digital data points which describe the surface in a preselected order in said preprocessor storage means;
calculating the elements of a first complex state vector from selected digital data points lying on one boundary of the surface, said first complex state vector including a plurality of elements which define a boundary trajectory passing through selected digital data points;
calculating the elements of a second complex state vector from selected digital data points lying on an opposing boundary of the surface, said second complex state vector including a plurality of elements which define an opposing boundary trajectory passing through said second selected digital data points;
calculating a set of three surface state vector elements from each pair of corresponding elements in said calculated first and second complex state vectors; and
combining said calculated surface state vector elements with the calculated elements of one of said complex state vectors to form a surface state vector.

28. In the numerical control as recited in claim 27 the method further including calculating the elements of a third complex state vector from selected digital data points lying between the boundaries of the surface, said third complex state vector including a plurality of elements which define a trajectory passing through said third selected digital data points, and in which each of said sets of three surface state vector elements are calculated from corresponding elements in said first, second and third complex state vectors.

29. In the numerical control system as recited in claim 28 the method further including calculating the value of one of said elements in each of said sets of three surface state vector elements using a forward sweep process.

30. In the numerical control system as recited in claim 28 the method further including calculating the value of one unknown surface state vector element in each of said sets of three calculated surface state vector elements using a forward sweep process which includes the steps of:
storing a selected trial value for said one unknown element, combining said trial value with the remaining two calculated surface state vector elements and one element of said first complex state vector;
performing a trial state transition on said combined elements to generate three resulting surface state vector elements and the element of said second complex state vector which corresponds to said one element of said first complex state vector; and
calculating an optimal value for said one unknown surface state vector using the value of one of said surface state vector elements which resulted from said trial state transition.

31. A numerical control system for a machine tool, the combination comprising:
data input means operable to receive an ordered set of digital data which includes the coordinate values of data points lying on a spacial form to be machined;
a preprocessor connected to said data input means to receive said digital data and in response thereto generate and store the elements of a complex state vector which concisely defines a smooth cut to be made through a set of data points on said spacial form;
a mapping interpolator coupled to said preprocessor to receive said stored complex state vector elements, and in response thereto, iteratively generate a sequence of position command signals at an output terminal; and a servo mechanism connected to said mapping interpolator output terminal and connected to drive a movable member on the machine tool in response to said position command signals.

32. The numerical control system as recited in claim 31 in which said mapping interpolator is comprised of a plurality of sections, one section for each axis of motion of said machine tool, and selected sets of elements of the complex state vector generated by said preprocessor are applied to each of said mapping interpolator sections, and in which there are a plurality of servomechanisms, one connected to each of said mapping interpolator sections.

33. The numerical control system as recited in claim 32 in which said preprocessor includes a granularity computer connected to receive digital input data and in response thereto calculate a granularity number, and in which said mapping interpolator is a digital differential analyzer which iteratively generates said position command signal and in which the number of iterations are determined by said granularity number 34. The numerical control system as recited in claim 33 in which each section of said mapping interpolator is comprised of an adjoint interpolator having an output terminal and an input terminal connected to receive selected complex state vector elements from said preprocessor, and a dynamic interpolator having a first input terminal connected to receive selected complex state vector elements from said preprocessor, a second input terminal connected to said adjoint interpolator output terminal, and an output terminal connected to one of said servomechanisms.

35. The numerical control system as recited in claim 33 in which said preprocessor includes addressable storage means and said preprocessor operates to generate the elements of a plurality of complex state vectors, to calculate a plurality of associated granularity numbers, and to store said complex state vector elements and associated granularity numbers in said addressable storage means,
wherein said stored complex state vector elements and associated granularity numbers are generated in sequence to said mapping interpolator.

36. The numerical control system as recited in claim 1 which includes a feedrate computer connected to said mapping interpolator and connected to said data input means to receive a feedrate number, wherein said feedrate computer is operable to control the rate at which said mapping interpolator generates position command signals.

37. The numerical control system as recited in claim 31 in which said preprocessor calculates the elements of a plurality of complex state vectors, and in which there is an interpolation control coupled to said preprocessor and connected to said mapping interpolator, which operates to sequentially apply the elements of said complex state vectors to said mapping interpolator.

38. The numerical control system as recited in claim 37 in which said preprocessor includes:
output means for coupling said complex state vector elements to said mapping interpolator;
memory means which stores the elements of said complex state vectors and which is responsive to an address to read out one of said stored complex state vectors at said preprocessor output means; and a memory address generator coupled to said memory means and said interpolation control.

39. An interpolation system for controlling the motion of a movable member to drive it through a set of points lying on a path, the combination comprising:
preprocessor means connected to receive input data which includes the coordinate values of said set of points lying on the path and being operable in response thereto to calculate the elements of initial complex state vectors which concisely define smooth trajectories that connect said set of points;
a digital computer having a random access memory, input means, output means, and control means;
means coupling the initial complex state vector elements calculated by said preprocessor with the input means on said digital computer;
said digital computer being responsive to a program stored in said random access memory to dedicate said digital computer as a numerical control processor which stores elements of selected initial complex state vectors coupled to its input in said random access memory, calculates a sequence of digital command signals, and couples the command signals through said output means to control the motion of said movable member, said stored program including:
a mapping interpolator routine which operates on a selected complex state vector to arithmetically alter selected elements thereof,
an interpolation control routine which initiates execution of the mapping interpolator routine and controls the number of times the mapping interpolator routine is executed for each selected complex state vector; and
a linear interpolator routine which is periodically executed to generate a sequence of position command signals to said computer output means, each of which command signals is responsive to the value of one of said altered elements of said selected complex state vector.

40. The system as recited in claim 39 in which granularity numbers are calculated by said preprocessor and stored in said random access memory with said complex state vectors, and said interpolation control routine is responsive to each received granularity number to initiate execution of said mapping interpolator routine a corresponding number of times.

41. The system as recited in claim 39 in which said selected complex state vector elements are stored in said random access memory at addresses $(x, \Delta_1 x, \Delta_2 x, \Delta_3 x, y, \Delta_1 y, \Delta_2 y, \Delta_3 y)$, said selected elements which are altered by said mapping interpolator routine are at addresses $(x, \Delta_1 x, \Delta_2 x, y, \Delta_1 y, \Delta_2 y)$, and said other selected elements which alter said selected elements are at the respective addresses $(\Delta_1 x, \Delta_2 x, \Delta_3 x, \Delta_1 y, \Delta_2 y, \Delta_3 y)$.

42. The system as recited in claim 39 in which a feedrate number is applied to said input means and stored in said random access memory, and said stored program includes
a feedrate computer routine operable when executed to calculate a pair of sample numbers responsive to the value of said feedrate number and the values of said complex state vector elements stored at $\Delta_1 x$ and $\Delta_1 y$, and
in which said linear interpolator routine operates to store the value of each of said complex state vector elements at $\Delta_1 x$ and $\Delta_1 y$ at random access memory addresses $\Delta_1 xx$ and $\Delta_1 yy$, to generate a pair of position command signals to said output means which are each responsive to the value of one of said sample numbers, and to diminish the value of each of said complex state vector elements at $\Delta_1 xx$ and $\Delta_1 yy$ by the value of one of said sample numbers, wherein when the value of one of said complex state vector elements at $\Delta_1 xx$ and $\Delta_1 yy$ is diminished to zero, said interpolation control routine causes said mapping interpolator routine to be executed and to thereby generate new values for the complex state vector elements at $\Delta_1 x$ and $\Delta_1 y$.

43. An interpolation system for controlling the motion of the $x$, $y$ and $z$ axis servo mechanisms of a machine tool to reproduce a three-dimensional surface, the combination comprising:
   storage means;
   input means for entering an interpolation constant and the coordinate values of an ordered set of points on the surface into said storage means;
   preprocessor means connected to receive the coordinate values and interpolation constant from said storage means, said preprocessor means being operable to generate a 48-element surface state vector which includes sixteen $x$ axis elements, sixteen $y$ axis elements and sixteen $z$ axis elements that concisely define a three-dimensional surface patch which smoothly connects four or more points on the surface; and
   a numerical control processor coupled to receive the elements of a surface state vector and in response thereto generate a sequence of digital command signals to each of the $x$, $y$ and $z$ axis servo mechanisms on said machine tool to produce a three-dimensional surface patch by reproducing a series of closely spaced smooth trajectories which lie on said three-dimensional surface.

44. The interpolation system as recited in claim 43 in which said numerical control processor includes a mapping interpolator and an interpolation control which operates sequentially to select twelve elements from said surface state vector to form an inital complex state vector which defines one of said smooth trajectories on said three-dimensional surface, to apply said complex state vector elements to said mapping interpolator, to iterate said mapping interpolator a plurality of times to reproduce said one smooth trajectory, and to divide the elements of said surface state vector into groups, sequentially apply each group to said mapping interpolator, and iterate said mapping interpolator once for each group to generate an altered 48-element surface state vector which includes an altered initial complex state vector.

45. The interpolation system as recited in claim 44 in which said mapping interpolator is a digital differential analyzer which alters selected elements of said complex state vector with other selected elements of said complex state vector during each iteration, and said digital command signals for each axis of motion are derived from one of said altered complex state vector elements.

46. The interpolation system as recited in claim 45 in which said numerical control processor includes a linear interpolator which for each axis of motion receives said one altered complex state vector element from said mapping interpolator after each iteration thereof and said linear interpolator generates at a preselected rate a plurality of sample numbers from which said digital command signals are derived.

47. The interpolation system as recited in claim 46 in which said numerical control processor includes a feedrate computer which is responsive to both a preselected feedrate number and a plurality of said altered complex state vector elements to calculate the value of a sample number for each axis of motion and apply said sample numbers to said linear interpolator.

48. The interpolation system as recited in claim 45 in which said digitizing means, processor means and storage means are remote from said numerical control processor and said numerical control processor includes receiver means which is operable to fetch the elements of said surface state vector in said storage means.

49. The interpolation system as recited in claim 43 in which said preprocessor includes a granularity computer which calculates the square root of the sum of the squares of the differences in $x$, $y$ and $z$ coordinate values of a pair of successive points on the three-dimensional surface and divides the result by said interpolation constant.

50. The interpolation system as recited in claim 49 in which the surface state vector generated by said preprocessor defines a three-dimensional surface patch which connects the ordered set of data points with a set of closely spaced minimum energy trajectories.

51. In a numerical control processor which includes: means storing a 48-element surface state vector which defines a three-dimensional surface, a trajectory direction granularity number and a cross section direction granularity number; linear transformation means for finitely altering the value of one or more vector elements coupled to its input when iterated; interpolation control means for coupling selected surface state vector elements in said storage means to said linear transformation means and for controlling the iteration of said linear transformation means; and output means for generating digital motion command signals to each of three digital-to-analog converters on a controlled device in response to the value of surface state vector elements coupled to its input, a method of reproducing said defined three-dimensional surface from said surface state vector the steps comprising:
   1. coupling twelve selected elements of said surface state vector which comprise a complex state vector to said linear transformation means;
   2. altering elements of said complex state vector by performing a linear transformation of said complex state vector in a trajectory direction by iterating said linear transformation means a plurality of times corresponding to said trajectory direction granularity number;
   3. generating motion command signals by coupling three of said complex state vector elements which are altered during said linear tranformation in the trajectory direction to said output means;
   4. altering elements of the surface state vector by performing a linear transformation in a cross section direction by
      sequentially coupling selected groups of surface state vector elements in said storage means to said linear transformation means,
      altering surface state vector elements in each coupled group by iterating said linear transformation means once, and storing the elements of each altered group in said storage means to form a transformed surface state vector; and 5. repeating steps 1, 2, 3 and 4 using said transformed surface state vector until the number of linear transformations of the surface state vector corresponds to the cross section direction granularity number.

52. In the numerical control process as recited in claim 51 in which each of said groups of surface state vector elements includes one of said complex state vector elements.

53. In the numerical control process as recited in claim 51 in which said output means includes a linear interpolator which generates as a function of time a series of digital motion command signals to each of said digital-to-anlog converters in response to each of said sets of three altered complex state vector elements coupled to the input of said output means, and
wherein said linear transformation of said complex state vector in the trajectory direction by said linear transformation means is inhibited after each iteration until the linear interpolator has generated said series of digital motion command signals.

54. A machine for reproducing a spacial form which is described by an ordered set of digital input data, the combination comprising:
means for calculating data representative of a concise definition of the spacial form including means for calculating the elements of an ordered set of complex state vectors from said digital input data and a selected linear transformation matrix;
means for generating output data as a function of time from said calculated data representative of a concise definition of the spacial form, including means for iteratively applying each of said complex state vectors to said selected linear transformation matrix to perform a linear transformation thereon which generates output data; and
means coupled to said last named means for employing said output data to reproduce said spacial form.

55. The machine as recited in claim 54 in which said means for calculating data representative of a concise definition of the spacial form includes means for calculating an ordered set of granularity numbers which are associated with said set of complex state vectors and wherein said means for iteratively applying each of said complex state vectors to said selected linear transformation matrix is responsive to the granularity number associated with the complex state vector being linearly transformed.

* * * * *